(12) United States Patent
Pomerantz et al.

(10) Patent No.: US 10,061,349 B2
(45) Date of Patent: Aug. 28, 2018

(54) HEAD MOUNTABLE CAMERA SYSTEM

(71) Applicant: SANDISK TECHNOLOGIES INC., Plano, TX (US)

(72) Inventors: Itzhak Pomerantz, Kfar Saba (IL); Menahem Lasser, Kohav Yair (IL); Rahav Yairi, Oranit (IL); Idan Alrod, Herzliya (IL); Eran Sharon, Rishon Lezion (IL); Noam Presman, Givatayim (IL); Ariel Navon, Revava (IL)

(73) Assignee: SANDISK TECHNOLOGIES LLC, Addison, TX (US)

( * ) Notice: Subject to any disclaimer, the term of this patent is extended or adjusted under 35 U.S.C. 154(b) by 212 days.

(21) Appl. No.: 13/794,336

(22) Filed: Mar. 11, 2013

(65) Prior Publication Data
US 2014/0160248 A1   Jun. 12, 2014

Related U.S. Application Data

(60) Provisional application No. 61/734,157, filed on Dec. 6, 2012.

(51) Int. Cl.
| | |
|---|---|
| *H04N 5/225* | (2006.01) |
| *G06F 1/16* | (2006.01) |
| *H04N 5/232* | (2006.01) |
| *H04N 13/02* | (2006.01) |
| *G06F 3/01* | (2006.01) |

(52) U.S. Cl.
CPC .............. *G06F 1/163* (2013.01); *G06F 3/011* (2013.01); *H04N 5/2258* (2013.01); *H04N 5/23206* (2013.01); *H04N 5/23212* (2013.01); *H04N 5/23229* (2013.01); *H04N 5/23296* (2013.01); *H04N 13/0239* (2013.01); *H04N 2213/001* (2013.01)

(58) Field of Classification Search
CPC . G02B 27/017; G02B 23/125; G02B 27/0172
See application file for complete search history.

(56) References Cited

U.S. PATENT DOCUMENTS

| | | | | |
|---|---|---|---|---|
| 3,563,151 | A | * | 2/1971 | Koeber ................. G03B 13/20 352/140 |
| 3,870,034 | A | | 3/1975 | James |
| 4,760,269 | A | | 7/1988 | McKenna |
| 4,797,736 | A | * | 1/1989 | Kloots ................... A61B 19/26 348/370 |
| 5,265,628 | A | | 11/1993 | Sage et al. |

(Continued)

FOREIGN PATENT DOCUMENTS

| | | |
|---|---|---|
| EP | 2509006 A1 | 10/2012 |
| JP | 2003046926 A | 2/2003 |

OTHER PUBLICATIONS

Ay, Sakire Arslan et al. "GRVS: A Georeferenced Video Search Engine," ACM Multimedia Oct. 19-24, 2009, Beijing, China, pp. 977-978.

(Continued)

*Primary Examiner* — Jayanti K Patel
*Assistant Examiner* — Shadan E Haghani
(74) *Attorney, Agent, or Firm* — Vierra Magen Marcus LLP

(57) ABSTRACT

Head mountable camera devices, systems, and methods are disclosed.

26 Claims, 33 Drawing Sheets

(56) References Cited

U.S. PATENT DOCUMENTS

| | | | |
|---|---|---|---|
| 5,347,910 A | 9/1994 | Avila et al. | |
| 5,369,802 A | 11/1994 | Murray | |
| 5,394,517 A * | 2/1995 | Kalawsky | G02B 27/017 345/632 |
| 5,457,751 A * | 10/1995 | Such | H04M 1/05 348/115 |
| 5,579,054 A | 11/1996 | Sezan et al. | |
| 5,583,571 A * | 12/1996 | Friedland | F16M 13/04 348/158 |
| 5,714,997 A | 2/1998 | Anderson | |
| 5,835,609 A | 11/1998 | Legette et al. | |
| 5,993,001 A * | 11/1999 | Bursell | G06F 19/321 348/E13.014 |
| 6,091,832 A * | 7/2000 | Shurman | G02C 11/06 2/422 |
| 6,104,824 A | 8/2000 | Ito | |
| 6,130,705 A * | 10/2000 | Lareau | G01C 3/08 348/144 |
| 6,195,441 B1 * | 2/2001 | Ito | H04R 5/0335 381/370 |
| 6,252,970 B1 * | 6/2001 | Poon | H04R 1/105 181/128 |
| 6,301,367 B1 * | 10/2001 | Boyden | A42B 1/245 2/209 |
| 6,307,526 B1 * | 10/2001 | Mann | G02B 27/017 345/7 |
| 6,425,862 B1 * | 7/2002 | Brown | A47B 21/00 108/25 |
| 6,449,374 B1 * | 9/2002 | Skulley | H04R 1/083 381/330 |
| 6,499,146 B2 * | 12/2002 | Bavetta | A41D 13/05 2/209 |
| 6,507,358 B1 * | 1/2003 | Mori | H04N 5/2259 348/42 |
| 6,560,029 B1 * | 5/2003 | Dobbie | G02B 23/125 2/6.1 |
| 6,668,076 B2 | 12/2003 | Penkethman | |
| 6,674,430 B1 | 1/2004 | Kaufman et al. | |
| 6,798,443 B1 * | 9/2004 | Maguire, Jr. | G06F 3/011 345/8 |
| 6,888,950 B2 * | 5/2005 | Siskin | A61F 11/14 181/129 |
| 7,076,077 B2 * | 7/2006 | Atsumi | H04R 1/1066 381/151 |
| 7,155,025 B1 * | 12/2006 | Weffer | H04R 5/033 381/370 |
| D538,269 S * | 3/2007 | Tragatschnig | D14/223 |
| 7,450,024 B2 | 11/2008 | Wildman et al. | |
| D593,067 S * | 5/2009 | Millora | D14/205 |
| 7,810,750 B2 | 10/2010 | Abreu | |
| 8,025,398 B2 | 9/2011 | Jannard | |
| 8,078,263 B2 | 12/2011 | Zeman et al. | |
| 8,228,024 B1 | 7/2012 | Zander | |
| 8,368,544 B2 | 2/2013 | Wildman et al. | |
| 8,858,430 B2 * | 10/2014 | Oyadiran | A61B 1/00016 600/200 |
| 9,606,375 B2 | 3/2017 | Abreu | |
| 9,686,603 B2 * | 6/2017 | Zheng | H04R 1/1008 |
| D793,357 S * | 8/2017 | Afshar | D14/205 |
| 9,740,239 B2 * | 8/2017 | Pombo | G06F 1/163 |
| 2002/0122014 A1 * | 9/2002 | Rajasingham | G02B 27/017 345/8 |
| 2004/0010803 A1 * | 1/2004 | Berstis | H04N 5/23206 725/105 |
| 2004/0041904 A1 * | 3/2004 | Lapalme | H04N 5/2252 348/14.08 |
| 2005/0162380 A1 | 7/2005 | Paikattu et al. | |
| 2006/0209013 A1 * | 9/2006 | Fengels | G06F 3/0325 345/156 |
| 2007/0071269 A1 | 3/2007 | Milde | |
| 2007/0152630 A1 | 7/2007 | Winkler et al. | |
| 2007/0195987 A1 | 8/2007 | Rhoads | |
| 2007/0229761 A1 | 10/2007 | Gimenez et al. | |
| 2007/0248238 A1 * | 10/2007 | Abreu | G02C 3/003 381/381 |
| 2008/0131106 A1 * | 6/2008 | Bruce | G03B 17/08 396/25 |
| 2008/0143954 A1 | 6/2008 | Abreu | |
| 2008/0144854 A1 | 6/2008 | Abreu | |
| 2008/0300055 A1 | 12/2008 | Lutnick et al. | |
| 2009/0009475 A1 | 1/2009 | Schuette | |
| 2009/0046146 A1 | 2/2009 | Hoyt | |
| 2009/0122161 A1 | 5/2009 | Bolkhovitinov | |
| 2009/0164032 A1 * | 6/2009 | Kedem | G06F 17/30056 700/94 |
| 2009/0180649 A1 | 7/2009 | Hsu et al. | |
| 2009/0268032 A1 * | 10/2009 | Jones | H04N 7/183 348/164 |
| 2010/0095977 A1 | 4/2010 | Schmitz et al. | |
| 2010/0172522 A1 | 7/2010 | Mooring et al. | |
| 2010/0216522 A1 | 8/2010 | Bennis et al. | |
| 2010/0238693 A1 | 9/2010 | Jeddeloh | |
| 2010/0245585 A1 * | 9/2010 | Fisher | H04M 1/6066 348/164 |
| 2010/0328471 A1 * | 12/2010 | Boland | G02B 13/004 348/207.99 |
| 2011/0090135 A1 * | 4/2011 | Tricoukes | G02B 27/0176 345/8 |
| 2011/0170702 A1 * | 7/2011 | Bays | H04R 5/0335 381/74 |
| 2011/0193963 A1 | 8/2011 | Hess et al. | |
| 2011/0288445 A1 | 11/2011 | Lillydahl et al. | |
| 2012/0050198 A1 | 3/2012 | Cannon | |
| 2012/0149467 A1 * | 6/2012 | Heck | A63F 13/06 463/36 |
| 2012/0155064 A1 * | 6/2012 | Waters | A42B 1/242 362/103 |
| 2012/0190404 A1 | 7/2012 | Rhoads | |
| 2012/0229248 A1 * | 9/2012 | Parshionikar | G08B 21/06 340/3.1 |
| 2012/0281961 A1 | 11/2012 | Forbes | |
| 2012/0307561 A1 * | 12/2012 | Joo | G11C 16/0483 365/185.17 |
| 2013/0063550 A1 * | 3/2013 | Ritchey | G03B 37/00 348/36 |
| 2013/0122672 A1 | 5/2013 | Or-Bach et al. | |
| 2013/0177166 A1 * | 7/2013 | Agevik | H04S 1/005 381/74 |
| 2013/0188021 A1 * | 7/2013 | Sim | G06T 15/00 348/46 |
| 2013/0285886 A1 * | 10/2013 | Pombo | G02B 27/0149 345/8 |
| 2013/0307856 A1 | 11/2013 | Keane et al. | |
| 2013/0310676 A1 * | 11/2013 | Jung | A61B 5/6803 600/383 |
| 2013/0345842 A1 * | 12/2013 | Karakaya | H04R 5/04 700/94 |
| 2014/0018779 A1 * | 1/2014 | Worrell | A61B 19/00 606/1 |
| 2014/0050346 A1 * | 2/2014 | Chen | H04M 1/0272 381/333 |
| 2014/0055353 A1 * | 2/2014 | Takahama | G06F 3/012 345/156 |
| 2014/0079257 A1 * | 3/2014 | Ruwe | F21V 21/084 381/309 |
| 2014/0161412 A1 * | 6/2014 | Chase | H04N 21/2743 386/224 |
| 2014/0261509 A1 * | 9/2014 | Adam | A45D 8/36 132/200 |
| 2014/0352033 A1 * | 12/2014 | Bryan | A42B 3/0406 2/244 |
| 2016/0100676 A1 * | 4/2016 | Sandanger | A45F 5/00 224/181 |

OTHER PUBLICATIONS

Model, DMITRI et al. "User-Calibration-Free Remote Eye-Gaze Tracking System With Extended Tracking Range," 24th Canadian

(56) References Cited

OTHER PUBLICATIONS

Conference on Electrical and Computer Engineering (CCECE), May 8-11, 2011, pp. 1268-1271.
LED Flashlight & Morse Code—Android, http://www.appszoom.com/android_applications/tools/led-flashlight-morse-code_bvvkp.html, printed Oct. 5, 2012, 2 pages.
Swann Freestyle HD Wearable Camera, http://www.whatdigitalcamera.com/equipment/reviews/compactcameras/129258/1/swann-freestyle-hd-wearable-camera.html, Feb. 23, 2012, 6 pages.
Android—Would it be possible for a mobile app to detect a flashing light with its camera, i.e., Visual Morse Code, http://stackoverflow.com/questions/4888251/would-it-be-possible-for-a-mobile-app-to-detect-a-flashing-light-with-its-camera, Feb. 3, 2011, 2 pages.
Murphy, Samantha. "Why Google Glass Could Be Bad for Your Eyes," http://mashable.com/2013/02/22/google-glass-bad/, Feb. 22, 2013, 15 pages.
Eye Alignment for Hard Plastic Doll Eyes, http://thisolddoll.info/hosp/eyealign/eyealign.htm, printed Oct. 5, 2012, 10 pages.
"A Day Made of Glass 2," Coming, YouTube, http://www.youtube.com/watch_popup?v=6Cf7IL_eZ38&vq=medium, printed Mar. 11, 2013, 1 page.
"Google Glasses Project," YouTube, http://www.youtube.com/watch?feature=endscreen&NR=1&v=JSnB06um5r4, published May 7, 2012, 1 page.
"Skydiving at Sibson Using Immortal Video Eye Gear," YouTube, http://www.youtube.com/watch?v=3ML6Hm-jwt4, uploaded Jul. 15, 2012, 1 page.
"Windows Project Glass: One Day Too . . . ," YouTube, http://www.youtube.com/watch?v=ZwModZmOzDs, published Apr. 5, 2012, 1 page.
Non-Final Office Action dated Jul. 21, 2016 in U.S. Appl. No. 14/051,091, 12 pages.
Final Office Action dated Nov. 15, 2016 in U.S. Appl. No. 14/051,091, 11 pages.
Restriction Requirement dated Mar. 31, 2016 in U.S. Appl. No. 14/051,091, 8 pages.
Wilhem, Frank H. et al. "Emotions Beyond the Laboratory: Theoretical Fundamentals, Study Design, and Analytic Strategies for Advanced Ambulatory Assessment," Biological Psychology, 2010, vol. 84, pp. 552-569.
Lewan, Mats. "Aqua Pulse Measures Heart Rate in the Pool," http://news.cnet.com/8301-17938_105-10225171-1.html, Apr. 22, 2009, 2 pages.
"Arteries and Nerves," http://www.healthline.com/human-body-maps/head/male#5/6, printed Oct. 7, 2013, 2 pages.
PLX XWave Sonic—Brain Wave Headset, http://www.plxdevices.com/product_info.php?id=XWAVESONIC, printed Oct. 7, 2013, 3 pages.
VoiLa Voiced Label Reader for the Blind—English, MaxiAids, http://www.maxiaids.com/products/1573/VoiLa-Voiced-Label-Reader-for-the-Blind-English.html, printed Oct. 7, 2013, 3 pages.
"Super-Resolution Technology to Convert Video of Various Resolutions to High-Definition," News Release Digest, Central Research Laboratory, Hitachi, Ltd., 2007, http://www.hitachi.com/rd/portal/pdf/news/crl080924lnrde.pdf, 1 page.
Whatmough, Robert. "Techniques for Extracting High-Resolution Still Images from Video Sequences," DSTO-TR-1247, Department of Defense, Defense Science & Technology Organisation, Dec. 2001, 55 pages.
xSightWare, https://gust.com/c/xsightware, printed Oct. 7, 2013, 4 pages.
Yao, Ning et al. "A Video-based Algorithm for Food Intake Estimation in the Study of Obesity," IEEE 33rd Annual Northeast Bioengineering Conference, Mar. 10-11, 2007, Long Island, NY, Abstract, 1 page.
Lipsett, P.A. et al. "Handwashing Compliance Depends on Professional Status," PubMed, http://www.ncbi.nlm.nih.gov/pubmed/12593714, Fall 2001, 2 pages.
Bischoff, MD, Werner E. et al. "Handwashing Compliance by Health Care Workers: The Impact of Introducing an Accessible, Alcohol-Based Hand Antiseptic," American Medical Association, http://archinte.jamanetwork.com/article.aspx?articleid=485276, Arch Intern Med, vol. 160, Apr. 10, 2000, pp. 1017-1021.
Weissig, Christian et al. "The Ultimate Immersive Experience: Panoramic 3D Video Acquisition," Proceedings of the 18th International Conference on Advances in Multimedia Modeling (MMM'12), Springer-Verlag Berlin, Heidelberg, 2012, pp. 671-681.
Stevens, Tim "NAVI Hack Uses a Kinect to Let the Blind See, Wear Awesome Headgear (video)," http://www.engadget.com/2011/03/17/navi-hack-uses-a-kinect-to-let-the blind-see-wear-a . . . , Mar. 17, 2011, 3 pages.
Meschtscherjakov, Alexander et al. "Utilizing Emoticons on Mobile Devices within ESM studies to Measure Emotions in the Field," MobileHCI '09, Sep. 15-18, 2009, Bonn, Germany, 4 pages.
Poppendieck, Wigand et al. "Measurement Station for Recording of Different Biosignals to Detect Emotions Under Mobile Conditions," MobileHCI '09, Sep. 15-18, 2009, Bonn, Germany, 3 pages.
Acosta, Jamie C. "Persuasion, Dialog, Emotion and Prosody," MobileHCI '09, Sep. 15-18, 2009, Bonn, Germany, 3 pages.
Hussain, Syed S. et al. "Emotion Recognition on the Go: Providing Personalized Services Based on Emotional States," MobileHCI '09, Sep. 15-18, 2009, Bonn, Germany, 4 pages.
Janssen, Joris H. et al. "Guidelines for Mobile Emotion Measurement," MobileHCI '09, Sep. 15-18, 2009, Bonn, Germany, 4 pages.
Ganglbauer, Eva et al. "Possibilities of Psychophysiological Methods for Measuring Emotional Aspects in Mobile Contexts," MobileHCI '09, Sep. 15-18, 2009, Bonn, Germany, 4 pages.
Yamamoto, Jumpei et al. "MOLMOD: Analysis of Feelings based on Vital Information for Mood Acquisition," MobileHCI '09, Sep. 15, 2009, Bonn, Germany, 4 pages.
Bengs, Anette et al. "A Multimethod Approach for Measuring Mobile UX," MobileHCI '09, Sep. 15-18, 2009, Bonn, Germany, 3 pages.
Setz, Cornelia et al. "Combining Worthless Sensor Data," MobileHCI '09, Sep. 15-18, 2009, Bonn, Germany, 4 pages.
Office Action dated Mar. 22, 2018, in U.S. Appl. No. 14/051,091.
Response to Office Action filed May 17, 2018, in U.S. Appl. No. 14/051,091.
Notice of Allowance dated Jun. 8, 2018, in U.S. Appl. No. 14/051,091, 13 pages.

\* cited by examiner

| Component | Power (mw) |
|---|---|
| Cameras | 20+20 |
| Embedded NAND (Link) | 100 |
| CPU | 50 |
| Random Access Memory (RAM) | 50 |
| GPS | 20 |
| Beacon | 50 (400 – Street television (TV) LED for broadcast) |
| Bluetooth communication | 5 |
| Misc. | 40 |
| Total | 355 mw |
| Total (at 3.3 Volt) | 107 ma |

| Condition | Factor | Total | Units |
|---|---|---|---|
| HD video megabytes per minute | | 100 | MB |
| HD video megabytes per hour | 60 | 6000 | MB |
| In two channels | 1.3 | 7800 | MB |
| Per day | 8 | 62400 | MB |
| For a week of full retention | 6 | 374400 | MB |

| Function | Purpose | Methods | Output |
|---|---|---|---|
| Segmentation | Split the continuous log into discrete segments | On-off switch<br>Change in background visuals<br>Change in background noise<br>Manual user bookmarks | A folder of segments with partial metadata |
| Attribution | Creating hooks for the search engine from the audiovisual content | Identifiable objects<br>Identifiable places<br>Identifiable faces<br>Identifiable signs<br>Identifiable keywords<br>Indoors/outdoors<br>Daylight/dark<br>Stationary/walking/driving/unattended<br>Presence of other NANDeyes | Enrichment of metadata in segment entries |
| Extraction | Filtering segments for manual attention of user | Payments done<br>Billable time spent<br>Bookmarked segments for inspection<br>Bookmarked segments for forwarding<br>Bookmarked segments for deletion<br>Adding contacts to the database | According to filter type |

FIG. 10

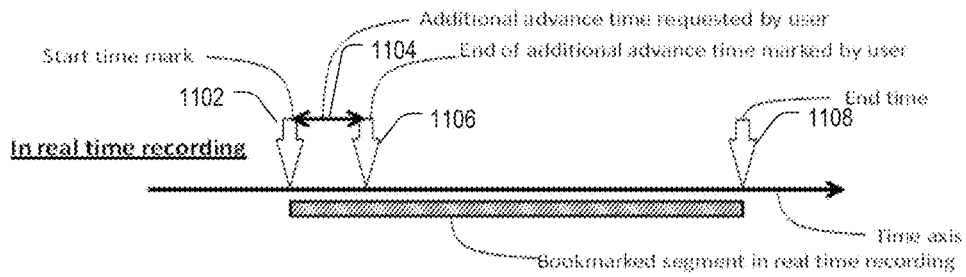

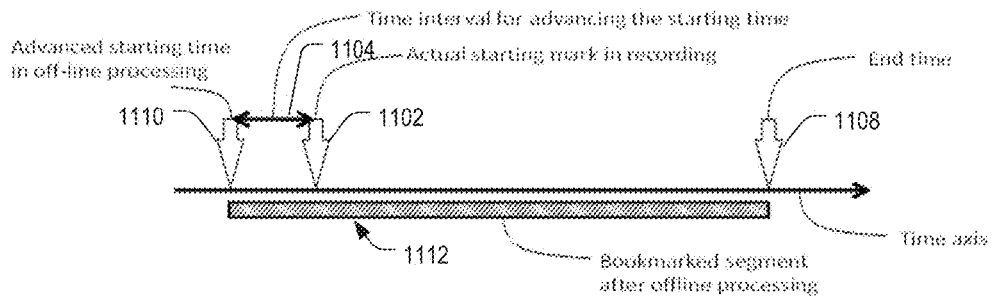

FIG. 11

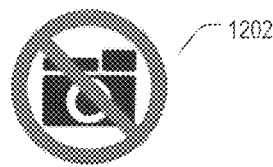

FIG. 12

| Parameter | Manual adjustment | Automatic adjustment |
|---|---|---|
| Calibration between user and NANDeye center Field of View | "Balanced Corner" technique | The manual method is a "one click" operation and makes an automatic mode redundant |
| Adjusting Field of view | Twist mechanism on cockpit of headgear | When the system notices that the user tilts his head up and down repeatedly |
| Focus distance | User adjustable separate focal lengths | When the system sees a scene with near and far objects |
| Frame rate | User adjustable separate frame rates | When the system sees very significant frame-to-frame changes |
| Zoom and resolution | User adjustable separate zoom amounts | When the system sees a relatively small object kept for a relatively long period at the center of the FOV - this mode can be optional, in case the user may not want the camera to zoom |
| Spectral coverage | User selectable filtering, such as for beacon communication | When user is actively communicating using the beacon |

FIG. 13

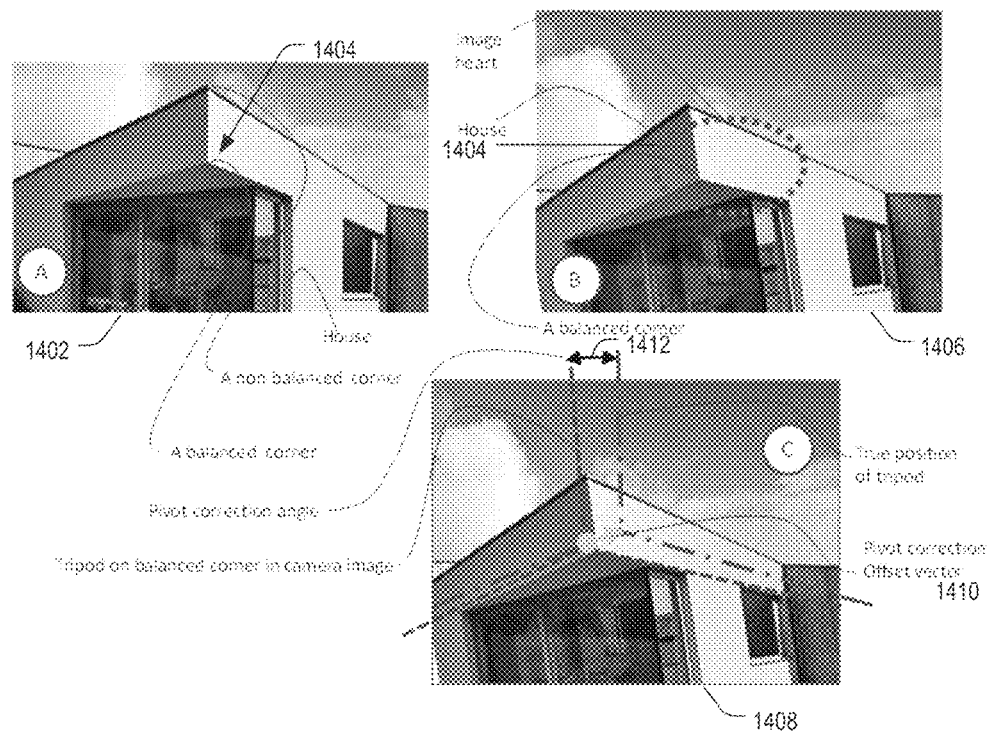
FIG. 14
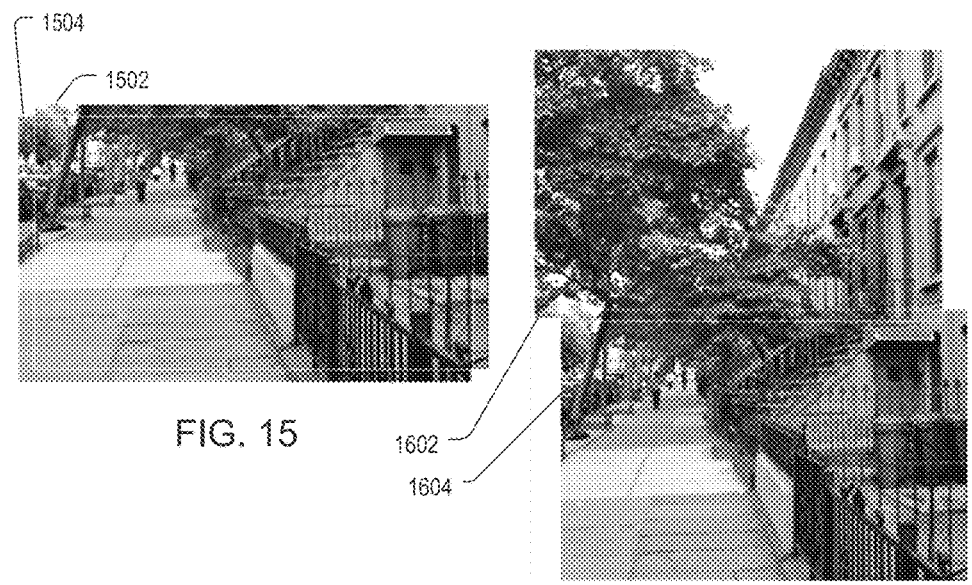
FIG. 15
FIG. 16

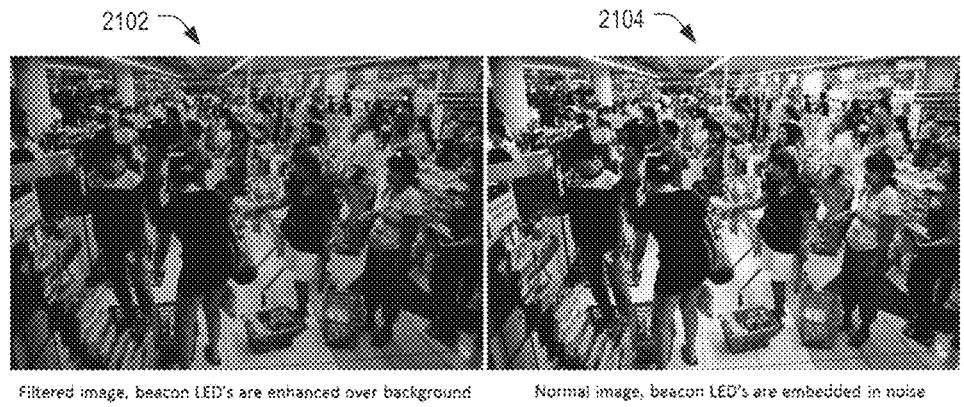

FIG. 21

| Channel | Main advantages | Typical use |
|---|---|---|
| Hardware controls on Headgear | Instant interaction<br>No errors | Power on/off<br>Still image snap shot |
| Voice commands | Hands free<br>No footprint on headgear | Info "for the record" ("advance bookmark by 7 secs.") |
| Visual gestures | Rich vocabulary and easy interpretation | Start-stop-zoom-calibrate etc. |
| Phone interface | Fully audio-visual<br>Easily programmable<br>Remotely controllable | Short visual messaging |

FIG. 22

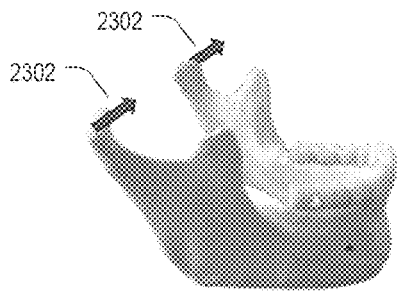

FIG. 23

HEAD MOUNTABLE CAMERA SYSTEM

CROSS-REFERENCE TO RELATED APPLICATIONS

The present application claims priority to U.S. Provisional Application No. 61/734,157, filed Dec. 6, 2012, which application is hereby incorporated by reference in its entirety.

FIELD OF THE DISCLOSURE

The present disclosure is generally related to camera devices.

BACKGROUND

Advances in digital camera technology have resulted in compact, high-resolution cameras that can capture still images and/or video in portable electronic devices. Although many devices such as mobile phones and tablet computers include cameras, still image and video recording are typically secondary features of the devices. Navigating a user interface to start a camera session may be time-consuming and can result in lost opportunities as a device user may be unable to initiate a camera session in response to an unanticipated event. Aiming the camera may require moving the entire device, which may be awkward when the device is large or when a user's hands are otherwise occupied.

BRIEF DESCRIPTION OF THE FIGURES

FIG. 10 is an illustration of a particular embodiment of operations that may be supported by a system to process data that may be generated by a head-mountable camera apparatus.

FIG. 11 is an illustration of a particular embodiment of bookmarking data that may be generated by a head-mountable camera apparatus.

FIG. 12 is an illustration of a particular embodiment of a graphical feature that may be detectable by a head-mountable camera apparatus as indicating that photography is unallowed.

FIG. 13 is an illustration of a particular embodiment of adjustable camera parameters of head-mountable camera apparatus.

FIG. 14 is an illustration of a particular embodiment of calibration of a head-mountable camera apparatus.

FIG. 15 is an illustration of a particular embodiment of a multi-camera stereo mode of a head-mountable camera apparatus.

FIG. 16 is an illustration of a particular embodiment of a multi-camera extended field of view mode of a head-mountable camera apparatus.

FIG. 21 is an illustration of a particular embodiment of spectral filtering of a head-mountable camera apparatus.

FIG. 22 is an illustration of a particular embodiment of interface channels that may be supported by a head-mountable camera apparatus.

FIG. 23 is an illustration of a particular embodiment of jaw motion that may be detectable by a head-mountable camera apparatus.

DETAILED DESCRIPTION

A technical description of multiple components of a consumer product named "NANDeye" is disclosed. Each component may be used individually or may be used in combination with one or more other components. Although the term "NANDeye" is sometimes applied herein to a system of interoperating components, the term "NANDeye" may also be applied to one or more of the components independent of whether the component operates as part of a larger system, and therefore the term "NANDeye" is not limited to a multi-component system. Each component may include new and useful features independent of whether the component is used as part of a larger system or separate from a larger system. Although the name "NANDeye" is used, it should be understood that while various implementations of various components may include NAND flash memory, other implementations of one or more components may include memory other than NAND flash memory, or alternatively, may include no memory. It should be understood that while various implementations of various components may include one or more cameras, image sensors, lenses, and/or other video elements, other implementations may not include such video elements.

NANDeye may be described as a video recording and processing system that may enable generating and providing users with a raw video log and a processed video log of what the users see. NANDeye may be a consumer product that creates a visual log of everything the user sees unless video logging is disabled or interrupted, such as paused by the user or responsive to an indication of prohibition by local regulations. A large variety of hardware and software modules, serving a large number of applications, may be used individually or in combination.

Figure 1:
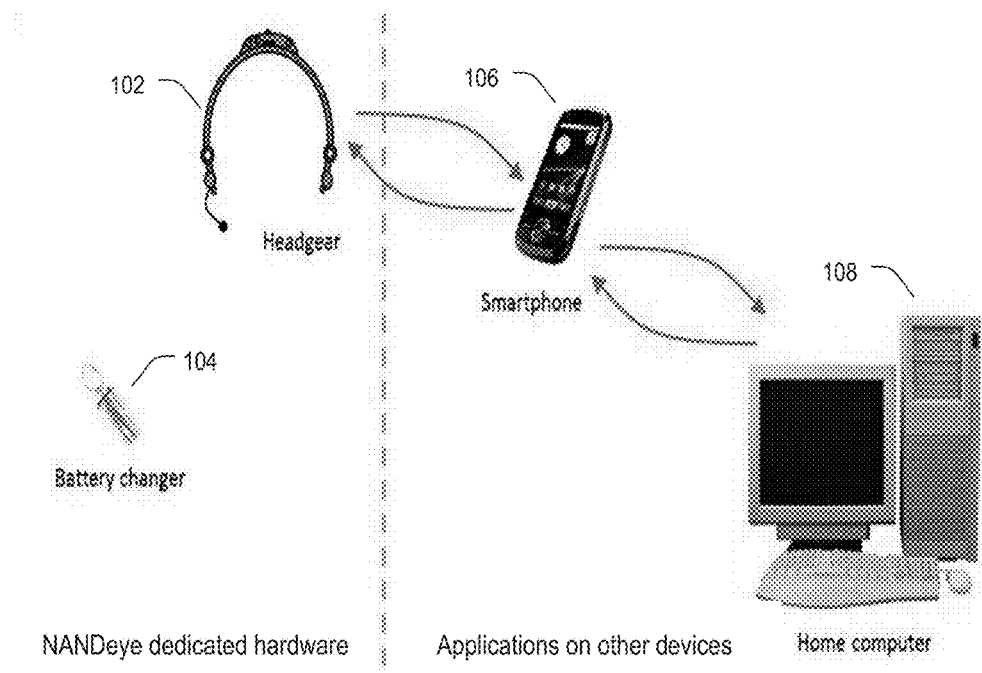
FIG. 1 is an illustration of a particular embodiment of components that may be used in a head mountable camera system.
Figure 2:
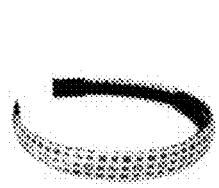
FIG. 2 is an illustration of a particular embodiment of headgear that may support one or more cameras.
Figure 3:
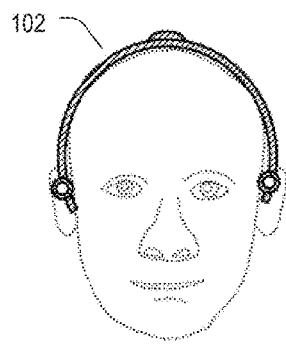
FIG. 3 is an illustration of a particular embodiment of a head-mountable camera apparatus.

A NANDeye system may be made of four separate hardware units, such as illustrated in FIG. 1. For example, two of the hardware units of may include dedicated hardware (e.g., headgear 102 and a battery changer 104) and two of the hardware units may be implemented using hardware computing platforms running NANDeye software applications, such as smart phones (e.g., smart phone 106) and home computers (e.g., home computer 108) as illustrative examples. The headgear 102 may be an electronic device having the form factor of a hairband, such as an example of a hairband form factor illustrated in FIG. 2, and an example of the headgear 102 is illustrated in FIG. 3. The headgear 102 may be the front end of the system and may contain three groups of components:

Sensors: Cameras, satellite-based location sensors such as global positioning system (GPS), accelerometer, compass, inclinometer, one or more other sensors, or any combination thereof.

Human interfaces: Microphone, earphones, cheek sensors, one or more other interface devices, or any combination thereof.

Utilities: batteries, processor unit such as a central processing unit (CPU), mass storage, beacon light emitting diode (LED), communication, such as ad-hoc peer-to-peer network communication (e.g. Bluetooth), laser pointer, one or more other utility components, or any combination thereof.

The headgear 102 may be configured to capture video, compress the resulting video data corresponding to the captured video, perform basic image processing, and send resulting data to a remote control held by the user, such as the user's phone via a wireless interface such as via a Bluetooth network.

Figure 4:
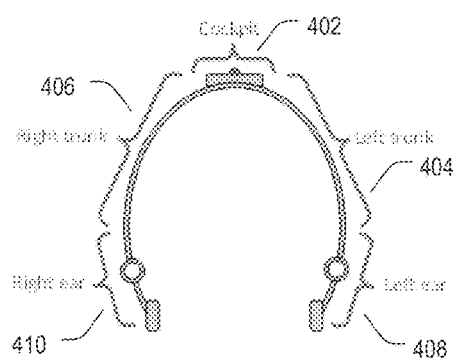
FIG. 4 is an illustration of a particular embodiment of a head-mountable camera apparatus.

The headgear 102 may be a fashion item. As a visible item on the user's head, it can be aesthetic and convenient to wear. An illustrative form factor of a headgear 102 with two cameras is shown in FIG. 4 and may be provided with replaceable components or coverings to enable user customization of an appearance of the headgear 102 (e.g., "skins"). The headgear 102 body illustrated in FIG. 4 can be divided into 5 functional regions:

Cockpit 402—including, e.g., controller/processor, batteries, beacon(s), switches, laser pointer(s)

Left trunk 404—including, e.g., flexible printed circuit board (PCB), storage cards, Right trunk 406—including, e.g., flexible PCB, and storage such as memorycards or embedded memory Left ear 408—including, e.g., earphone, camera, cheek switch, concave rest for allowing passage of the eyeglasses temples, or for leaning and stabilizing the system on the typically accurately located eyeglass temples Right ear 410—Typically same as left ear.

A smartphone may serve as the keypad, additional processor, and/or display 522 for the headgear 102. Although described herein as a 'phone' or 'smartphone' for convenience, any portable electronic device may be used, such as a tablet computer or other portable electronic device. The phone may receive instructions using a text or voice input, show selected video frames from the cameras, and run simple video processing tasks in near real-time.

A home computer, to which the video captured by NANDeye can be sent on-line or off-line may execute processing intensive off-line video processing applications that may be a burden to execute by the phone, such as indexing and segmentation, and/or off-line video searches. The home computer may also serve as an archive and database of the system.

A battery changer for instantly replacing empty batteries in the NANDeye with fully charged batteries may be a small mechanical device that replaces batteries in the Headgear 102 without interrupting the operation of the system, without moving it from its position on the head and without requiring an eye contact between the user and the NANDeye headgear 102.

Figure 5:
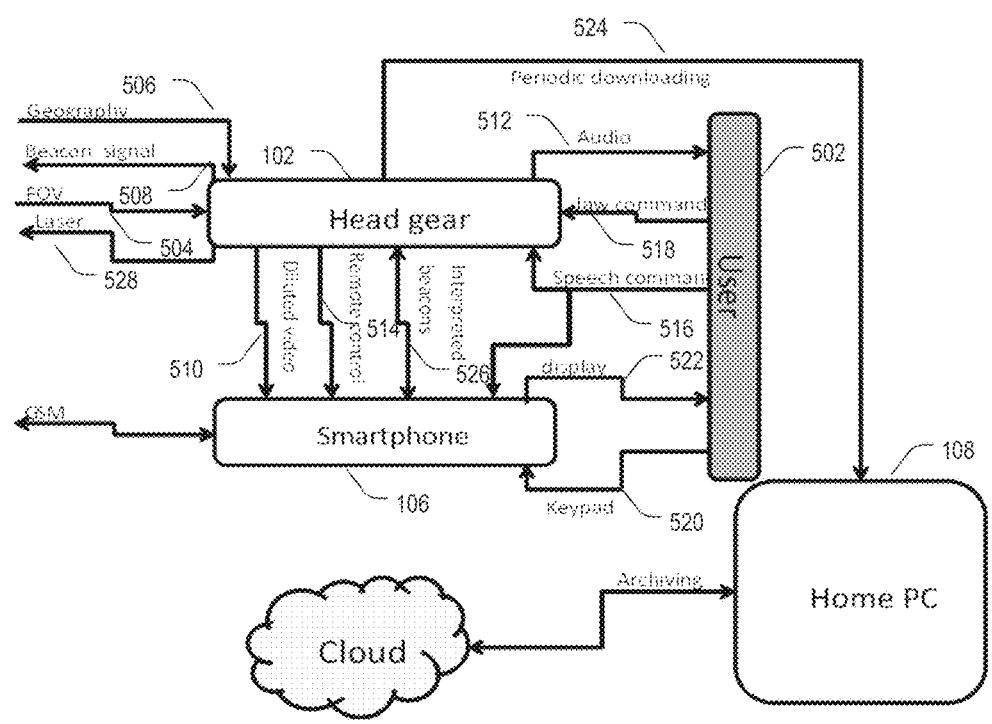
FIG. 5 is an illustration of a particular embodiment of components of system including a head mountable camera.

Subsystems may be functionally interconnected as in FIG. 5.

A user 502 wears the headgear 102 and the headgear 102 may be connected via Bluetooth to the user's phone 106. The headgear 102 cameras and microphone may cover an image and audio of a field of view 504. Geographical sensors (GPS, compass, inclinometer) may add a geo-data channel 506 to the audio and video. The user can adjust a pair of the cameras to cover scene streroscopically for a 3D video, or to alternatively stagger two fields of view thus approximately doubling the field of view in elevation or in azimuth. A beacon LED 508 on the top of the headgear 102 cockpit may light or blink when the cameras are on, such as to disclose to the environment that the user is recording. The user can calibrate the field of view (FOV) 504 of the camera to be aligned with the user's own field of view, so that the center of the user's FOV coincides with the center of FOV 504 of the system. While the stored video can be in high resolution and frame rate, the system may download in real time only a diluted video channel 510 (such as lowered resolution, or lowered frame rate, or video reduced to still images) to the phone 106, where video processing applications may be applied to process the video and to search the video content for items in demand, such as familiar faces or pre-defined label text. The diluted video and/or images may also be used as context for adjusting parameters of the camera:

If the scene is changing very fast, the user or the system software can instruct the headgear to increase the frame rate—either via the phone 106 or by a direct command to the headgear.

If the content (or the inclinometer) indicates that the user 502 is repeatedly nodding the headgear 102 up and down, such as to raise and lower the field of view 504 and look at objects that cannot enter the vertical field of view simultaneously, the phone 106 can instruct the headgear 102 to stagger the two cameras vertically and increase the field of view.

It should be noted that one or more parameters of the camera, such as focal length, shutter speed or frame rate can also be controlled, during operation, by the output of the headgear 102 sensors.

When one or more applications at the phone 106 have information to convey in real time to the user 502, the phone 106 may upload the information to the headgear 102 via the Bluetooth channel, where local earphones may play the information by artificial speech or by predefined sound effects into the user's ears (audio 512). When the user 502 has information to convey to his headgear 102, such as commands and/or parameters, the user may use phone 106 input channels (e.g., keypad 520, voice command) to input the information into the phone 106, and the phone 106 may interpret the commands and convey the user's command to the headgear 102 via the Bluetooth channel (e.g., remote control 514). The user 502 can also give simple speech commands 516 to the headgear 102 directly, and the headgear 102 may receive the speech commands 516 via a microphone, and may provide feedback to the user 502 via earphones. When the headgear 102 has information to convey in real time to the user, it can convert the information to artificial speech or to pre-determined tones and play them to the user via the earphones, or it can pass the information to the phone 106 and the NANDeye application on the phone will display it on the phone screen.

Another command channel between the user and the headgear 102, that does not require the user to use hands or to spell out audible tones, may include a jaw motion channel 518, where sensors on the headgear 102 can detect mandible motion and teeth clacking and may interpret the motion and/or clacking as mouse clicks according to a pre-defined symbolic language.

An alternative way of using audio energy produced by the teeth for controlling a computer is using one or more small mechanical clickers in the user's mouth that make loud mechanical noise, easily detectable through the cheeks. If clickers have different audio sound, the distinction between right and left click may be even further simplified.

Any or all of the recorded logs, including video, audio and metadata, may be stored in local flash memory on the headgear 102, and may be downloaded 524 to the user's home computer 108 when the headgear 102 is at home, such as overnight. Offline software on the home computer 108 may perform deep analysis of the recorded logs, segments, one or more of the recorded logs to individual episodes, and extracts useful information from the episodes.

The NANDeye system may include one or more families of software applications:

On-the fly processing firmware on the headgear 102

Calibration—NANDeye's cameras on the headgear 102 can be adjusted to be aligned with the user's field of view 504. As a casual placement of the headgear 102 on the user's head may not ensure proper alignment, calibration software may align the two FOV's in a manner that accommodates the condition that the user may not have a real time screen to compare what the camera sees to what the user sees. Using such calibration means each time the user moves the headgear (such as when the user combs his hair, wears a hat or moves the headgear to a more comfortable position), ensures that the NANDeye is always calibrated and can be used as a pointing device to the direction intended by the user.

Beaconing—NANDeye may have a clear visual indication to indicate that the headgear 102 is active in recording, in order to give the environment "a disclosure," such as to satisfy a legal or ethical obligation. A visual indication may be provided using a strong LED beacon 508 located at the top of the headgear 102 cockpit.

Emitted light may be modulated to optically transmit information that the wearer wishes to share with other NANDeye users. This optical signal can convey information to NANDeyes within line of sight, and the information can be decoded by dedicated application on the Smartphone of the recipient and a readable message can be displayed on the phone screen. Such a beacon-modulated message 526 may be referred to as a visual short message service (VSMS) message.

Beacons that are not relevant or not desired to users may be screened out by their location in the field of view of the recipient and the incoming signals around the relevant beacon may be filtered out.

VSMS can be indirect: beacons may transmit a short uniform resource locator (URL), which can be made of a very small amount of textual data (short URL). A user whose headgear 102 receives and decodes a short URL may access the URL via the user's phone 106 and see a message, such as including graphics, and/or including photo of the sender and any/or including other information that the sender wished to convey. If the users want to continue communication, the users may move to communicate via conventional channels such as texting or phone.

VSMS can also be direct: upon detecting a VSMS from a beacon, a user may raise his head and seek a headgear 102 (with a blinking beacon) in the FOV. If there is one, and it appears to the user to be interesting, the user may look at it, bringing the headgear 102 with the blinking beacon to the center of the user's FOV, and this centering may enable the user's headgear 102 to zoom on the specific beacon and get an enhanced quality signal while filtering out other beacons transmitting in the field of view. The headgear 102 may decode the message and display the message on the phone 106. The user can then react to the message.

A mobile phone framework may provide an infrastructure that enables interfacing between a phone 106 and headgear 102 using Bluetooth or other wireless networking technology. This infrastructure enables product manufacturers and other developers to develop a large variety of useful applications for personal assistance, entertainment, socializing, work efficiency, education, one or more other subjects, or any combination thereof.

A rich variety of third party applications may be developed by users and developers all over the world using the infrastructure.

NANDeye may include:

Two small video cameras, of the type and size used in mobile phones but with additional external lenses as the depth of the NANDeye camera is not limited to the small thickness of a phone, and can accommodate a longer optical path A strong beacon LED, possibly with a omnidirectional radiation pattern, to send a majority of emitted light to directions where other NANDeyes may detect the emitted light.

One or more patterned laser pointers 528, directed to a center of the field of view, marking a distinguishable pattern (like a cross or a circle) that can be captured by the video cameras and detected during off-line video processing software so that marked objects can be detected automatically during off line processing.

A battery based power supply may be integrated into or carried on the headgear 102. Other solutions—such as wired belt-borne battery may be alternately used.

Figures 6, 7:
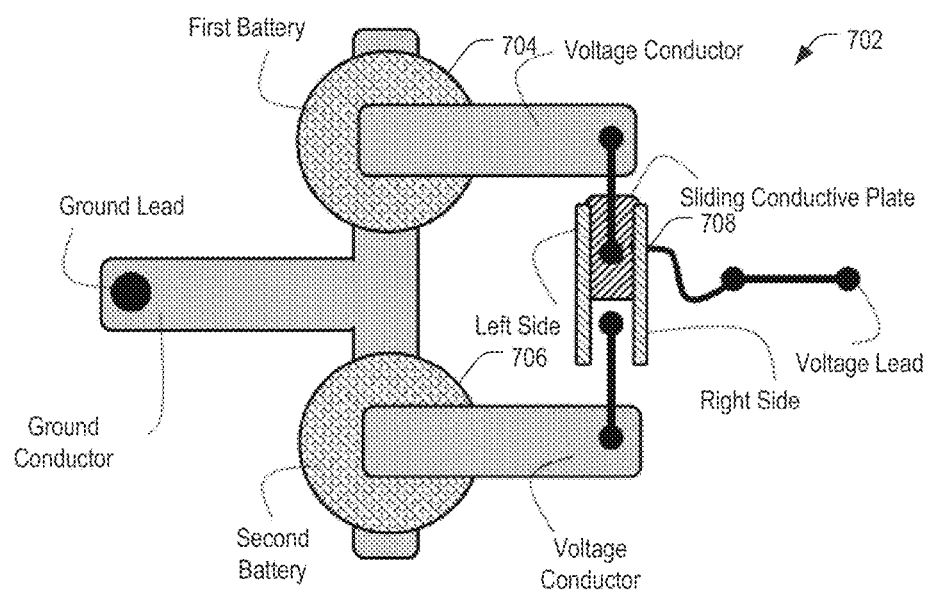
FIG. 6 is an illustration of a particular embodiment of power usage of various components of a head-mountable camera apparatus.
FIG. 7 is an illustration of a particular embodiment of a multi-battery power supply that may be included in a head-mountable camera apparatus.

FIG. 6 shows an example of values of illustrative steady power consumers in a NANDeye example. A typical rechargeable coin battery may have 110 milliamp-hours (MAH), and can provide sufficient power to operate NANDeye implementation (with dual-camera video recording, processing, and storing, etc.) for about one hour.

Figures 8, 9:
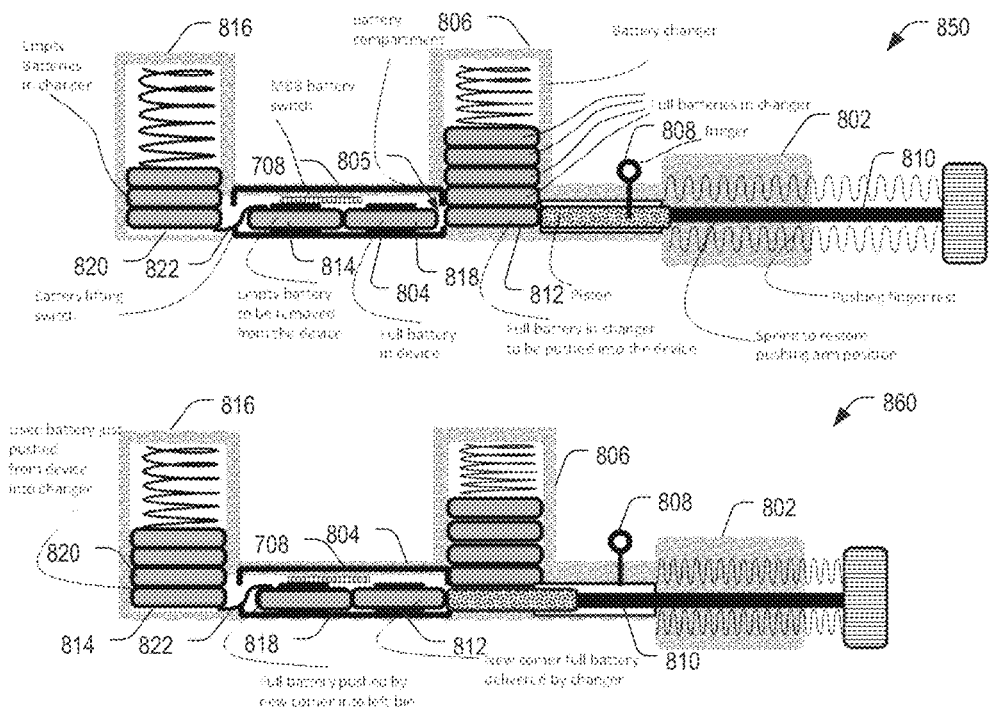
FIG. 8 is an illustration of a particular embodiment of a multi-battery power supply and a battery changer that may be used in conjunction with a head-mountable camera apparatus.
FIG. 9 is an illustration of a particular embodiment of memory usage of a head-mountable camera apparatus.

Powering the NANDeye without tethering it to a belt or a pocket of the user may enable enhanced mobility, comfort, and ease of use. Powering two cameras for many hours a day and powering a strong beacon LED and various sensors on NANDeye without tethering the headgear 102 to an external battery is illustrated in FIG. 7, that illustrates an example of a dual battery compartment or housing 702 that can hold two rechargeable coin batteries (704, 706). In the embodiment of FIG. 7, only one of the two batteries (704, 706) feeds NANDeye at one time (except in the short transient of switching between batteries). Switching between the two batteries (704, 706) connects the new battery to the circuit before the old battery is disconnected ("make before break"). The switching from one battery to the other can be done electronically and initiated automatically by the system, The switching between the batteries can also be done manually: When NANDeye detects that the current battery is low and alerts the user of low battery (e.g., once an hour) the user may activate a tiny switch 708 (see e.g., FIGS. 7-8) on the headgear 102, that switches the NANDeye to consume power from the second battery, providing the user another hour of uninterrupted operation. Any time within that hour, the user may physically replace the empty battery with a full battery. This may be done manually, and can also be done using a separate mechanical device as a battery changer 802, as illustrated in FIG. 8, containing a magazine 806 of full batteries. The user may mechanically cock the changer 802 (in his hand or inside his pocket) before bringing it to the vicinity of the NANDeye system, and then position the changer 802 on a special socket on the headgear 102, and pull a trigger 808. This operation can be designed to be done "blindly"—without an eye contact between the user and the socket. Upon actuating a mechanical trigger 808 on the battery changer 802, the cocked spring is released and instantly causes a pushing arm 810 to push one full battery 812 from the full battery magazine 806 into the NANDeye battery housing 804 having a chamber dimensioned to hold multiple batteries, pushing the empty battery 814 from the NANDeye out of the device, and collect the empty battery 814 that is ejected from the NANDeye, and add it to the "empty battery" magazine 816 that is designed to accommodate multiple batteries.

A mechanical battery-change process is illustrated in FIG. 8. The top illustration 850 is a cocked state, before pulling the trigger 808, and the bottom illustration 860 is a state after pulling the trigger 808.

The changer 802 may have two magazines to hold rechargeable coin batteries. One magazine 816 may be configured to hold emptied batteries, and one magazine 806 may be configured to hold full batteries. The magazines may be spaced to be positioned on the battery pair so that a (lowest positioned) full battery 812 of the changer, the full battery 818 of the headgear 102 in a first battery location in the housing 804, the empty battery 814 of the headgear 102 in a second battery location in the housing 804 and a (lowest positioned) empty battery 820 of the changer are in a row, almost touching each other. The changer 802 may include a piston 810 that can move along the line of that row and push the first battery in the row (a full battery 812 from the changer) into the housing 804 via an opening 805 to replace the full battery 818 of the headgear 102. The latter will then push the empty battery 814 of the headgear 102 to replace the empty battery 814 of the headgear 102 by the full battery 818 of the headgear 102. The latter will then attempt to push the last battery 820 in the row, but as there is a flexible strip 822 of low-friction material above it, the ejected battery 814 pushes the lowest battery 820 in the empty battery magazine up into the magazine 816 against a spring, and takes its place as a lowest-positioned battery in the empty battery magazine 816.

After replacement of batteries, the user may remove the changer 802 that now has one battery less in the full battery magazine 806 and one battery more in the empty battery magazine 816. The user may perform this replacement operation whenever the user gets an indication that the headgear 102 has switched itself from an emptying battery to a full battery. After the battery replacement (e.g., at the end of the day, or over-night), the user may put the changer 802 on a charger to re-charge the emptied batteries. A mechanical mechanism may enable rotation of the magazines so that the full, re-charged magazine will become the full charged magazine, and the emptied magazine that has delivered the full batteries during the day, will become the empty magazine for emptied batteries tomorrow.

In order to reduce or minimize the mechanical operations that the user performs to the headgear 102 while wearing the headgear 102, a spring operated cocking mechanism may allow the user to cock the changer 802 before the user does the replacement, so that the replacement is instantly and automatically performed by pressing or pulling a trigger 808.

Following the physical replacement of batteries in the headgear 102, the system may electronically switch between the batteries, so that consumption (that has been earlier switched to the full battery) is switched back to the same battery in its new position, leaving the newly fed battery full and waiting for its turn.

The operations of switching to the full battery and mechanically changing a battery need not happen at the same instant and may depend on the context and circumstances. Note that if the user has an opportunity to perform the mechanical exchange while the current battery is still enduring, NANDeye may be configured to not electronically move to the new battery and may instead exhaust the old battery first.

The battery changer 802 can be configured to transport batteries from the full-battery magazine to the empty-battery magazine directly, so that if the day ends with some full batteries left in the full-battery magazine, they can be moved to the empty-battery magazine so that after the charging, there will be one full magazine with full-batteries, and one empty magazine. Alternatively, the charger may be normally used over the NANDeye to keep replacing batteries until the full-battery magazine is empty.

Mechanical and electromechanical components of NANDeye may be embedded in the headgear 102. The battery changer 802 and the battery changer charger may be external to the headgear 102.

The headgear 102 may include a microphone. A NANDeye microphone can be implemented using state of the art technologies for enhanced voice filtering and pick up speech of the user in addition to and voices from the environment. Alternatively, there can be multiple microphones, such as two microphones, symmetrically positioned on both headgear 102 arms, one configured to pick up only very close speech, and the other configured to pick up voices from any distance. This allows NANDeye to serve both cases where the environmental sounds are a part of the interesting scene (recording a conference room) and cases where the environmental sounds are noise (recording a narration by the user of the field of view). Using two microphones can also enable the filtering of near sounds (from the user) to far sounds (from other sources) by referring to the phase difference of the audio signal received in both microphones.

The headgear 102 may include a cheek motion sensor. NANDeye may provide two cheek motion sensors, resting on the user's cheek below the user's ear, slightly behind the user's temples. The cheek motion sensors may be configured to pick up simple jaw-gestures-commands given by a user opening and closing the user's mouth, due to the motion of the lower jaw forward and/or backwards. Such gesture can be interpreted as a "mouse click" and allow the user to give simple commands to the system without using hands and without using audible voices—such as in a concert or in a small meeting, where voice is not politically correct. Such sensors can also provide physiological information that the user may want to log such as an amount and rate of chewing that the user performs during different parts of the day, as another example, and possibly medical conditions such as "dropped jaw" as another example.

The headgear 102 may include two earphones that may be similar in design and packaging to cap-less music earphones.

The headgear 102 may include a solid state accelerometer, a solid state compass, a solid state inclinometer, one or additional sensors, or any combination thereof.

The headgear 102 may include a head-top stress sensor to monitor the bending-moment on the arc of the headgear 102 below the cockpit. This may be a sensor embedded under the center of the hairband. A head-top stress sensor can be an alternative to the cheek sensors, as a head-top stress sensor may detect stress of the hair band under widening (e.g., stress due to the hairband expanding) due to a lower jaw motion. Some embodiments may include cheek sensors or a head-top sensor without including both types of sensors.

NANDeye may include the following electronic modules—a power regulation and distribution module, a processor for some real time on board calculations, random access memory (RAM), and flash storage. Very large flash memory of hundreds of Gigabytes can be used for logging full video activity, using high definition and dual cameras. An example of a memory budget estimate is illustrated in FIG. 9.

Mass storage can be implemented by embedded storage or by memory cards. NANDeye can be configured to work with both embedded memory and memory cards.

NANDeye may be configured to be water resistant and protected from dirt and dust. For example a user may accidently wear a NANDeye into a shower, a pool, or in very dusty areas. Embedded memory enables a sealed package to enhance water and dust protection.

NANDeye video logging using multiple cameras at high resolution may cause wearing of a memory, such as a flash memory, and with heavy use a flash memory may be replaced during a lifecycle of the device. Memory cards simplify memory replacement by a user.

In terms of commercial contracts, delivery of flash memory as stand-alone card products may provide enhanced simplicity as compared to delivering flash memory as an internal component.

A sample implementation can include a well-designed waterproof compartment for several memory cards, spread along the legs of the headgear 102.

A Bluetooth communication module may be included to connect the headgear 102 with the mobile phone 106 of the user.

A LED driver and encoder may be included for providing encoded current to a beacon LED, that can be a white LED or a color LED.

As NANDeye may be not visually accessible to the user during operation (the headgear 102 outside the user's field of view), in an embodiment the headgear 102 may preferably not have its own display and keyboard. A user's phone 106 may instead serve as a main human interface for the system. As used herein, a "field of vision" or "field of view" of a user may correspond to a portion of the user's environment that is within (or can be seen by) the user's eyesight without changing an orientation of the user's head. For example, a field of vision for each of the user's eyes may extend from approximately 60 degrees inward (toward the user's nose) from the vertical meridian of the eye to approximately 100 degrees outward (away from the nose) from the vertical meridian, and approximately 60 degrees above and 75 below the horizontal meridian. As another example, a field of vision for each of the user's eyes may correspond to 60 degrees inwards and outwards from the vertical meridian and 20 degrees above and below horizontal. A field of vision for both eyes can correspond to the combined field of vision of each eye (e.g., extending from approximately 100 degrees from the left of straight ahead (e.g. eyes forward toward a point on the horizon) to approximately 100 degrees to the right of straight ahead, and from approximately 60 degrees above the horizon to approximately 75 degrees below the horizon).

One application of NANDeye is "life blogging"—with enhanced convenience of automatic indexing, while maintaining richness and reliability.

NANDeye may provide a significant added value to life blogging: While digital audio and video recorders may be used for documenting meetings, digital audio and video recorders are typically passive in handling the raw recorded material off-line. NANDeye may include an off-line video analysis PC software configured to receive—e.g., on a daily or weekly basis—an upload of a video log of a user, and process the uploaded video log, (e.g., overnight processing). FIG. 10 illustrates a list of functions that may be performed automatically.

The user may "bookmark" points and moments of interest while recording. The bookmark can be useful to the off-line processing software and can indicate a point in time and may also indicate a direction.

One example is a time-only mark, where a user may mark (e.g., bookmarks) the start and the end of a selected segment in time.

Another example is a time and passive direction mark, wherein a user may gaze in a direction of a selected object, and mark time and direction. Direction may be logged through geodata, such as via a GPS, compass, an inclinometer, one or more other sensors, or a combination thereof. The user may identify a relevant item in the video image, or off line software may be configured, using pattern recognition methods, to identify an object that meets some search criteria at the center of the field of view (FOV). For example, the user may see an interesting piece of clothing in a shopping window and may want to find out about the clothing when the user is at home.

Another example is pin-point marking, where a user may turn on a laser pointer of the headgear 102, direct the laser pointer to a selected item and provide an input command to mark this video segment as a "pin-point". An identifiable light pattern of the laser pointer will appear on the object(s) in the field of view. The user may tilt and pan the user's head to position the pattern on the object of interest or to draw a frame around it. If the object of interest is an area (such as part of the text of a large sign), the user can loosely loop the pattern around the area. Upon off-line processing, pattern recognition software may automatically detect the unique light pattern and use the detected light pattern to recognize the item pointed-at by the user. NANDeye may use a pair of laser pointers configured to emit a (substantially) parallel pair of patterned images. The distance between two parallel patterns is not dependent upon distance from the user. An angular distance between the two patterns, that does linearly depend on the distance to the object, can serve as a measure of the distance between the user and the object.

Bookmarking in NANDeye enables off-line software find the interesting and important items in the video log, as designated by the user.

A bookmarking feature may be applicable where the user misses the real starting moment of an event, but can estimate how long ago (before the user started the bookmarking) the starting point of the event happened. A typical example is this: the user sees an episode that turns out to be worth logging. By the time he marked this moment to be a bookmark, he missed about 10 seconds. He wants to indicate to the system, that the real starting time of the bookmark should be 10 seconds before the bookmark. He has to wait approximately 10 seconds and click the bookmark indication again. And then, when the episode is over, he has to click the bookmark indication for the third time. The system will take the time between the first and the second indication and will advance the starting of the bookmark by that amount. If the times of the three indications are T1, T2 and T3—the book mark will be set to last from T1−(T2−T1)=2*T1−T2, to T3. An example is illustrated in FIG. 11. The user can decide that the user wants to bookmark a time window and may give the NANDeye system a command 1102 to start bookmarking, and then to stop bookmarking. If the user is somewhat late to catch the moment so that when the user gives the instruction to bookmark and event, the event is already in progress, the user may instruct the system to extend the bookmark to before the real starting point.

In other words, a way is to estimate how many seconds ($t_{advance}$ 1104) the user wants to add, then wait until the user estimates that $t_{advance}$ 1104 seconds have passed since the first bookmark instruction 1102, and then give a second signal 1106 to the system, then wait until the event is over and give a third signal 1108 to the system to terminate the bookmark. The off line software, in response to finding the three marks on the time line, may start the bookmark $t_{advance}$ seconds prior to the designated starting point, to "back up" the starting mark to the actual start 1110 of the bookmarked event 1112 in the video log.

An alternative method to give a controlled advance to a bookmark includes telling the system, while the bookmark is on, that the user wishes to add X seconds to the current bookmark, where X is a number.

NANDeye may include a mechanism to help users respect the privacy of subjects that prefer not to be video-recorded. For example, in a private place where a proprietor of the private place does not allow video logging, one or more methods may be used to convey a "no photography please" request to NANDeye users. For example, a sign may be posted with an icon 1202 such as in FIG. 12, which may be standardized. NANDeye processing software may be configured to recognize the icon 1202 in the raw video and to automatically locate and automatically delete relevant segments or delete an entire video segment. A "no photography please" sign can include a barcode part that is more easily machine detectable. The limits of the segment to be removed can be derived from a discontinuity in the video cut, or from the physical distance of the NANDeye from the area where the icon was recognized.

Another example includes installing beacons (stationary or mobile) that blink to transmit a code indicating "no photography please". Such beacons can be detectable and decodable by NANDeye and may cause the NANDeye to respond in a manner similar to as described with respect to the icon 1202 of FIG. 12. The beacon on a user NANDeye can serve as a "no photography please" to indicate that the bearer of this NANDeye asks not to record him on video.

Private places that do not allow NANDeye recording may be able to transmit a weak, safe radio signal that can be picked by the NANDeye headgear 102 or by the user's phone 106, indicating that the user is in a range of "no photography". NANDeye may be configured to indicate to a user of a NANDeye detecting the signal that the area is designated as "no photography". NANDeye may be configured to automatically avoid logging or to ask for the user's instruction whether to continue video logging or to refrain from video logging. The user may decide that the designation is not acceptable and to proceed with logging what the user sees.

People who do not want their image taken may be able to announce to their environment that they do not want their image taken by encoding their own beacon to send out a code (e.g. a standardized message) indicating "please do not record my photo". A NANDeye user may not be obligated to comply with the request. For example, a NANDeye user may decline to comply with a request while in public places. However, if the NANDeye user wants to comply, the user can set NANDeye to automatically blur the immediate proximity, in the video image, of people who broadcast their wish not to be photographed. The blurring can leave the beacon signal itself clear and visible, while blurring the area under it which is typically the face of the bearer. If the user configures the user's NANDeye to operate in such a "complying" mode, the user's video generated by the complying NANDeye may be accordingly watermarked. Video publishers such as YouTube can be configured to condition their acceptance of material on the presence of such a watermark or indication, so that video that was not recorded in the compliant mode will not be published.

NANDeye may be configured to record only things that the user sees (or is capable of seeing) with the user's own eyes to protect the user from concerns of illegal eavesdropping. The NANDeye system may have an optional mode in which the NANDeye system does not record video unless sensors of the NANDeye indicate that the headgear 102 is worn by a user.

The NANDeye cameras may have several user-adjustable parameters. These parameters may be controllable while shooting (i.e., capturing video data and/or still image data via one or more cameras), and different parameters may be provided to each of multiple cameras of the NANDeye headgear 102 while shooting. NANDeye may be configured to automatically control these parameters based on preliminary processing of received video data or still image data from one or more cameras. FIG. 13 illustrates an example of a table that includes some examples of adjustable parameters and sources of information for adjusting the parameters automatically.

The field of view may be calibrated to provide co-linearity between the direction to the center of field of view (CFOV) of the user and the direction to the CFOV of the NANDeye. However, NANDeye cameras are configured to work without a screen (i.e., a user may not have access to view video in real-time). Some applications of NANDeye may include communicating precise pointers to an object between the user and the NANDeye. In some embodiments, NANDeye is not anchored or bolted to the user's skull and may therefore be misaligned or shifted during the day—accidently or deliberately, creating a miss-match of between the NANDeye and the users CFOV.

Calibration between the two CFOV's, without using a screen, can be performed using an object that is easily detectable by both the user's brain and the NANDeye's real time software, such as a "balanced corner". FIG. 14 illustrates an example of performing calibration using a balanced corner.

Image A 1402 in FIG. 14 shows an arbitrary structure that has several corners. Some of the corners can be called "balanced corners" and are corners between three (substantially) orthogonal planes, typically two walls and a ceiling or a floor. Rectangular rooms have 8 "balanced corners"—4 at the floor and 4 at the ceiling. The user can move to a position from where the three edges that define the corner are seen as three rays coming out of a common vertex: one goes straight up or down, and the other two seem in the image to make approximately a 120 degree angle to the vertical ray. In the center of image A 1402 there is a balanced corner 1404 (made of the roof of the patio and the two walls above it). A balanced corner may be easy to detect by image processing, and in typical urban scenery, a user may easily bring a balanced corner into the center of the user's field of view. The user may focus his CFOV on such a balanced corner and activate the calibration function. When activated, NANDeye takes snapshot of its FOV, and seeks a balanced corner in the "heart" of the image. See image B 1406 of FIG. 14. As NANDeye may be off-calibration, NANDeye may not find a precisely aligned balanced corner at the precise center of the image, but the NANDeye will find an almost balanced corner (one ray almost vertical and two other rays almost 120 degrees away) almost at the center. If the NANDeye software finds a single candidate, the NANDeye software may automatically calculate a correction vector, correcting the roll, pitch and yaw angles of the NANDeye to match the user's point of view. In image C 1408 of FIG. 14, NANDeye and the user are aligned via a pivot correction offset vector 1410 and a pivot correction angle 1412, and the user can point objects to NANDeye by just looking at them. Note that upon calibration the user does not need to move the NANDeye physically to align the CFOV's—the NANDeye software can note direction of the user's CFOV on the system's FOV and refer to that direction as CFOV.

In conventional three-dimensional (3D) imaging, there are two cameras sharing the same field of view, giving an additional dimension of depth. NANDeye may be configurable to operate in a 3D mode to enable 3D recording or to operate in one or more other modes where diversity of two functional cameras can be used for other purposes, giving NANDeye features not available in conventional cameras. FIG. 15 illustrates coverage of a field of view in a 3D recording mode. When a user does not desire 3D recording, the overlap between the two fields of view 1502, 1504 may be an inefficient use of pixels and energy. NANDeye may be configured to tilt one of the cameras a little upwards, and one of the cameras a little downwards, and produce the field of view shown on FIG. 16. The combined field of view of the two fields of view 1602, 1604 in FIG. 16 almost doubles the vertical coverage of the cameras as compared to FIG. 15. Alternatively, the horizontal field of view, rather than the vertical, may be increased. In this case, orientations of two cameras may be panned out to produce a panoramic field of view.

Figure 17:
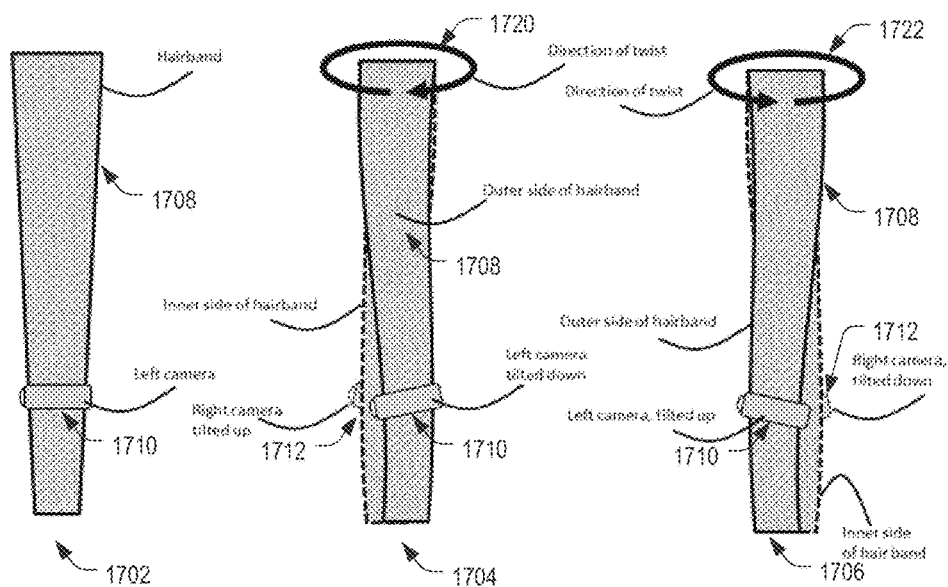
FIG. 17 is an illustration of a particular embodiment of a head-mountable camera apparatus in a stereo mode and in multiple vertically extended field of view modes.
Figure 33:
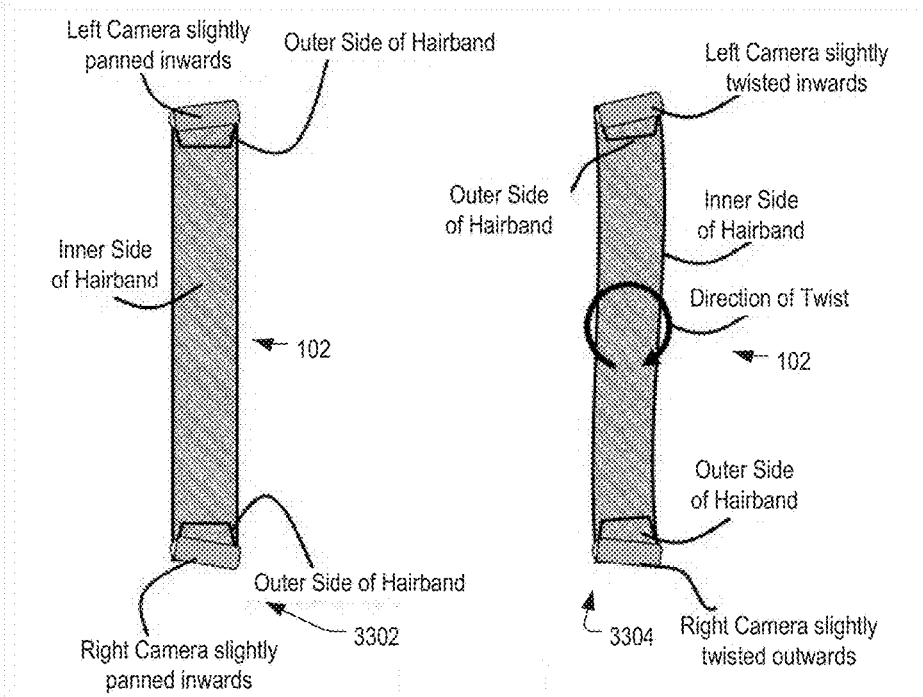
FIG. 33 is an illustration of a particular embodiment of a head-mountable camera apparatus configured in a stereo mode and an extended horizontal field of view mode.

If the NANDeye is implemented without pedestals, gimbals and motors, such embodiment of the present invention teaches a method to tilt each of the two camera to a different elevation and azimuth while the headgear is formed of a single injected plastic chassis. In such an implementation the tilt of the cameras from their default position may be based on the elasticity of the plastic. FIG. 17 illustrates an embodiment of the headgear 102 in a stereo mode 1702, a first increased view of view mode 1704, and a second increased field of view mode 1706. The headgear 102 includes a hairband 1708, a left camera 1701, and a right camera 1712. In the stereo mode 1702, the cameras 1710 and 1712 are substantially aligned. In the first increased field of view mode 1704, the headband 1708 is twisted according to a first direction of twist 1720 and as a result the left camera 1710 is tilted downward and the right camera 1712 is tilted upward. In the second increased field of view mode 1706, the headband 1708 is twisted according to a second direction of twist 1722 and as a result the left camera 1710 is tilted upward and the right camera 1712 is tilted downward. As illustrated in FIG. 17, a horizontal twist (about a vertical axis) of the cockpit of the headgear 102 causes the two trunks of the headgear 102 to elastically distort and causes one of the ear parts to tilt downwards, tilting the attached camera downwards, and the other ear part to tilt upwards, tilting the attached camera upwards. For automatic operation, an electromagnet mechanism may switch the cockpit between a "normal" (e.g., 3D or stereo recording) state and a "twisted" state (e.g., vertically extended field of view). An example of horizontal field of view adjustment via distortion caused by a twist at the cockpit is illustrated in FIG. 33.

Figure 18:
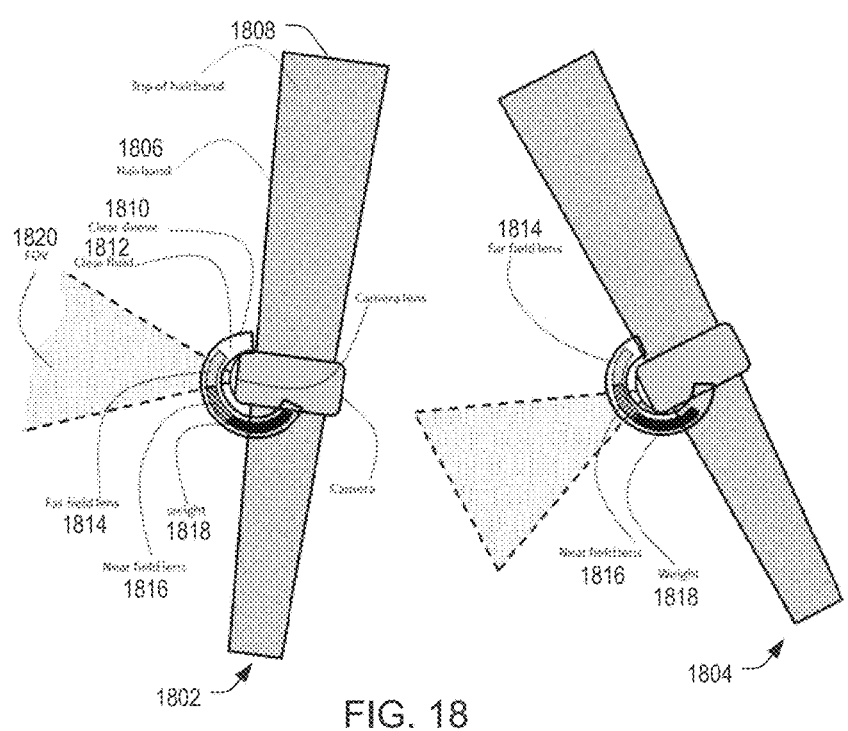
FIG. 18 is an illustration of a particular embodiment of focal distance adjustment of a head-mountable camera apparatus.

Frequently, distance to an object in the field of view is correlated with head tilt. For example, when a person looks straight ahead, the person is typically looking at objects in the far field of view. When a person is looking down, the person is typically looking at objects in the person's hands or on a desk (or counter, table, etc.) in front of the person. Conventional multifocal eyeglasses may are typically designed so that the focal distance at the lower part of the lens is short, and the focal distance at the higher part of the lens is far. NANDeye may have a multifocal lens that to adjust the camera for close focus at low tilt, and for far focus at eye level and up. One implementation may be to use gravitation in a way similar to the way baby-dolls close their eyes when laid back and open them when help upright. An example of such a mechanism is illustrated in FIG. 18. FIG. 18 illustrates a particular embodiment of the headgear 102 in a first focus condition 1802 and a second focus condition 1804. The headgear 102 includes a hairband 1806 having a top 1808 that extends over a user's head. A far field lens 1814, a near field lens 1816, and a weight 1818 are in a sleeve 1810 that is positioned in front of a camera of the headgear 102. The sleeve 1810 may also include a clear fluid 1812. The sleeve 1810 is curved to enable the weight 1818 to remain in a lowest position of the sleeve 1810 as the sleeve 1810 and the camera change tilt, maintaining a positioning of the lenses 1814-1816 and enabling the camera to change it's FOV 1820 to include the far field lens 1814 or the near field lens 1816 based on an amount of tilt of the camera. In the first focus condition 1802 the camera is tilted at slightly above horizontal (e.g., to view a distant object) so that it's FOV 1820 intersects the far field lens 1814. In the second focus condition 1804 the camera is tilted below horizontal (e.g. to view an object on the user's desk or read a book) so that it's FOV 1820 intersects the near field lens 1816. A difference between the two lenses illustrated in FIG. 18 can be changing the focal length, or changing the width of the field of view.

Depth of field may be increased in NANDeye systems even through a user may not have a screen to view real-time video and therefore cannot make a real time quality control or focus adjustments. NANDeye may enable setting of the focal lengths of separate cameras to different distances with a small overlap. A result may include two independent video streams that can be either alternatively selected by the offline software according to the object of interest, or integrated frame by frame into an "always in focus" video clip.

Frame rate diversification may be provided by NANDeye. In conventional 3D cameras, each frame is created by both cameras in synch to be combined to form a single 3D frame. In NANDeye, if the system is operating in a 3D mode to take 3D video, then both cameras may run in synch at the same frame rate. However, sometimes the user may indicate that 3D imaging is not important for him or that another mode of operation is to be used.

Figure 19:
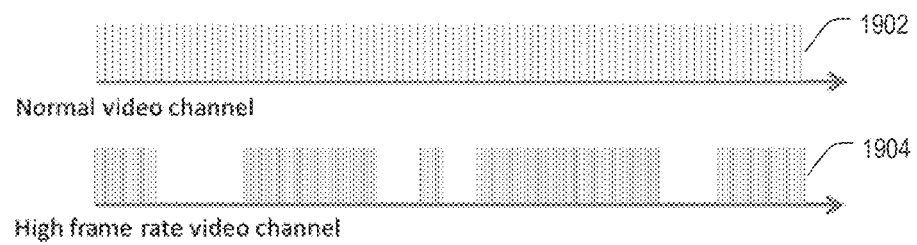
FIG. 19 is an illustration of a particular embodiment of asymmetrical frame rate data of a head-mountable camera apparatus.

When the two cameras of a dual-camera NANDeye implementation are not used for stereo imaging, one of the two cameras may be used to capture short instances of high frame rate segments. It may happen that the user wants to capture short segments of the scene in a high frame rate. If the camera is limited by channel bandwidth (and not by CCD sample rate) or if the user can provide strong illumination and shorten the CCD shutter time, or if there is enough ambient light for shorter a shutter time—than a more efficient use of the given bandwidth may be to run one camera at a normal frame rate (a normal video channel 1902), and to run the other camera in bursts of high frame rate (a high frame rate video channel 1904), such as illustrated in FIG. 19. Off-line software can then put one ore more bookmarks with the constant speed video to indicate instances where the high frame rate channel is available. When the high frame rate channel is selected, the high frame rate channel may be provided to a viewer in slow motion. The two channels 1902, 1904 may appear as seen in the time chart illustrated in FIG. 19. Another reason to change the frame rate may be energy economy. As writing each frame to memory, such as to a flash memory, is power consuming, a reduced frame rate can provide extended battery life. However, because interpreting beacon information may use a high sampling rate of the FOV, when an active beacon is detected, an increased frame rate may be used.

Figure 20:
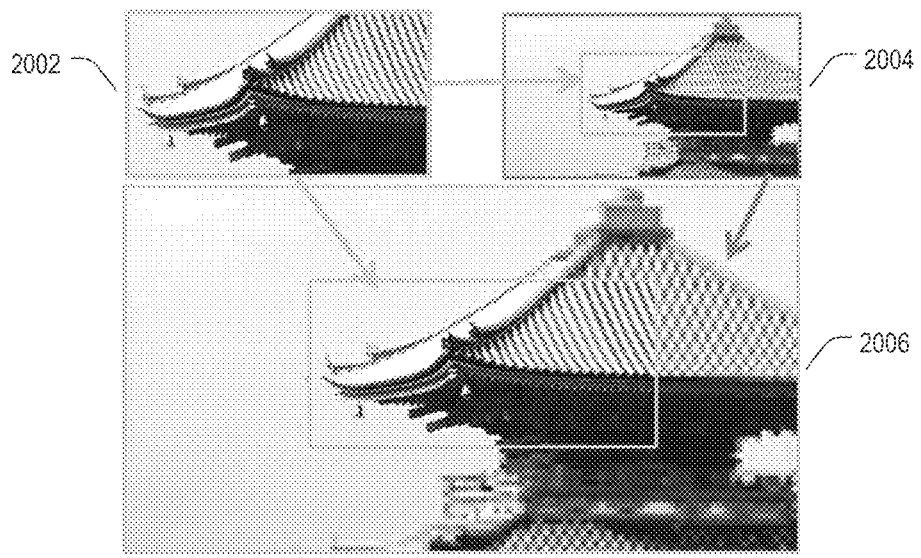
FIG. 20 is an illustration of a particular embodiment of asymmetrical focal length operation of a head-mountable camera apparatus.

Zoom and resolution diversification may be implemented in NANDeye. Conventional photography may be subject to a trade-off between high resolution and wide field of view. Conventionally, to magnify an interesting part of an image, a field of view is narrowed so that the frame keeps the same number of pixels. NANDeye may enable operation in a mode that provides non-uniform resolution by setting both cameras (in a dual-camera implementation) to the same central field of view, but set one camera to a strong zoom and a narrow field of view (telescopic) 2002, while setting the other camera to a low zoom and a wide field of view (panorama) 2004. Off-line processing can merge both channels into one 2006, enabling a viewer to zoom in and maintain good resolution around the center of the field of view and to zoom out to see a wide field of view, as illustrated in FIG. 20. In some implementations, optical zoom can be changed by insertion of external lens in front of the camera.

Spectral coverage may be varied among NANDeye cameras. In conventional 3D cameras, both cameras have similar charge coupled device (CCD) arrays and cover either the visible light spectrum or the near infrared (IR) spectrum. In NANDeye, one of the cameras is enabled to be narrowly filtered to substantially match the color of a beacon LED. Such filtering may produce an image that enables efficient detection (e.g., with a low signal-to-noise ratio) and demodulation of one or more beacons in the field of view, while also producing a flat (e.g., almost monochromatic) general image of the field of view, usable to determine depth of objects when compared to the other, wide spectrum camera as a stereo pair. An example of two images, one image 2102 narrowly filtered to detect beacon LEDs and the other image 2104 wide spectrum, are illustrated in FIG. 21.

NANDeye may implement one or more forms of user interface. As NANDeye may be worn by a user many hours a day, a user interface by which the user can command NANDeye and change NANDeye parameters of operation may be convenient for use by the user. For example, a user interface may include one or more switches and/or controls on NANDeye headgear 102, a voice interface for a user to give NANDeye voice commands, a visual interface (i.e., via one or more of the NANDeye cameras) for a user to give NANDeye visual commands (e.g., hand gestures in front of the camera), and an interface to allow a user to communicate with NANDeye via the user's phone 106.

Various user interface types ("channels") may be implemented in NANDeye's infrastructure, and application developers may be able to select an appropriate channel for each particular application. FIG. 22 illustrates an example of a table listing basic advantages and possible 'typical' uses of various channels.

NANDeye may further be configured to receive commands via a jaw-movement based interface to provide a nearly-instant and hands-free mechanism to enable the user to control applications on NANDeye while in motion, with occupied hands, or when speech is disallowed or undesired (e.g., concert halls, libraries).

When a person lowers the person's mandible, two jaw bones (called "condyles") move forward slightly under the person's temples, illustrated by the two arrows 2302 in FIG. 23, showing the direction of motion. By moving forward, these bones are slightly, but detectably, widening that part of the person's face. This widening can be felt via two fingers placed under the temples while the jaw is lowered and raised. This area of widening may be located beneath the NANDeye headgear 102 and may spread the NANDeye headgear 102 as the user's face widens beneath the headgear 102. Such widening can be sensed in two places using a very small and inexpensive piezoelectric strain sensor.

As one example, if the hair band is flexible, then this strain can be sensed at the top of the headgear 102, where the stress at the tips of the band causes the bow of the band to increase its radius of curvature. As another example, if the headgear 102 is stiff, then the stress can be detected by a sensor, or even a soft microswitch, right below the temple just in front of an earphone.

A user may easily train to activate such as sensor or switch and to provide commands to NANDeye via the resulting quick, reliable, hands free, silent command interface. Such an interface (a "mandible switch") can deliver a variety of information, such as Left, Right, Down, Up, Left then right, Right then left, Left and right clicks, one or more other patterns or sequences, or any combination thereof.

NANDeye may be configured to distinguish between a "left click" and a "right click" corresponding to a teeth clack with a contact microphone. A left clack and a right clack (of a user's teeth) may be detected by using a left cheek contact microphone and a right cheek contact microphones and comparing the amplitude and the time of arrival (TOA) of the clack signals at both microphones.

NANDeye may be configured to help a user find an item in the user's field of view. If the NANDeye processor knows a location (e.g., has stored data representing a location in a 3-dimensional coordinate system) of the item and also the location of the NANDeye (e.g., via GPS) and the direction the user is looking (e.g., via a compass) and the tilt of the users head (e.g., via an inclinometer), the NANDeye can determine an angular gap between the center of the user's field of view and the item. This enables NANDeye to provide the user with simple audial feedback to move the user's head to bring the desired item to the center of his field of view. An example application of such item locating capability may be where the distance between the user and the item is large, and outdoors with unobstructed GPS reception, such as for tourism, military navigation, tracking, homeland security, etc.

Audial feedback may be provided by one or more earphones of the NANDeye. For example, right ear signals may refer to azimuth (left and right) and left ear signals may refer to tile (up and down). Ascending chirps may refer to "Increase" and descending chirps may refer to "decrease". An amplitude of the chirp sound (e.g., loudness) may represent error size (e.g., how far the user's CFOV is from the item). When a user looks head-on at the item, left-ear chirps and right-ear chirps will fade down to silence. An example of such a mechanism is illustrated in FIG. 24.

Figure 24:
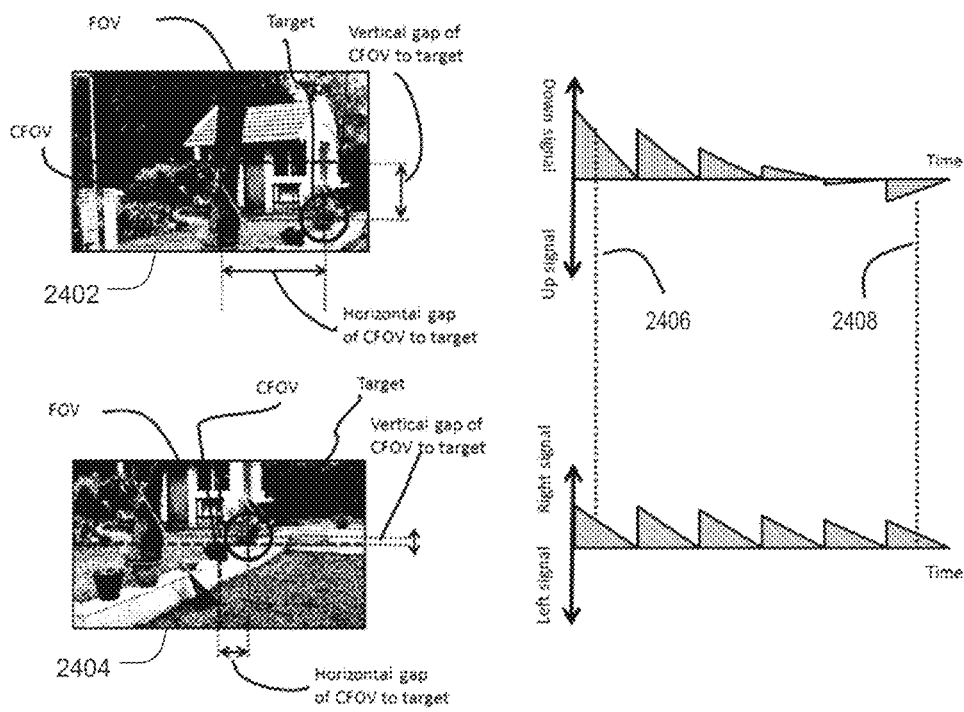
FIG. 24 is an illustration of a particular embodiment of camera image and corresponding audio signals of a target locating operation of a head-mountable camera system.

FIG. 24 illustrates a first FOV 2402 of a NANDeye at a first time 2406 where a target 2410 is offset from a center (CFOV) 2416 of the first FOV 2402 by a first horizontal amount 2412 and a first vertical amount 2414. A first audio signal 2430 (e.g., in the user's left ear) may provide a series of descending chirps indicating that the target 2410 is vertically lower than the CFOV 2416. A second audio signal 2440 (e.g., in the user's right ear) may provide a series of descending chirps indicating that the target 2410 is to the left of the CFOV 2416. In response to the signals 2430 and 2440, the user may shift the FOV 2402 to the right and downward.

As the user shifts the FOV from the first FOV 2402 to a second FOV 2404, the downward chirps of the first audio signal 2430 reduce in amplitude, become silent, and are followed by upward chirps, indicating that at a second time 2408 the target 2410 is above the adjusted CFOV 2420 by a second vertical amount 2424. The downward chirps of the second audio signal 2440 reduce in amplitude, indicating that at the second time 2408 the adjusted CFOV 2420 is to the left of the target 2410 by a second horizontal amount 2422 that is smaller than the first horizontal amount 2412.

Where on-line video processing is practical, indoors and short distance applications may use the laser pointer trace as indication of where is the user looking at.

NANDeye may support integrated FOV of multiple cameras. One of the uses of the encoded beacon on NANDeye is to enable users to identify other NANDeyes that are viewed by their own cameras. This may be accomplished while maintaining privacy such that the encoded beacons do not disclose the identity of the user. A social eyewitness network may allow voluntary subscription by users. The social eyewitness network may be implemented so that only a server of that network can relate an encoded beacon with a user can route off-line messages between users. As a result, a user in need of an eyewitness or court evidence, as illustrative examples, may search for recorded video from users that were at the right place, at the right time, looking at the right direction, and logging the event from their point of view.

Figure 25:
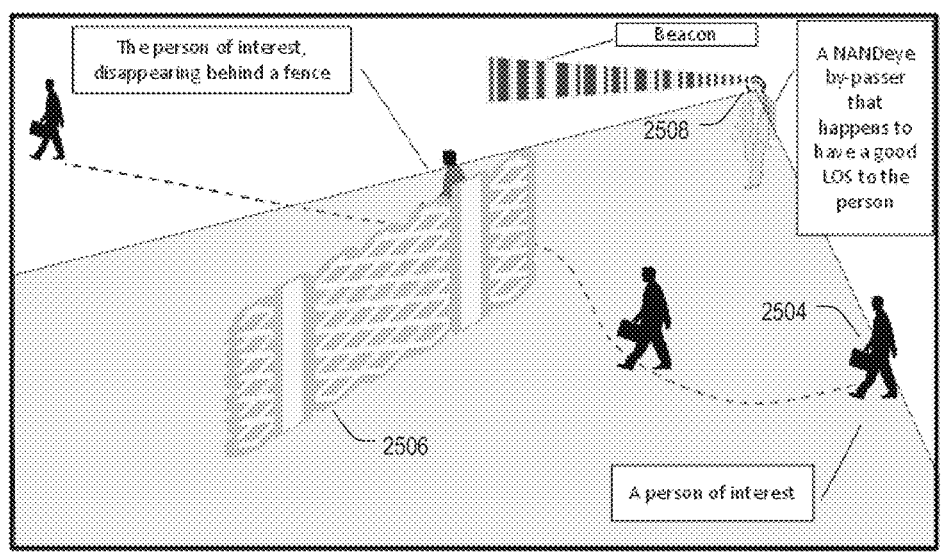
FIG. 25 is an illustration of a particular embodiment of a scenario where a head-mounted camera system having an interrupted line of sight to an object records a second head-mounted camera system having an uninterrupted line of sight to the object.

One of the uses of a social eyewitness network may be to enable a user to access video logs of other users and to use the video logs of the other users as "eye witnesses" in a time and place of interest. FIG. 25 illustrates an example of a situation where a social eyewitness network may be used.

Figure 28:
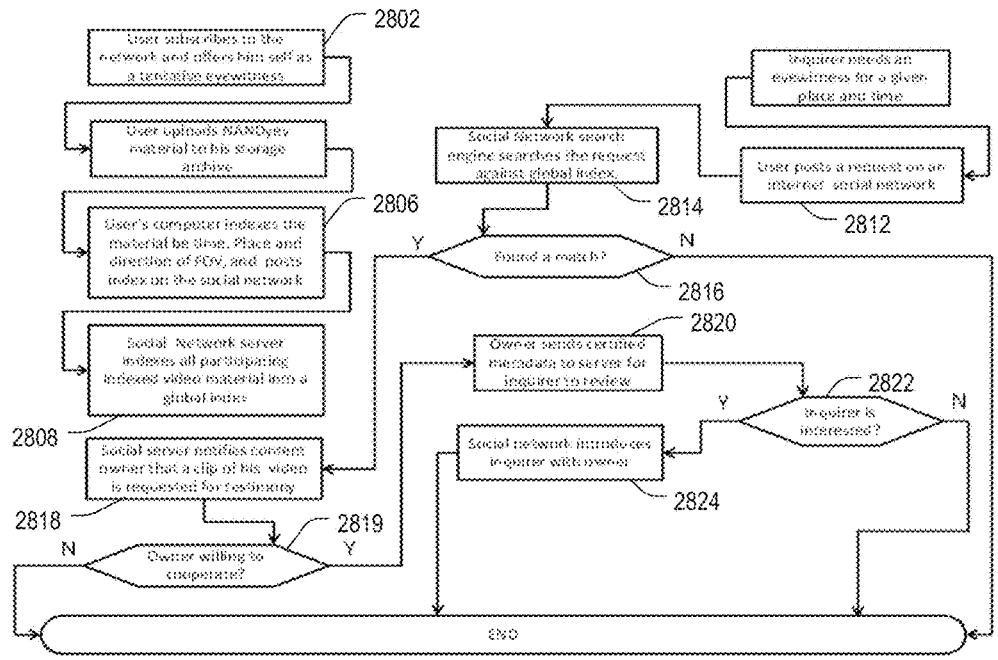
FIG. 28 is an illustration of a particular embodiment of a flow chart of a method of handing a request for video data at a server.

The illustration of FIG. 25 shows the field of view 2502 of a NANDeye user. In looking off-line at a part of the video, the user may notice an interesting, or suspicious, or attractive person that the user earlier saw (and perhaps did not notice). The user wishes to follow the person of interest through the video. Unfortunately, the person of interest 2504 walks around a tall fence 2506 and becomes hidden from the user. The user seeks another NANDeye in the field of view, and finds a second NANDeye user 2508 that the user does not know, but that stood in a position where the second NANDeye user had a line of sight with the person of interest 2504. The server described with respect to the social eyewitness network may enable the user to make contact with the second NANDeye user 2508 and/or to get a relevant piece of video data recorded by the second NANDeye user 2508, in a controlled, automatic process without compromising the privacy (e.g. the name) of either user. This may be performed through a procedure such as illustrated in the flowchart of FIG. 28.

Multiple NANDeyes may be configured to function as nodes in a "social line of sight network" that enables anonymous communication of short text messages between people wearing NANDeye. Such anonymous communications via NANDeye enables people in line of sight from each other to exchange anonymous messages.

As an example, communication between person (a), a University of Texas, Austin student, Bob that may seek to share a ride to Los Angeles (L.A.), and another person (b), another student, Joyce, that would like to visit her family in L.A. may take place as follows:

Bob takes out his phone, calls a SVMS (short visual messaging system) application, and types: "will share a ride to LA over this weekend". Then Bob may select a "load and transmit" option.

Bob's NANDeye encodes this short message into his NANDeye's beacon LED and optically transmits the encoded message.

Joyce's NANDeye detects Bob's message and beeps Joyce with a message such as "you picked up an SVMS message".

Figure 26:
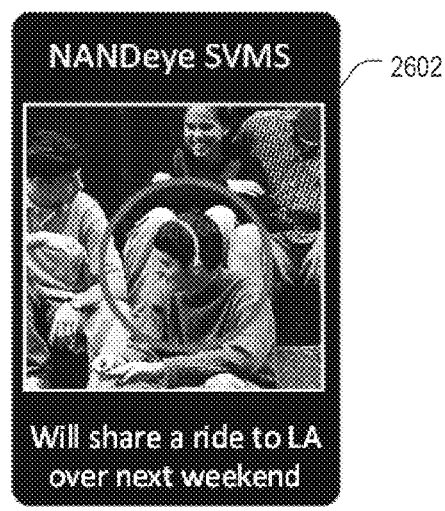
FIG. 26 is an illustration of a particular embodiment of a visual message that may be exchanged via head-mountable camera systems.

Joyce pulls out Joyce's phone and sees an indication of a sender of the message and the message itself, such as the screen 2602 depicted in the example of FIG. 26.

Joyce may want to go to LA, but may not be impressed by Bob. For example, Joyce may suspect that Bob is too young to be trusted as a driver, and therefore Joyce may not want to ride with Bob. Joyce may also not want to offend Bob. As a result, Joyce can put Joyce's phone back into Joyce's pocket and ignore the message, and nobody is hurt.

Alice is another student in the same campus. Alice's NANDeye may also detect Bob message and beep Alice with a message such as "you got an SVMS message".

Alice may pull out her phone and see a similar screed as Joyce viewed. The idea may sound attractive to Alice. Alice may approach the group of students around Bob and casually listen to the group for a while. Then Alice may become convinced that Alice wants to drive to L.A. with Bob. Alice may approach Bob and introduce herself.

Bob may pulls out his phone, call the SVMS application, and select an option to "cancel current message" because Bob's offer may no longer be available.

Clearly, Alice could have sent back to Bob a message via the same channel if she did not want to approach him yet—such as "Can I bring back a small couch?"

Figure 27:
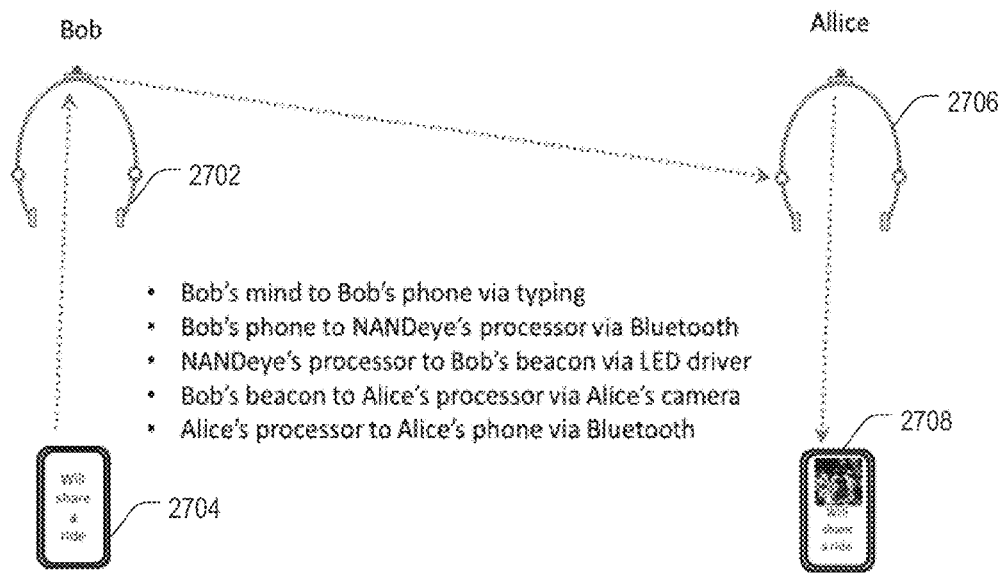
FIG. 27 is an illustration of a particular embodiment of message communication between multiple head-mountable camera systems.

FIG. 27 illustrates and example of how the communication channel described above with respect to Bob, Joyce, and Alice may operate with respect to Bob's headgear 2702, Bob's phone 2704, Allice's headgear 2706, and Allice's phone 2708. Message content may be transferred from Bob's mind to Bob's phone 2704 via typing into a user interface of Bob's phone 2704. Bob's phone 2704 may wirelessly transfer a signal to Bob's headgear 2702 to communicate the message content. The wireless signal may be received via a transceiver in Bob's headgear 2702, decoded by a processor in Bob's headgear 2702, re-encoded as a beacon modulation signal, and transmitted by a LED driver (e.g., of a beacon) of Bob's headgear 2702. The beacon may be detected by a camera of Allice's headgear 2706, demodulated/decoded by a processor of Allice's headgear 2706, and wirelessly sent from Allice's headgear 2706 to Allice's phone 2708. The message content may be displayed on a display of Allice's phone, such as illustrated in FIG. 26.

Another feature of the off-line processing in a NANDeye system may be to extract a very short (e.g., one minute) video recap of the day's activities, referred to as a "My day in one minute" summary. One purpose of such an extract may be to pack main events of a day in a short, manageable, entertaining video clip that can be stored in a calendar, sent to a friend or published over a social network. As an illustrative, non-limiting example, extraction of a 12-hour day into a 1-minute re-cap (e.g., a 720:1 compression) may be performed automatically, manually or interactively. One possible method of creating a summary comprises the following steps:

Segmenting the video log of the day into cuts, by detecting abrupt changes in the video content or in the time line.

Screening the segments according to a predefined set of criteria, such as number of people, length of the segment, quality of the video, presence of bookmarks in the segment etc.

Extracting a core part of every segment according to a predefined set of criteria such as around a specific "core bookmark", instances of zoom in, instances of high frame rate, instances of excited speaking by the user etc.

Prioritizing the extracted segments according to a predefined set of criteria such as the total length of the summary, creating even time distribution along the day, selecting segments that are visually different than others, preferring segments from different places etc.

Combining the selected segments into one video summary with aesthetic transitions between cuts, and adding captions such as time and place for each segments.

FIG. 28 illustrates a flowchart showing actions performed by several interoperating components that may be used in a NANDeye social network. A method may be performed by a server of the social network that includes receiving a subscription request of a user and an offer of the user to be a potential witness, at 2802. The server may receive, from the user's computer, NANDeye material including an index of video data, at 2806. In some embodiments, the server may also receive the video data itself. The NANDeye material may have been indexed by time, place, and direction of FOV by a user's computer after the user uploads the NANDeye material to the user's storage archive (e.g., on the user's computer). Alternatively, the server may index the NANDeye material by time, place, and direction of FOV after receiving the NANDeye material. The server may index all (or a portion) or participating indexed video material into a global index, at 2808.

The server may receive a request from another user, at 2812, such as a post on an internet social network indicating that the other user requests an eyewitness for a particular place and time. The server may search the request against the global index, such as via a search engine, at 2814. The server may make a determination, at 2816, whether the search resulting in a match. When the search results in a match, the server may send a message to a provider or owner of the matching content indicating that at least a portion of the matching content is requested, at 2818. The server may make a determination whether an indication is received that the provider or owner of the matching content is willing to allow use of the portion of the matching content, at 2819.

The server may receive certified metadata from the provider or owner of the matching content, at 2820, and may send a message to the other user to notify the other user that a potential match to the request may be available. In response to receiving an indication from the other user indicating that the other user is interested, at 2822, the server may cause an introduction to be performed of the other user and the provider or owner of the matching content, at 2824.

Figure 29:
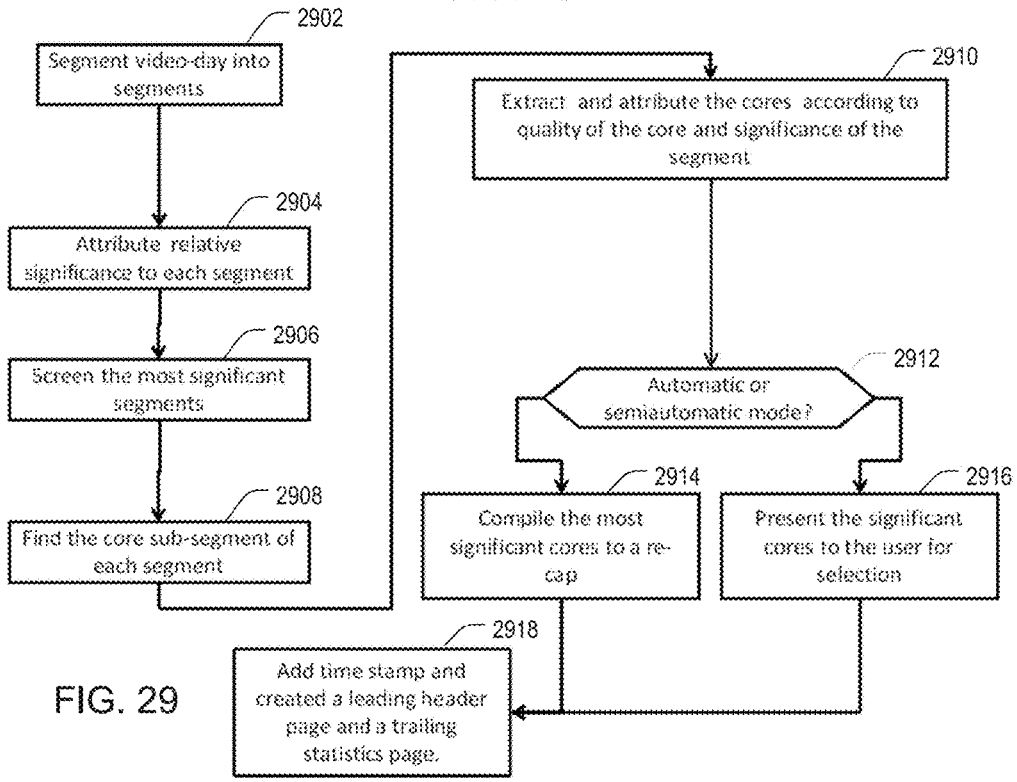
FIG. 29 is an illustration of a particular embodiment of a flow chart of a method of processing recorded video data.

FIG. 29 illustrates a flowchart of an example of a method of automatically generating such a summary. A video-day may be segmented into segments, at 2902. A relative significance may be attributed to each segment, at 2904. A screen may be performed to identify the most significant segments, at 2906. A "core" sub-segment of each of the most significant segments may be determined, at 2908. The cores may be extracted and attributed according to a quality of the cores and significance of the segment, at 2910. A determination may be made whether an automatic mode or semi-automatic mode is selected, at 2912. In response to the automatic mode being selected, the most significant cores may be compiled to a re-cap or summary, at 2914. In response to the semiautomatic mode being selected, the most significant cores may be presented to a user for selection, at 2916. A time stamp, leading header page, and/or trailing statistics page may be added, at 2918.

Off-line video processing can create a statistical summary of the day and present the statistical summary at the end of the video summary, in a graphical way such as similar to marquee presentation of credits at the end of a movie. The statistics of the day can be, for example—

| | |
|---|---|
| Took video for | 9:40 hours |
| Walked on foot | 3.9 Km |
| Drove by car | 23.9 Km |
| Commuted | 28.2 Km |
| Ate | 4 meals |
| Made phone calls | 14 |
| Received phone calls | 9 |
| Read books and magazines | 32 pages |
| Shook hands with | 13 people |
| Kissed cheeks of | 3 females |
| Danced for | 38 minutes |

Figure 30:
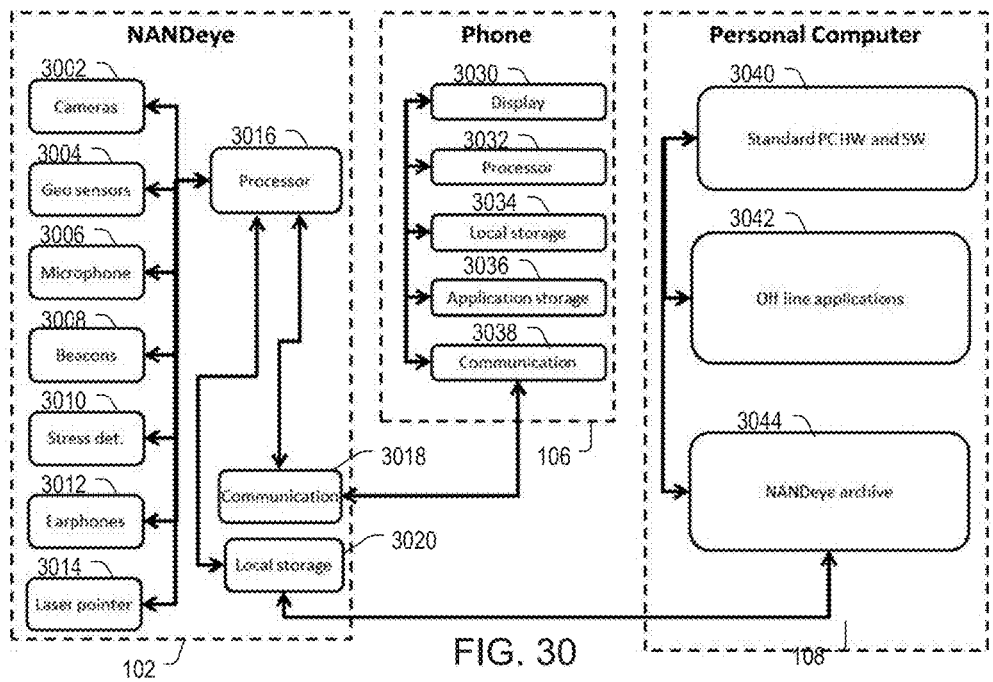
FIG. 30 is an illustration of a particular embodiment of components of a head-mountable camera system.

FIG. 30 illustrates an example of components that may be implemented in NANDeye headgear 102. The NANDeye headgear 102 includes one or more cameras 3002, one or more Geo sensors 3004, one or more microphones 3006, one or more beacons 3008, one or more stress detectors 3010, one or more earphones 3012, and one or more laser pointers 3014. Each of the components 3002-3014 may be coupled to a processor 3016 that is coupled to a communication interface 3018 and to a local storage 3020. An example of the phone 106 includes a display 3030, a processor 3032, a local storage 3034, an application storage 3036, and a communication interface 3038 that may enable wireless communication with the headgear 102 (e.g., via Bluetooth). An example of the computer 108 includes PC hardware and software 3040, off line NANDeye applications 3042, and a NANDeye archive 3044.

Figure 31:
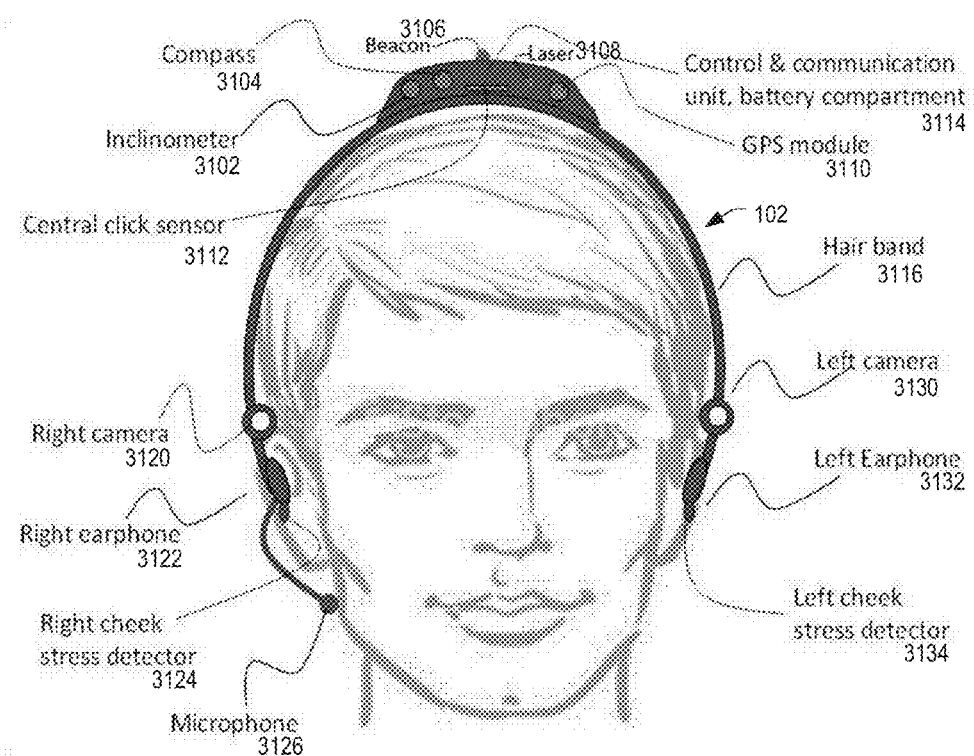
FIG. 31 is an illustration of a particular embodiment of a head-mountable camera apparatus.

FIG. 31 illustrates another example of NANDeye headgear 102. A cockpit includes one or more inclinometers 3102, one or more compasses 3104, one or more beacons 3106, one or more lasers 3108, one or more GPS modules 3110, one or more central click sensors 3112, and one or more control and communication unit and battery compartment 3114 at a top of a hairband 3116. Right-side components include one or more right cameras 3120, one or more right earphones 3122, one or more right cheek stress detectors 3124, and one or more microphones 3126. Left-side components include one or more left cameras 3130, one or more left earphones 3132, and one or more left cheek stress detectors 3134.

Figure 32:
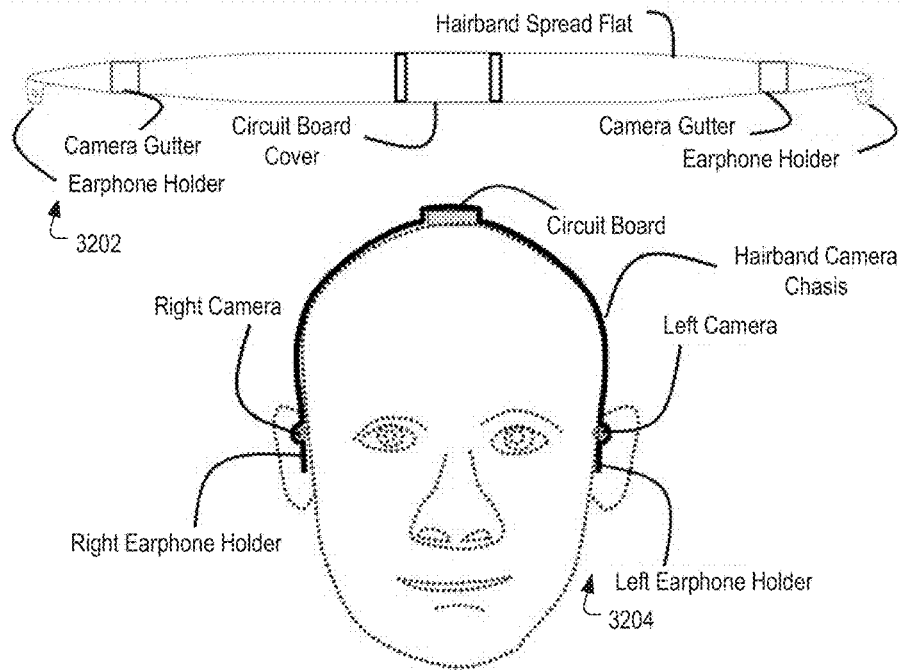
FIG. 32 is an illustration of a particular embodiment of a head-mountable camera apparatus.

FIG. 32 illustrates another example of NANDeye headgear 102 in a top view 3202 and a front view 3204.

FIG. 33 illustrates another example of NANDeye headgear 102 that may be toggled between a stereo mode and an extended field of view mode. A bottom view 3402 of the NANDeye headgear 102 illustrates a stereo mode where left and right cameras are substantially aligned with slight inward pan. A bottom view 3404 of the NANDeye headgear 102 illustrates an extended field of view mode where a twisting applied to a center of the headband (e.g., by turning a top-mounted knob) camera to slightly twist inward and the right camera to slightly twist outward.

Figure 34:
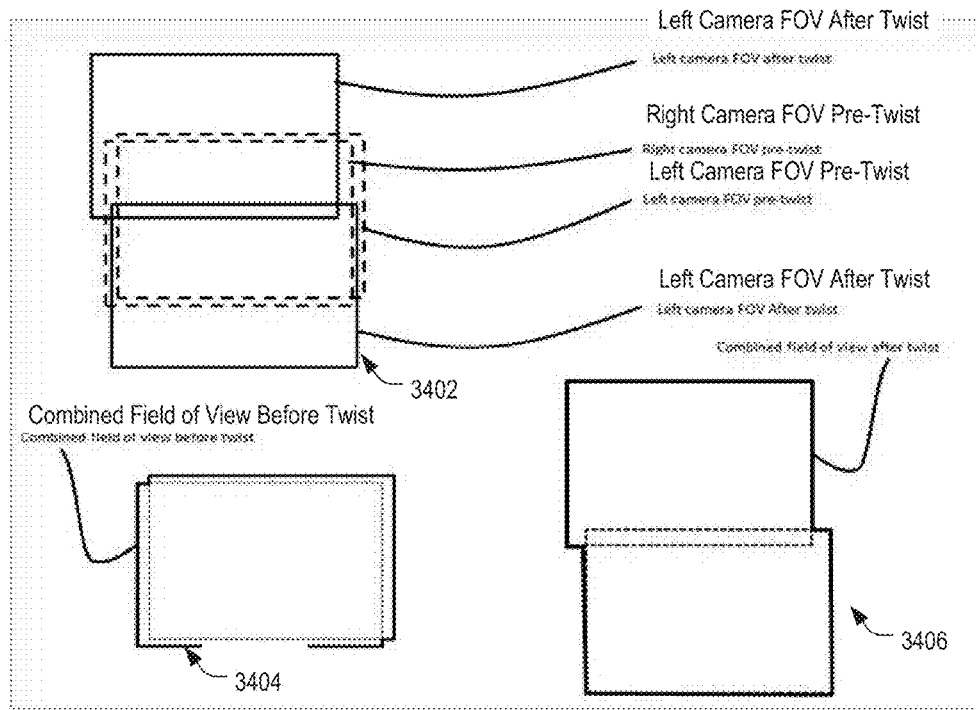
FIG. 34 is an illustration of a particular embodiment of camera image alignment of a stereo mode and an extended vertical field of view mode of a head-mountable camera apparatus.

FIG. 34 illustrates example field of views 3402 of left and right cameras of NANDeye headgear 102, such as the NANDeye headgear 102 of FIG. 17 or FIG. 33, in a 'before twist' stereo mode 3404 (similar to FIG. 15) and in an 'after twist' combined field of view mode 3406 (similar to FIG. 16). The combined field of view is illustrated as a vertically extended field of view.

Figure 35:
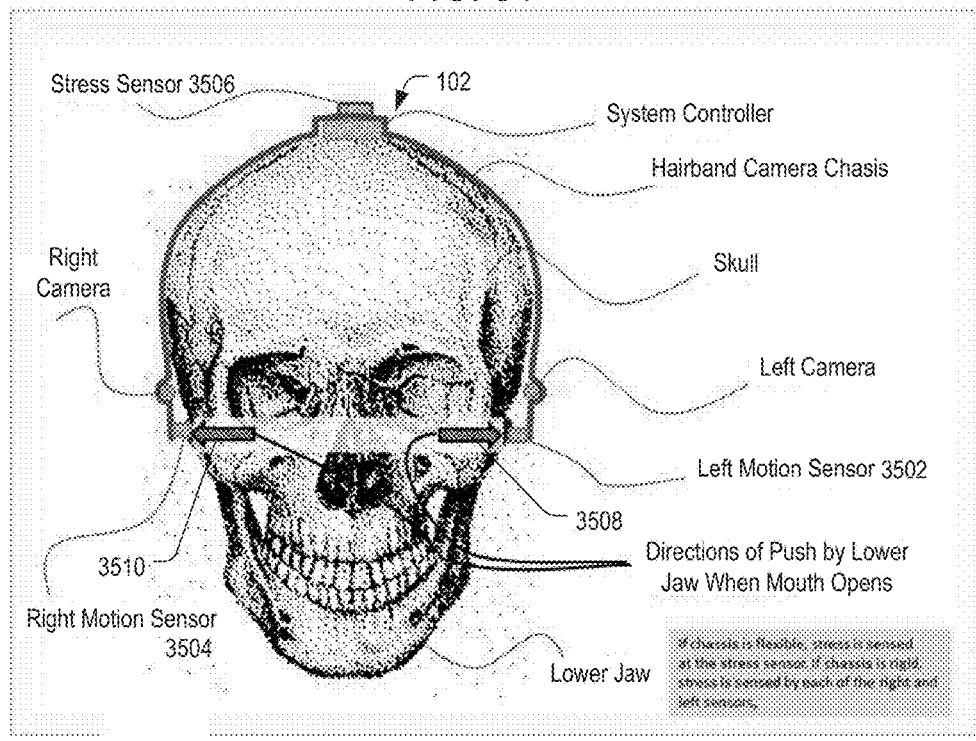
FIG. 35 is an illustration of a particular embodiment of jaw motion detection by a head-mounted camera apparatus.

FIG. 35 illustrates an example of jaw motion detection by NANDeye headgear 102 with left and right motion sensors 3502, 3504 configured to detect motion of the chassis due to movement (indicated by arrows 3508, 3510) caused by motion of the user's jaw. In embodiments where the chassis if relatively flexible, stress experienced by the chassis due to the movement may be detected by the sensors 3502, 3504. In embodiments where the chassis is rigid, stress experienced by the chassis due to the movements may be detected by a central, top-mounted stress sensor 3506.

Figure 36:
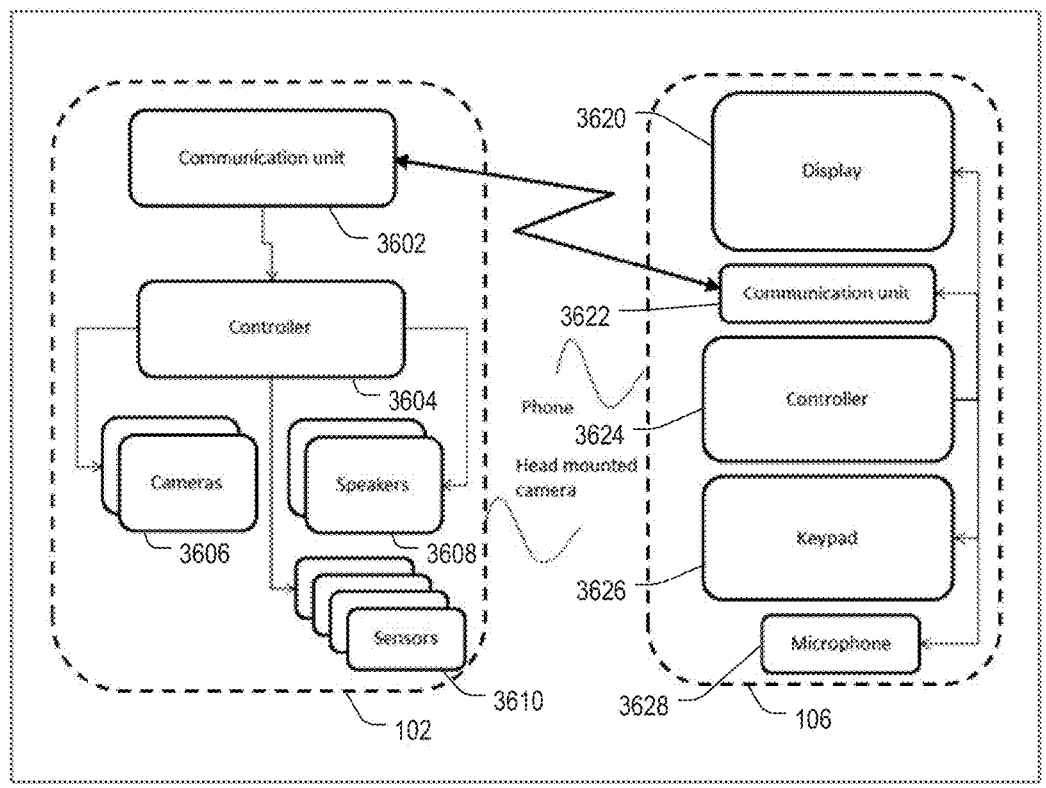
FIG. 36 is an illustration of a particular embodiment of components of a head-mountable camera system.

FIG. 36 illustrates examples of components of a NANDeye headgear 102 and an electronic device such as a mobile phone 106. A communication unit 3602 in the NANDeye headgear 102, such as a Bluetooth transceiver/interface, may enable communication with a communication unit 3622 in the electronic device 106 via wireless signaling. The headgear 102 may also include a controller 3604 coupled to the communication unit 3602 and also coupled to one or more cameras 3606, one or more speakers 3608, and one or more sensors 3610. The phone 106 may also include a display 3602, a controller 3624, a keypad 3626, and a microphone 3628.

Figure 37:
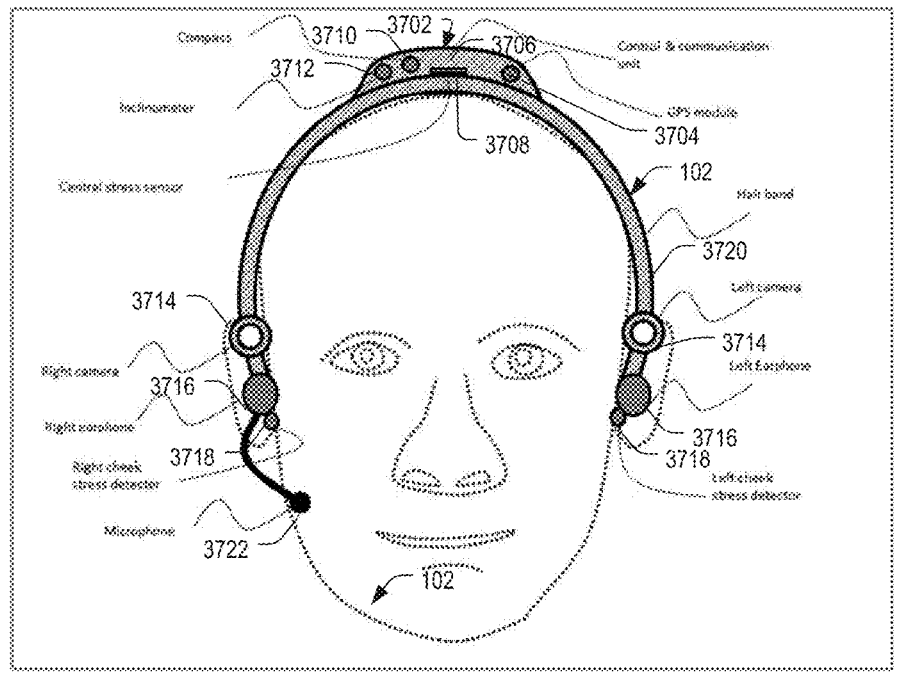
FIG. 37 is an illustration of a particular embodiment of a head-mountable camera apparatus.

FIG. 37 illustrates an example of a NANDeye headgear 102 that includes a cockpit 3702 with a GPS module 3704, a control and communication unit 3706, a central stress sensor 3708, a compass 3710, and an inclinometer 3712. The NANDeye headgear 102 includes a camera 3714, earphone 3716, and cheek stress detector 3718 on each of the right side and the left side of the hair band 3720. The NANDeye headgear 102 includes at least one microphone 3722, such as a microphone illustrated as attached to the right side of the hair band 3720.

Figure 38:
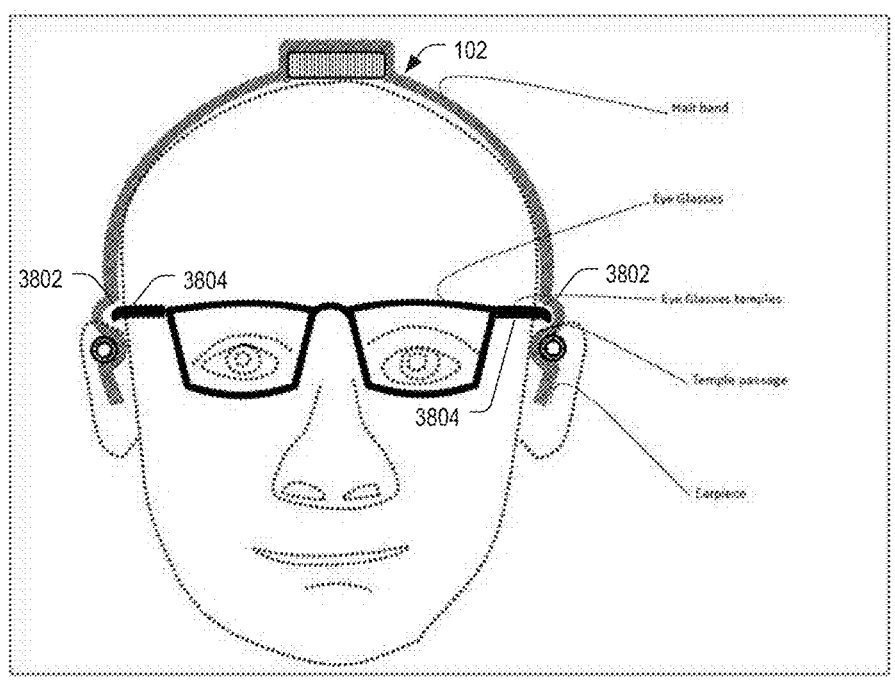
FIG. 38 is an illustration of a particular embodiment of a head-mountable camera apparatus.

FIG. 38 illustrates an example of a NANDeye headgear 102 with concave passages 3802 in proximity to temples 3804 of eyeglasses worn by the user. In some embodiments, the concave passages 3802 are configured to allow passage of the eyeglass temples 3804. In other embodiments, the concave passages 3802 are configured to support and stabilize the hair band on the eyeglass temples 3804.

Figure 39:
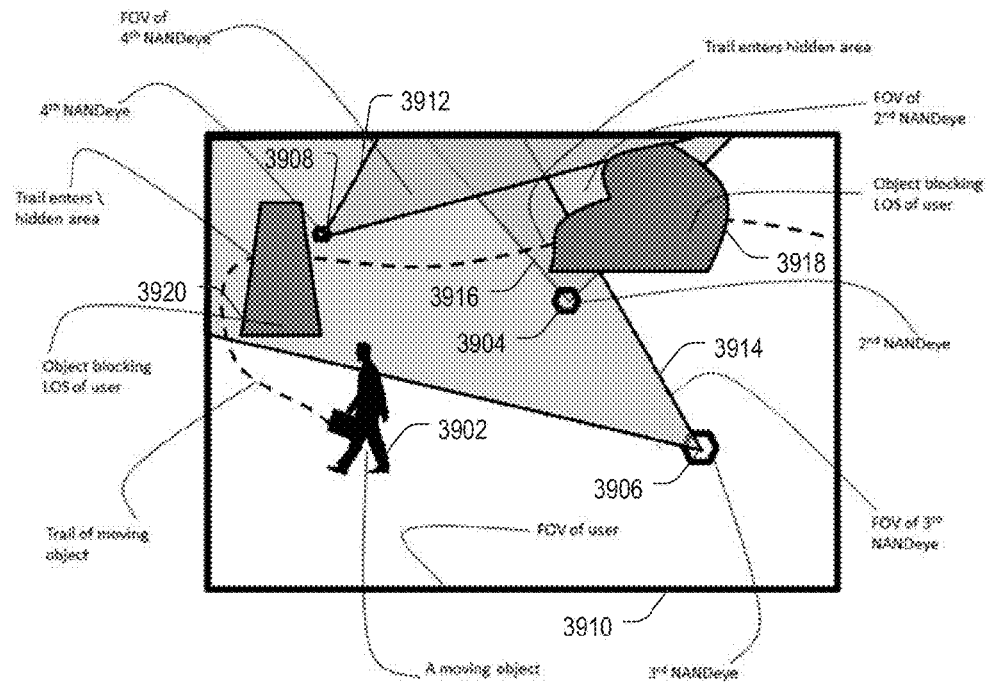
FIG. 39 is an illustration of a particular embodiment of a scenario where a head-mounted camera system having an interrupted line of sight to an object records another head-mounted camera system having an uninterrupted line of sight to the object.

FIG. 39 illustrates a scenario where a NANDeye headgear 102 having an interrupted line of sight to a moving object 3902 (e.g., a person) when the moving object 3902 enters an area hidden by an object blocking the line of sight ("LOS") of the user. The NANDeye headgear 102 or offline processing of the video data may detect a second, third, and fourth NANDeye 3904, 3906, and 3908, respectively in the FOV 3910 of the user, and may determine a corresponding FOV 3912 of the fourth NANDeye, a FOV 3914 of the third NANDeye, and a FOV 3916 of the second NANDeye. The NANDeye headgear 102 or the offline processing may determine that the FOV 3916 of the second NANDeye 3904 may have a line of sight to the moving object 3902 when the moving object 3902 is blocked from the user's line of sight by a first object 3918 and that the third NANDeye 3906 may have a line of sight to the moving object 3902 when the moving object 3902 is hidden from the user's FOV 3910 by a second object 3920. The user may request to retrieve video data recorded by the fourth and third NANDeyes, such as described with respect to FIG. 28.

Figure 40:
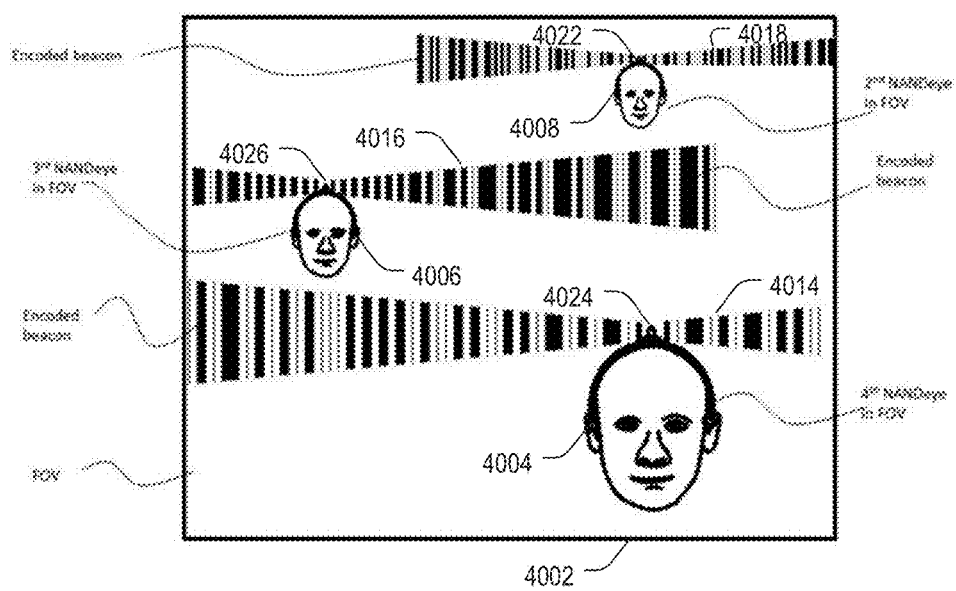
FIG. 40 is an illustration of a particular embodiment of multiple head-mountable camera devices in a field of view of a head-mountable camera apparatus.

FIG. 40 illustrates an example of a field of view 4002 of a NANDeye where multiple other NANDeyes 4004, 4006, 4008 are emitting beacons 4014, 4016, 4018 via beacon emitters 4024, 4026, 4028. One or more of the beacon signals may be encoded, such as via amplitude modulation, color modulation, some other form of modulation, or any combination thereof.

Figure 41:
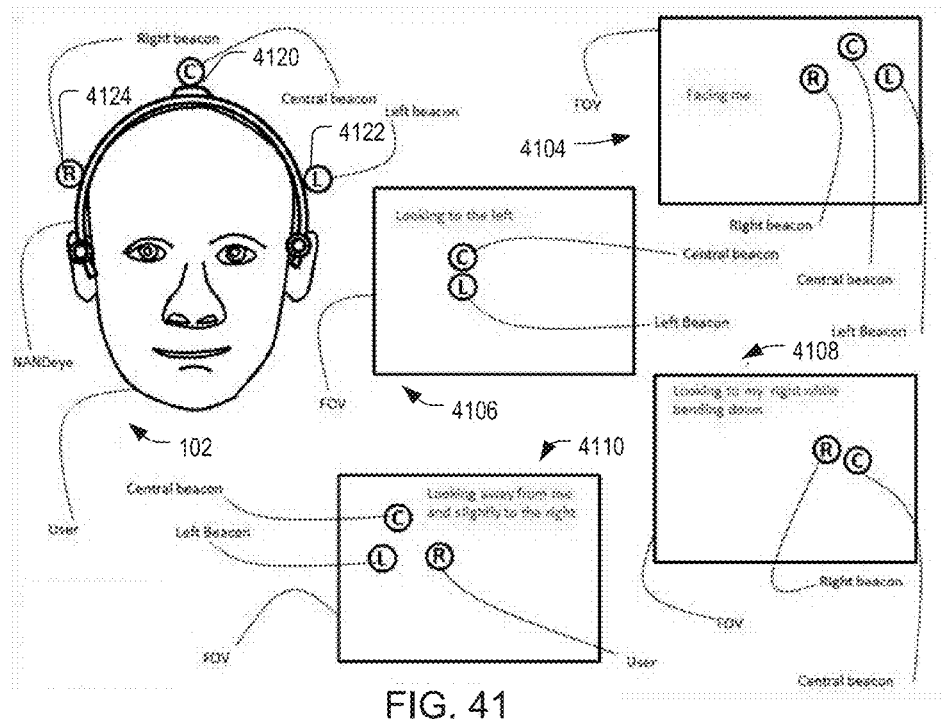
FIG. 41 is an illustration of a particular embodiment of a head-mountable camera device with multiple beacons and relative positions of the beacons in various orientations of the head-mountable camera device.

FIG. 41 illustrates NANDeye headgear 102 including a central beacon 4120, a left beacon 4122, and a right beacon 4124. Relative positions of the beacons may enable an observer to estimate an orientation and/or FOV of the NANDeye headgear 102. A first example 4104 illustrates relative positions of the left (L), center (C), and right (R) beacons in an observer's FOV (e.g., another NANDeye user) when the wearer of the NANDeye headgear 102 is facing the observer. A second example 4106 illustrates relative positions of the C and L beacons (the R beacon being hidden) when the wearer of the NANDeye headgear 102 is looking to the observer's left. A third example 4108 illustrates relative positions of the C and R beacons (the L beacon being hidden) when the wearer of the NANDeye headgear 102 is looking to the observer's right and bending down. A fourth example 4110 illustrates relative positions of the L, C and R beacons when the wearer of the NANDeye headgear 102 is looking away from the observer and slightly to the observer's right.

Although FIG. 41 illustrates three beacon emitters (L, R, and C), in other embodiments fewer than three beacons or more than three beacons may be used. For example, two beacons are sufficient for quarters. Further, although all beacons may be encoded (i.e., emitted beacons signals are modulated to transmit data), in some embodiments fewer than all beacons may be encoded.

Figure 42:
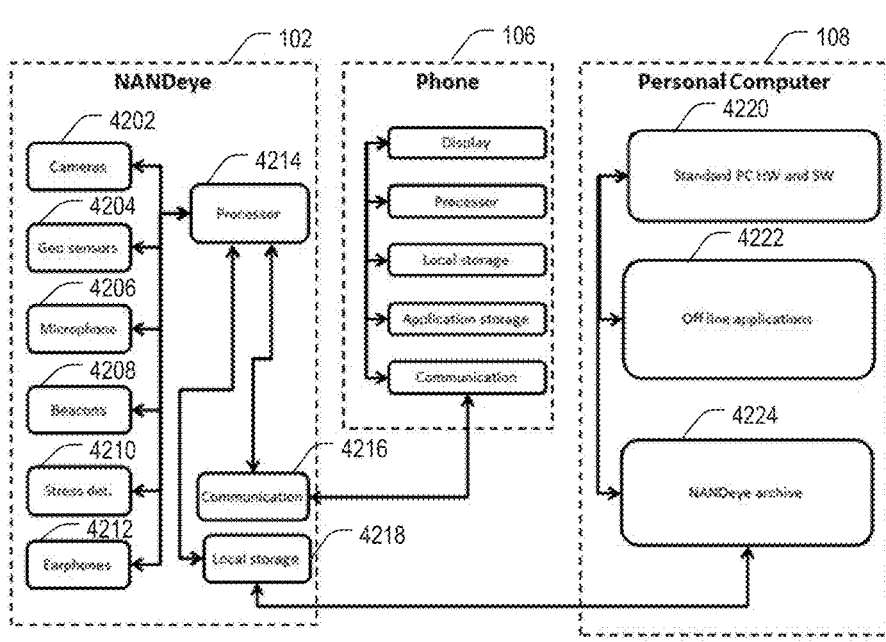
FIG. 42 is an illustration of a particular embodiment of components of a head-mountable camera system.

FIG. 42 illustrates an example of components of an example NANDeye system. A NANDeye headgear 102 may include multiple sensors such as geo sensors 4204, microphones 4206, and stress detectors 4210, cameras 4202, and beacons 4208 coupled to a processor 4214. The processor 4214 may be configured to access processor executable instructions in a non-volatile storage medium, such as modules stored in a local storage 4218. The modules may be executable by the processor 4214 to perform various operations and methods. A communication interface 4216 may enable wireless communication with a phone 106. The NANDeye headgear 102 may also communicate with a PC for off line video processing and archive/data storage at a NANDeye archive 4224. For example, the PC may include standard PC hardware (e.g., one or more hardware processor cores, memory, communication interfaces) 4220 and software (i.e., processor-executable instructions) 4220 that is executable by the processor core(s). The PC may also include one or more NANDeye offline applications 4222, that may include instructions executable by the PC processor core(s) to perform various operations and methods that may be better suited to the greater processing and data storage capability of the PC as compared to the NANDeye headgear 102 and the phone 106.

Figure 43:
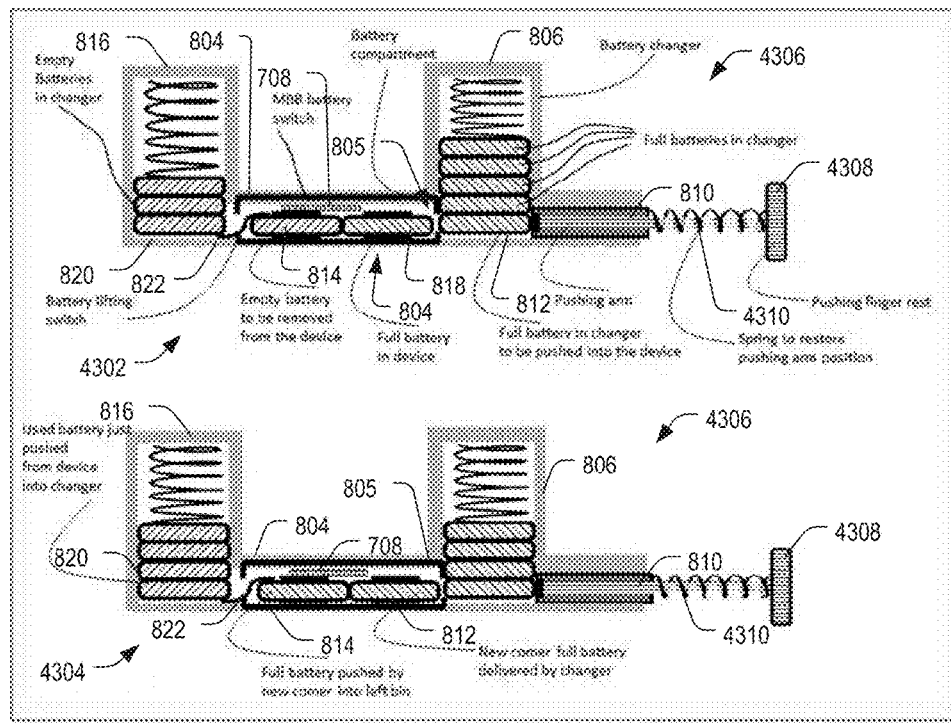
FIG. 43 is an illustration of a particular embodiment of a multi-battery power supply and a battery changer that may be used in conjunction with a head-mountable camera apparatus.

FIG. 43 illustrates another example of a battery changer 4306 similar to the example of FIG. 8. In a first stage of battery replacement 4302, an empty battery and a full battery may be in a battery holder of a device, such as a NANDeye headgear 102. The battery changer, with multiple charged batteries in a first magazine 806 and multiple uncharged batteries in a second magazine 816, is placed in contact with the battery holder housing 804 having the chamber dimensioned to hold multiple batteries. A user may push the pushing finger rest 4308 to cause the pushing arm 810 to feed a next sequential battery from an opening of the first magazine into a first location of the battery holder via the opening 805. The full battery 818 from the first location is pushed to the second location without losing electrical contact due to operation of the make-before-break (MBB) battery switch 708, such as described with respect to FIG. 7. The empty battery 814 is pushed from the second location into the second magazine. The pushing arm position is restored by a spring 4310 after the user releases the pushing finger rest 4308, resulting in a second stage of battery replacement 4304.

Figure 44:
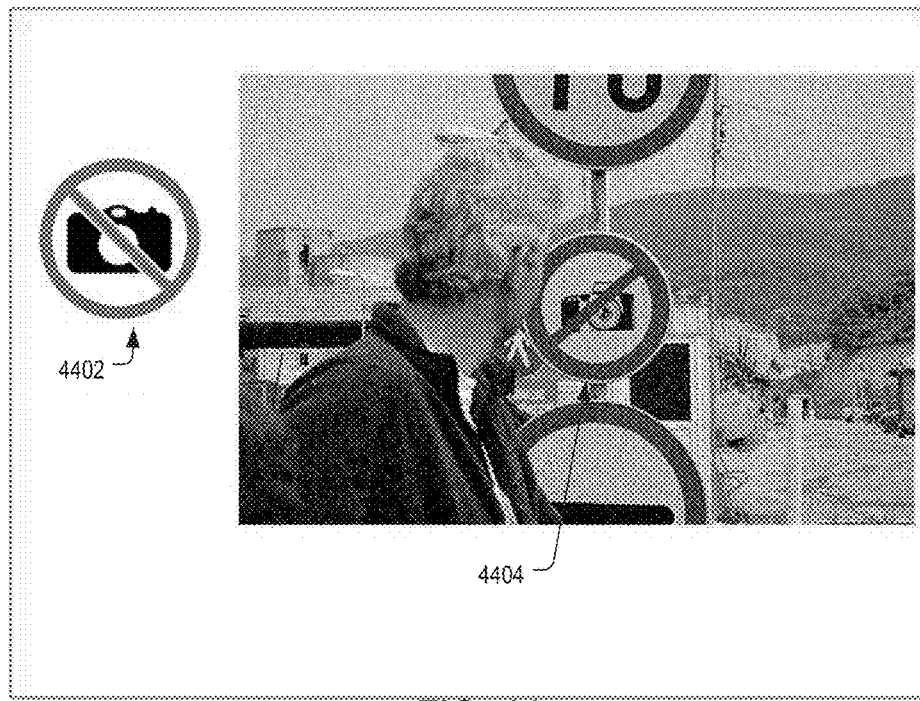
FIG. 44 is an illustration of a multiple embodiments of a graphical feature that may be detectable by a head-mountable camera apparatus as indicating that photography is unallowed.

FIG. 44 illustrates multiple examples 4402, 4404 of a graphical feature that may be detectable by a head-mountable camera apparatus as indicating that photography is unallowed.

Figure 45:
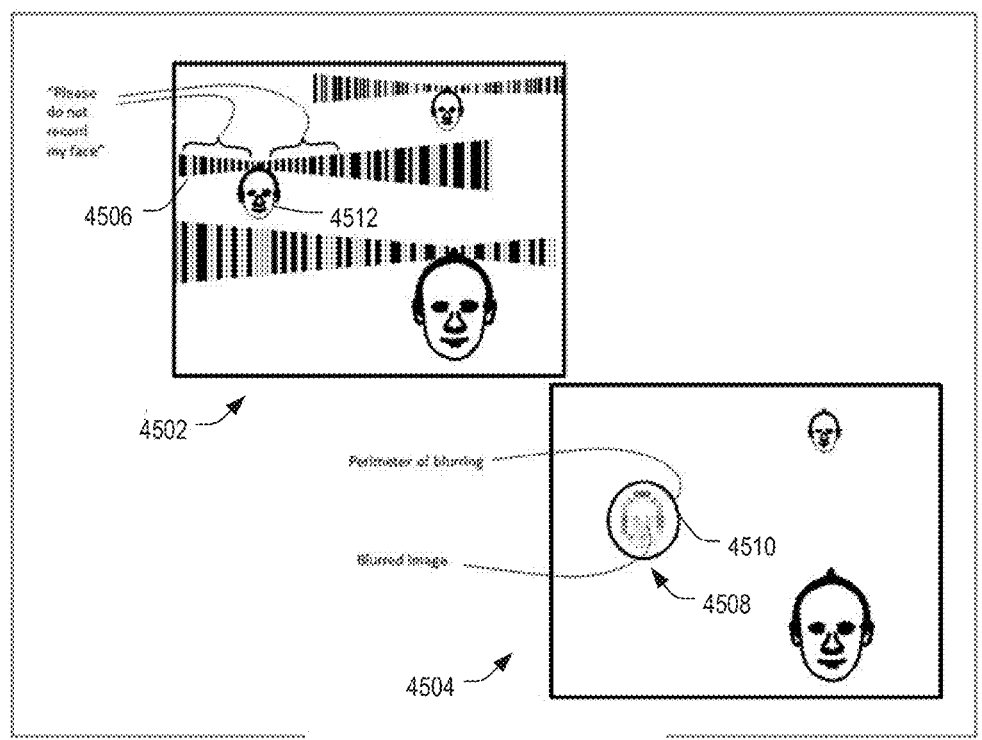
FIG. 45 is an illustration of a particular embodiment of adjusting video data to blur a face of a wearer of a head-mounted camera apparatus that transmits a beacon message.

FIG. 45 illustrates adjusting video data to blur a face of a wearer of a head-mounted camera apparatus that transmits a beacon message. A NANDeye FOV 4502 may include multiple NANDeyes emitting beacons. One of the beacons 4506 is modulated to convey a privacy message such as 'please do not record my face.' The NANDeye may detect the modulated message and may modify video data to create modified video data 4504 with a blurred image 4508 within a perimeter 4510 of blurring in an area around the face 4512 of the user of the NANDeye transmitting the privacy message. Alternatively, the message may be detected during offline processing and the image may be modified during the offline processing, such as by the PC of FIG. 42. Although the face 4512 is illustrated as blurred, the blurred portion may correspond to one or more parts of a user's body or the entire user's body.

Figure 46:
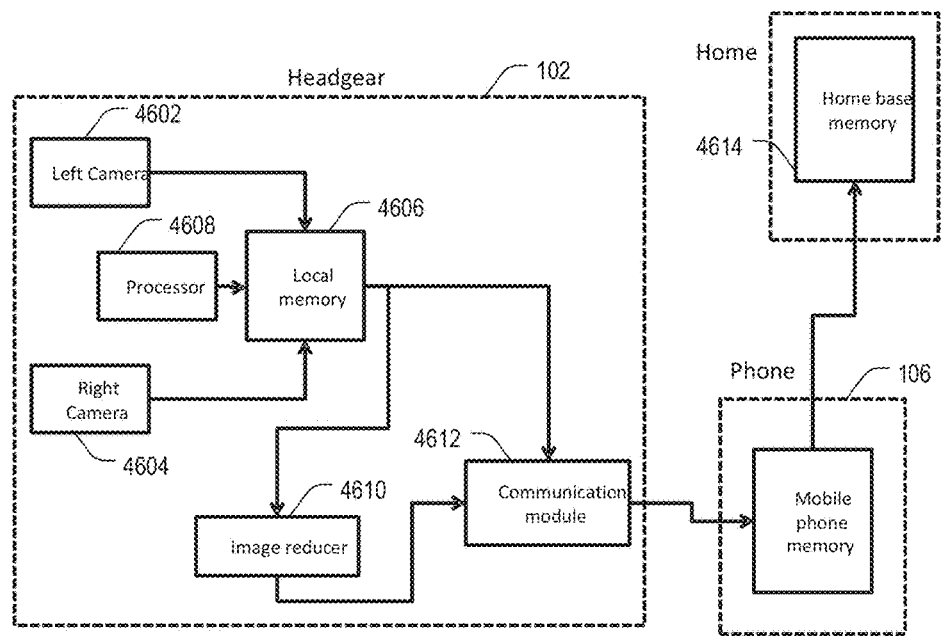
FIG. 46 is an illustration of a particular embodiment of components of a head-mountable camera system.

FIG. 46 illustrates an example of components of a NANDeye system. The NANDeye headgear 102 may include an image reducer 4610, such as to generate lower-quality image or video data to be provided to the phone 106 (e.g., having a reduced size, frame rate, color depth, etc.) while maintaining a higher-quality image or video data to be provided to a home computing or storage system 4614.

Figure 47:
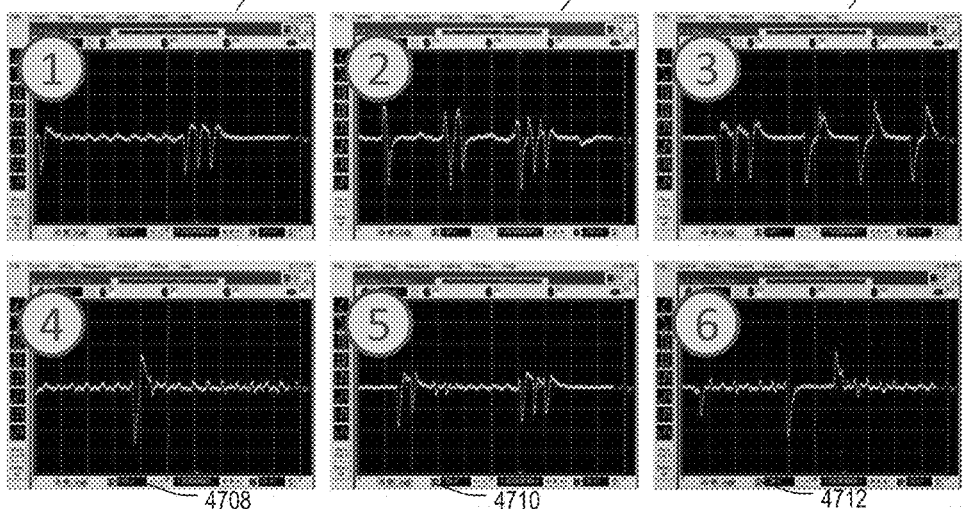
FIG. 47 is an illustration of a particular embodiment of sensor outputs responsive to various jaw motions that may be implemented in a user interface to a head-mountable camera apparatus.

FIG. 47 illustrates examples of sensor outputs responsive to various jaw motions that may be implemented in a user interface to NANDeye headgear 102. The chart, taken from the screen of an oscilloscope connected to the output of the sensor, shows that a deliberate wide mouth opening is distinguished from the natural motion of the jaw during chewing or talking. A first example 4702 illustrates an example of sensor output in response to a mouth opening event ("ope," corresponding to a larger amplitude pulse), followed by chewing gum (repeated smaller amplitude pulses), followed by three mouth opening events ("opes"), followed by talking. A second example 4704 illustrates sensor output corresponding to the sequence: talking, one ope, talking, two opes, talking, three opes, talking. A third example 4706 illustrates sensor output corresponding to the sequence: mouth shut, three opes, mouth shut, three long opes. A fourth example 4708 illustrates sensor output corresponding to the sequence: chewing aggressively, one ope, chewing aggressively. A fifth example 4710 illustrates sensor output corresponding to the sequence: mouth shut, two opes, chewing gum, three opes, mouth shut. A sixth example 4712 illustrates sensor output corresponding to the sequence: one ope, chewing, one very long ope, chewing.

Figure 48:
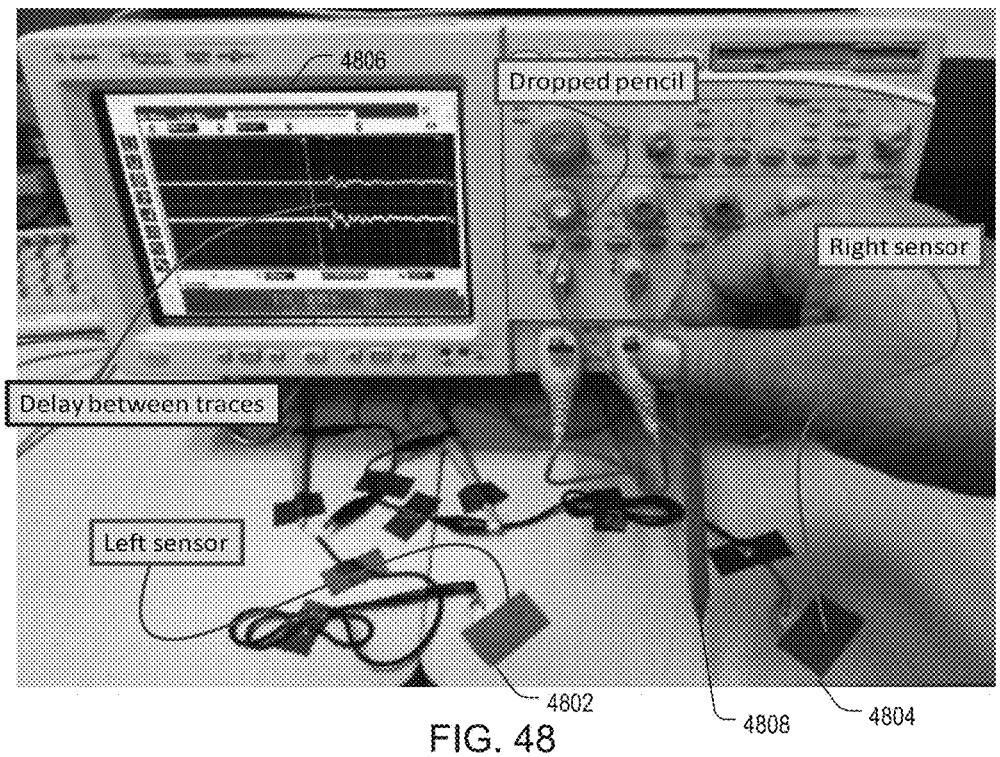
FIG. 48 is an illustration of a particular embodiment of dual sensors positioned to approximate jaw detectors of a head-mountable camera apparatus and showing dual sensor outputs having different delays based on a location of a noise source between the sensors.

FIG. 48 illustrates dual sensors 4802, 4804 positioned to approximate jaw detectors of a NANDeye headgear 102. The oscilloscope display 4806 shows a dual sensor outputs having different delays based on a location of a noise source 4808 (e.g., a dropped pencil) between the sensors. FIG. 48 shows that by measuring delta time of arrival of an audio signal to two sensors, one can reliably determine if the source of the sound is closer to the left sensor, or to the right sensor, or has the same distance from both.

Figure 49:
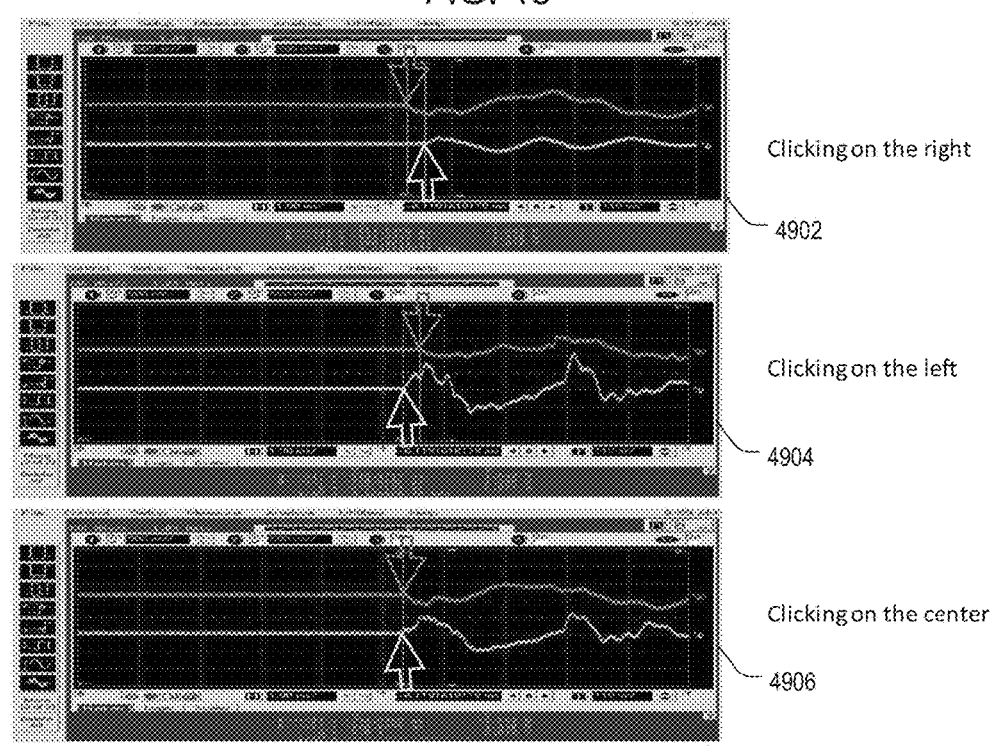
FIG. 49 is an illustration of a particular embodiment of outputs of the sensors of FIG. 48 in response to various locations of a noise source between the sensors.

FIG. 49 illustrates examples of outputs of the sensors (e.g., on the oscilloscope display 4806) of FIG. 48 in response to various locations of a noise source between the sensors. The top output 4902 shows a case where the noise source is closer to the left sensor (top trace) than to the right sensor (bottom trace). The middle output 4904 shows a case where the noise source is closer to the right sensor, and the bottom output 4906 shows a case where the noise source is closer to the right sensor more than to the left sensor.

Figure 50:
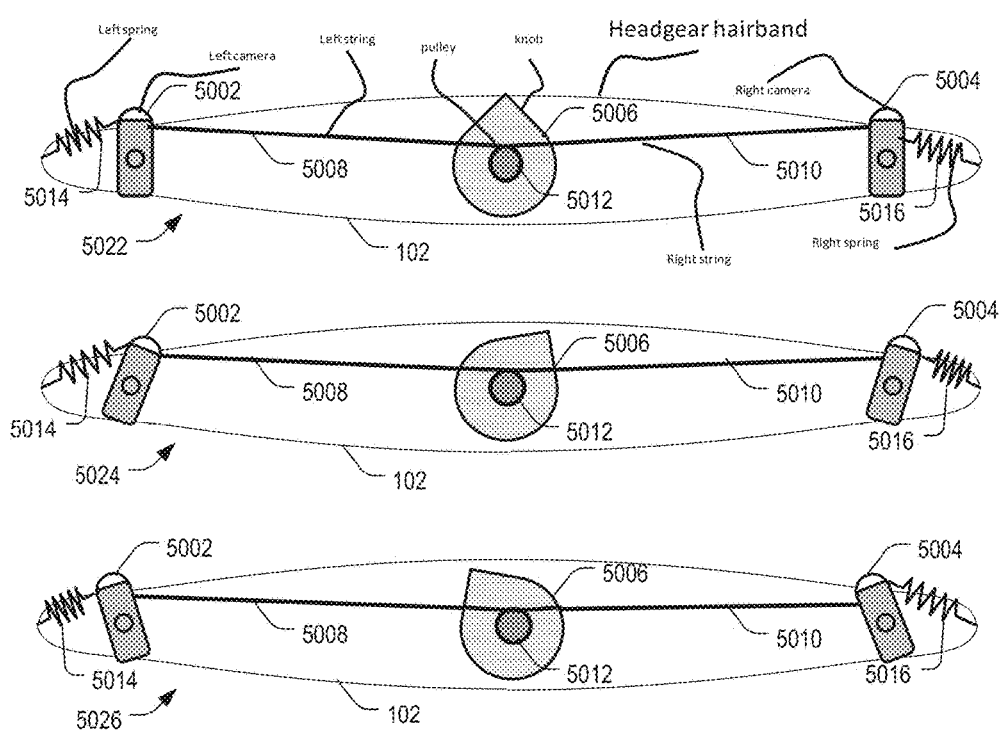
FIG. 50 is an illustration of a particular embodiment of a head-mountable camera apparatus in a stereo mode and in multiple extended field of view modes.

FIG. 50 illustrates examples of multiple modes of a dual-camera NANDeye headgear 102 implementation. For clarity, the headgear 102 is shown in a bottom view with the arch spread out and not bent around the head. A stereo mode 5022 includes a left camera 5002 and a right camera 5004 substantially aligned (e.g., substantially parallel or slightly inwardly turned to converge at a point in front of the user). A knob 5006 on top of the NANDeye headgear 102 is in a center position so that a left string 5008 and right string 5010 coupled to the respective left and right cameras 5002, 5004 and coupled to the knob 5006 (e.g. via a pulley 5012) are substantially equal length. The left string 5008 and a left spring 5014 may provide substantially equal opposing forces to the left camera 5002 to hold the left camera 5002 in the illustrated orientation. The right string 5010 and a right spring 5016 may similarly hold the right camera 5004 in an aligned orientation.

A first extended field of view mode 5024 results from turning the knob 5006 clockwise to lengthen the right string 5010 and shorten the left string 5008. The left camera 5002 is pulled to the right (i.e., panned right, up, or any combination thereof) by the left string 5008. The right camera 5004 is also pulled to the right, down, or any combination thereof, but to a lesser amount, as the right spring 5016 returns to a non-extended state. As a result, the left and right cameras form a combined extended horizontal, vertical, or any combination thereof field of view.

A second extended field of view mode 5026 results from turning the knob 5006 counterclockwise to lengthen the left string 5008 and shorten the right string 5010. The right camera 5004 is pulled to the left (i.e., panned left, down, or any combination thereof) by the right string 5010. The left camera 5002 is also pulled to the left, up, or any combination thereof, but to a lesser amount, as the left spring 5014 returns to a non-extended state. As a result, the left and right cameras form a combined extended horizontal, vertical, or any combination thereof field of view.

Figure 51:
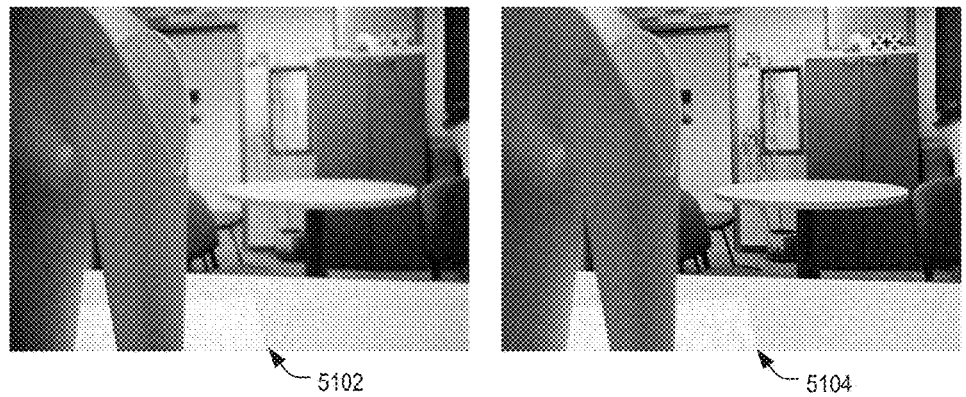
FIG. 51 is an illustration of a particular embodiment of images corresponding to an asymmetrical focal length operation of a head-mountable camera apparatus.

FIG. 51 illustrates an example of images corresponding to an asymmetrical focal length operation of a NANDeye headset. A first image 5102 is a camera image of a NANDeye camera having a short focal length so that nearer objects are in better focus than farther objects, and a second image 5104 is a camera image of another NANDeye camera having a longer focal length so that farther objects are in better focus than nearer objects. The images 5102 and 5104 can be combined to provide a resulting image with non-uniform focus, such as described with respect to FIG. 20.

Figure 52:
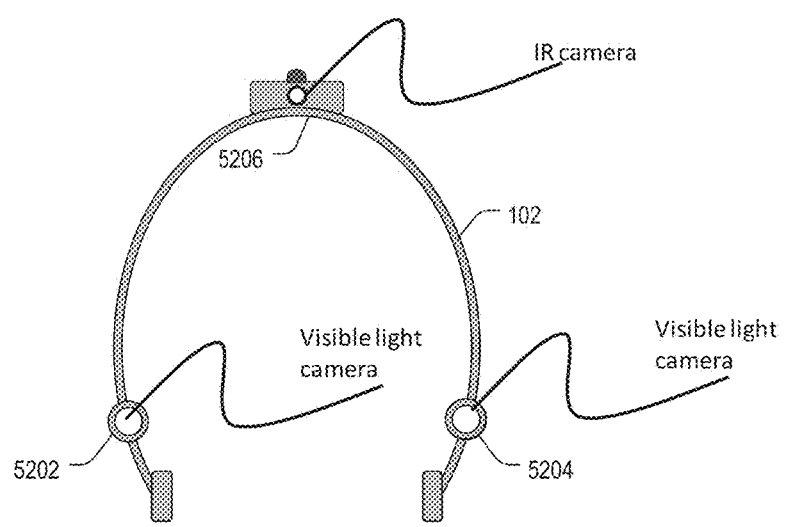
FIG. 52 is an illustration of a particular embodiment of a head-mountable camera apparatus having multiple types of cameras.

FIG. 52 illustrates an example of a NANDeye headgear 102 having multiple types of cameras, including dual visible light cameras 5202, 5204 at substantially a user's eye level and an infrared (IR) camera 5206 positioned to be on top of the user's head.

Figure 53:
FIG. 53 is an illustration of a particular embodiment of a using a laser pointer of a head-mounted camera apparatus.

FIG. 53 illustrates using a patterned laser pointer of a NANDeye headgear 102. The pattern 5302 of the patterned laser pointer may be distinctive and easily detectable in video data. A user may encircle an object of interest with the laser for later processing in the resulting video data.

Figure 54:
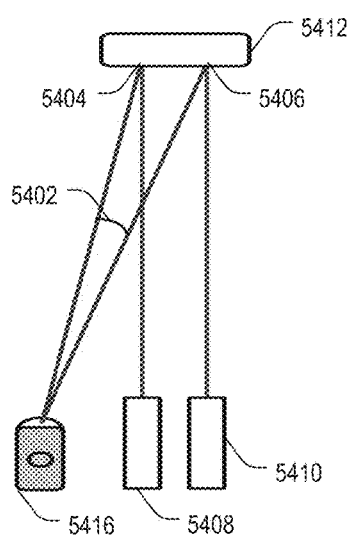
FIG. 54 is an illustration of a particular embodiment of determining distance to an object using multiple laser pointers of a head-mounted camera apparatus and a camera of the head-mounted camera apparatus.
Figure 55:
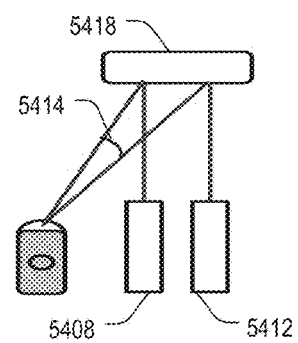
FIG. 55 is an illustration of a particular embodiment of determining distance to an object using multiple laser pointers of a head-mounted camera apparatus and a camera of the head-mounted camera apparatus.

FIG. 54 and FIG. 55 illustrate examples of determining distance to an object using multiple laser pointers of a NANDeye headgear 102 and NANDeye camera, where an angle 5402 between the points of contact 5404, 5406 of the lasers 5408, 5410 with an object 5412 as observed by the NANDeye camera 5416 is larger for a closer object 5412 illustrated in FIG. 54 than the angle 5414 for a farther object 5418 illustrated in FIG. 55.

Figure 56:
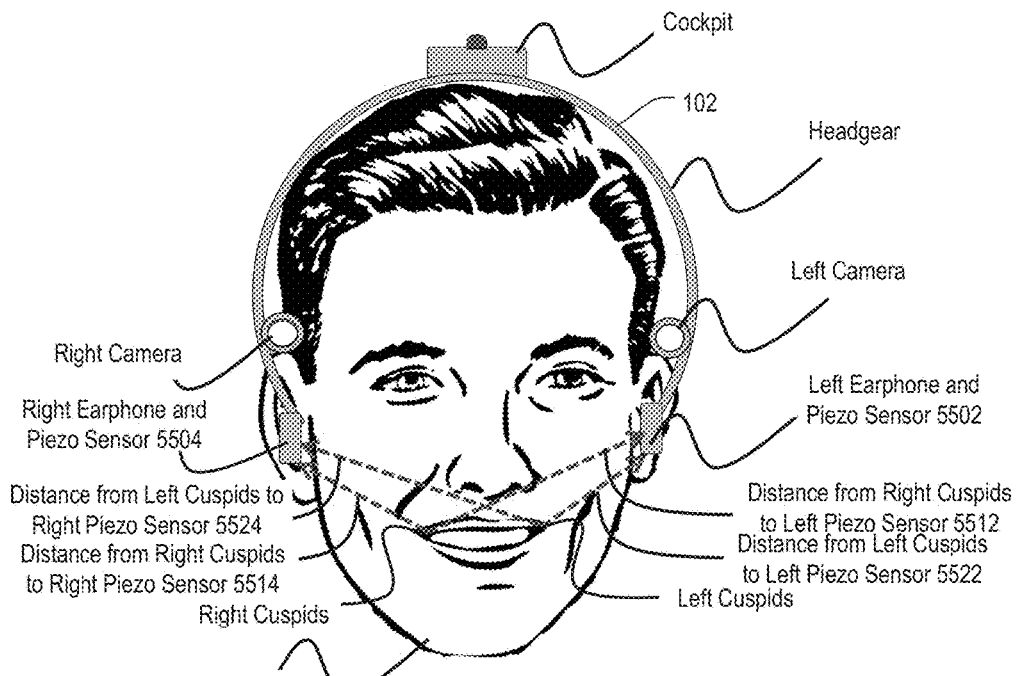
FIG. 56 is an illustration of a particular embodiment of a head-mountable camera apparatus having multiple jaw sensors.

FIG. 56 illustrates a NANDeye headgear 102 having multiple jaw sensors and relevant distances between mouth- or jaw-based noise sources and each of the jaw sensors to enable detection of left, center, or right mouth-based signals based on signal delay differences, such as described with respect to FIGS. 48-49. The headgear 102 may include a left earphone and left piezo sensor 5502 and a right earphone and right piezo sensor 5505. A noise generated at the right cuspids (e.g., by a clicker in the user's mouth) travels a longer distance 5512 to the left sensor 5502 and a shorter distance 5514 to the right sensor 5504. As a result, the noise will be detected at the right sensor 5504 before being detected at the left sensor 5502 and a location of the noise source can be determined as being on the user's right side. A noise generated at the left cuspids (e.g., by a clicker in the user's mouth) travels a shorter distance 5522 to the left sensor 5502 and a longer distance 5524 to the right sensor 5504. As a result, the noise will be detected at the left sensor 5502 before being detected at the right sensor 5504 and a location of the noise source can be determined as being on the user's left side.

Figure 57:
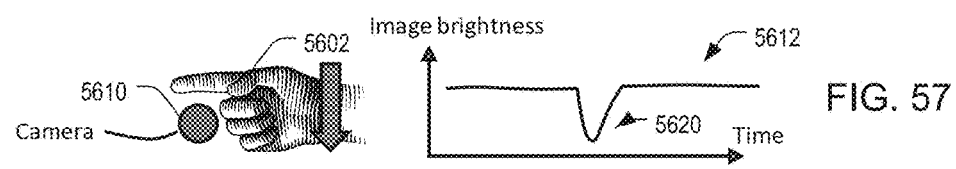
FIG. 57 is an illustration of a particular embodiment of a camera-based user interface that may be implemented by a head-mountable camera apparatus.
Figure 58:
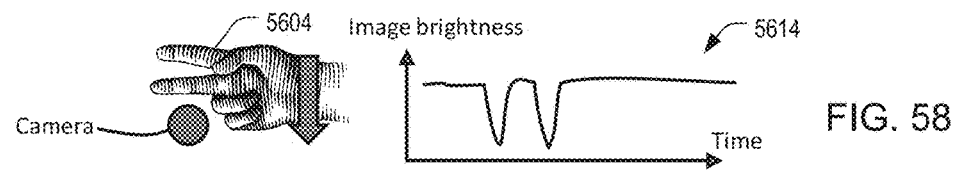
FIG. 58 is an illustration of another particular embodiment of a camera-based user interface that may be implemented by a head-mountable camera apparatus.
Figure 59:
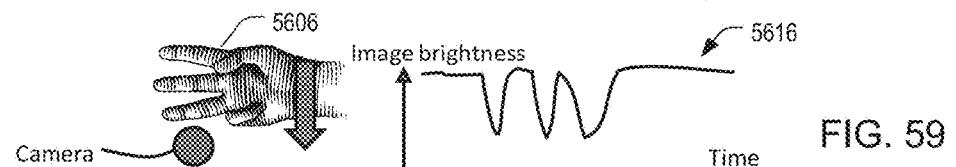
FIG. 59 is an illustration of another particular embodiment of a camera-based user interface that may be implemented by a head-mountable camera apparatus.
Figure 60:
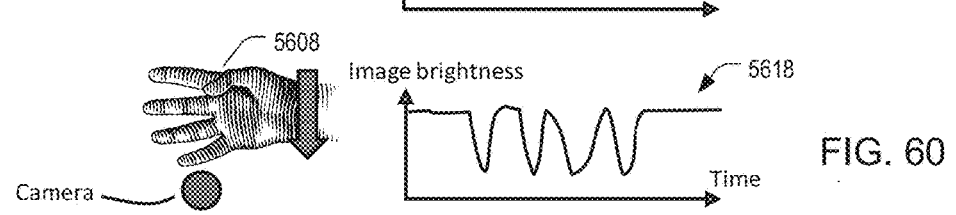
FIG. 60 is an illustration of another particular embodiment of a camera-based user interface that may be implemented by a head-mountable camera apparatus.

FIGS. 57-60 illustrate a camera-based user interface that may be implemented by a NANDeye wearer by passing one or more fingers across the field of view of one or more of the NANDeye cameras while wearing the NANDeye headgear 102. FIG. 57 illustrates a single-finger gesture 5602 and a resulting plot 5612 of image brightness as a function of time. The plot 5612 indicates a brightness reduction 5620 when the single finger passes in front of the camera 5610. FIGS. 58, 59, and 60 illustrate examples of a two-finger gesture 5604, a three-finger gesture 5606, and a four-finger gesture 5608, respectively, and example brightness plots 5614, 5616, and 5618 corresponding to each of the gestures 5604-5608 respectively. The NANDeye controller may detect one or more of the gestures 5602-5608 of FIGS. 57-60 in real-time or near real-time and respond accordingly (e.g., process a user command represented by the detected gesture).

Figures 61, 62:
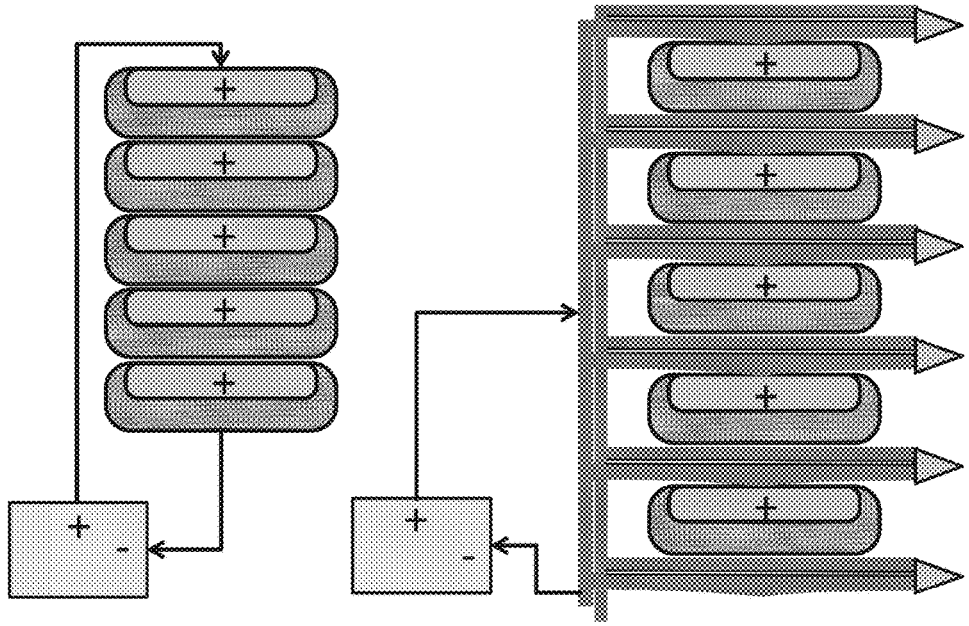
FIG. 61 is an illustration of a particular embodiment of charging multiple batteries in a battery magazine that may be used with a head-mountable camera system.
FIG. 62 is an illustration of another particular embodiment of charging multiple batteries in a battery magazine that may be used with a head-mountable camera system.

FIGS. 61-62 illustrate examples of charging multiple batteries in a battery magazine, such as a magazine of the changer described with respect to FIG. 8 or FIG. 43. The batteries are coupled serially in FIG. 61 and in parallel in FIG. 62. Serial configuration is mechanically simpler, but the charging current is small as the serial resistance of multiple batteries is higher than for a single battery. Parallel configuration is more complex but may be faster to charge and may facilitate detection of battery failure.

Figure 63:
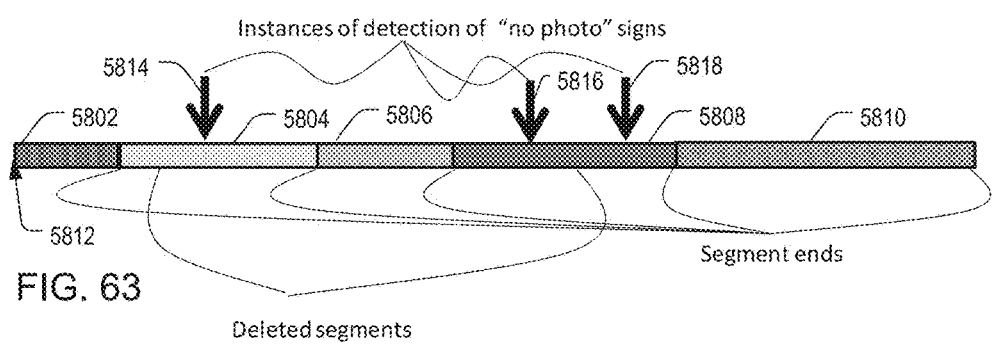
FIG. 63 is an illustration of a particular embodiment of video data having video data segments to be deleted based on content of the video data segments.
Figure 64:
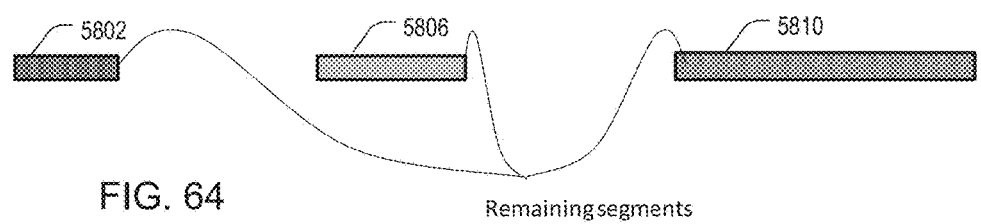
FIG. 64 is an illustration of a particular embodiment of deletion of remaining segments of the video data of FIG. 63 after deletion of video data segments based on content of the video data segments.

FIGS. 63-64 illustrate an example of deletion of video data segments 5802-5810 based on content of the video data segments. In FIG. 63, video data is illustrated as a horizontal bar 5812 including segments 5802-5810 corresponding to recording time periods. Instances of detection of signs or other graphical representations indicating that photography is unallowed, such as illustrated in FIGS. 12 and 44, are illustrated as arrows 5814, 5616, 5818 at times where the video data captures the sign or representation. In FIG. 64, segments 5804 and 5808 containing the detected signs or representations have been deleted. Detection may be performed by a processor of the NANDeye headgear 102 in real-time or near real-time, and the segments may be prevented from being stored, or stored and then deleted. Alternatively, detection and removal of segments may be performed during off-line processing.

Figure 65:
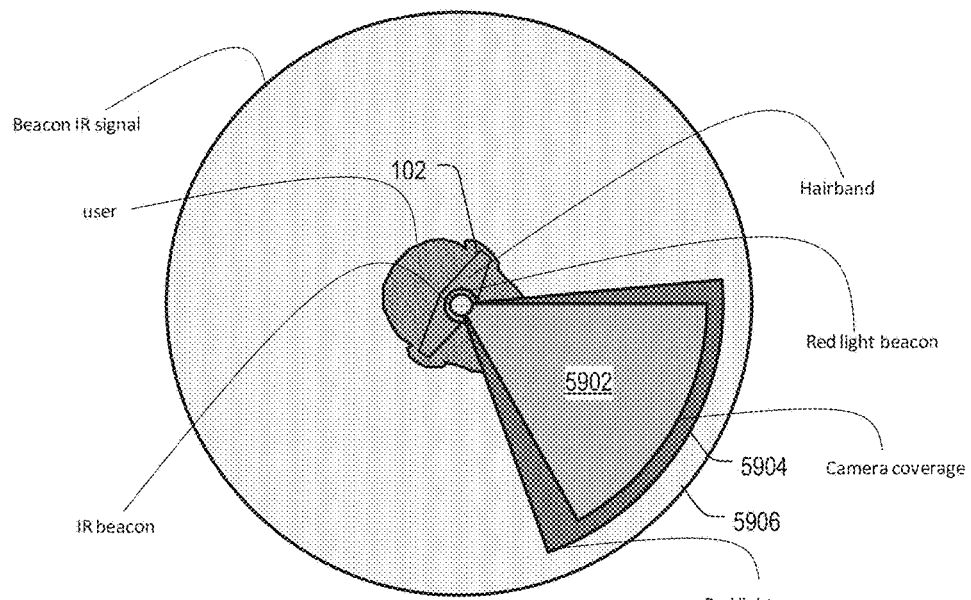
FIG. 65 is an illustration of a particular embodiment of a camera field of view, a directional beacon field, and omni-directional beacon field of a head-mountable camera apparatus.

FIG. 65 is a top view illustration of an typical camera field of view 5902, a directional beacon field 5904, and omnidirectional beacon field 5906 of a head-mountable camera apparatus 102. The directional beacon field 5904 (e.g., blinking red light coverage) substantially corresponds to the camera field of view 5902 (camera coverage). The directional beacon field may be a visible beacon that may alert others that the NANDeye camera(s) is recording and that may not be noticeable or detectable to people not in (or close to) the camera field of view 5902. The omnidirectional beacon field of view 5906 may correspond to a beacon emitter transmitting a substantially omnidirectional beacon signal. The omnidirectional beacon may be an IR signal to be outside a visible spectrum of other people (e.g., invisible to the unaided human eye).

Figure 66:
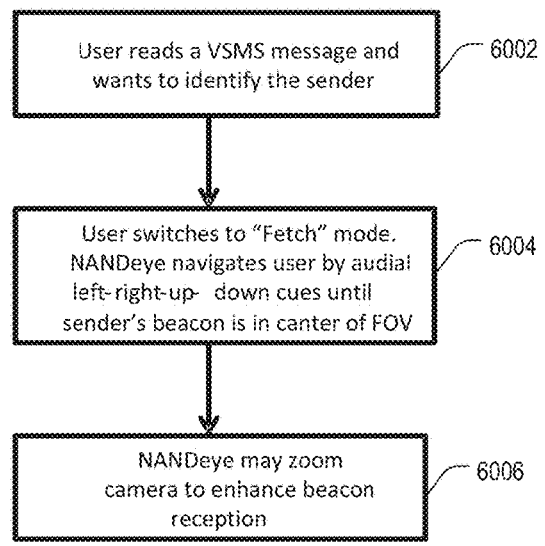
FIG. 66 is an illustration of a particular embodiment of a flowchart of a method of locating a beacon in a field of view of a head-mountable camera apparatus using audio signals.

FIG. 66 illustrates an example of a method of locating a beacon in a field of view of NANDeye headgear 102 using audio signals. Audible cues may be provided to the user to locate the target beacon, such as described with respect to FIG. 24. For example, a user may read a VSMS message and may want to identify a sender of the message, at 6002. The user may switch a NANDeye system to a "fetch" mode, at 6004. In the fetch mode, the NANDeye system may navigate the user's focus by audial signaling until a beacon of the sender of the VSMS is in a center of the user's FOV. For example, the NANDeye system (e.g., the user's headgear 102, or the user's phone 106, or a combination thereof) may determine a direction from the center of the user's FOV to the beacon and generate audible signals that are provided to the user, such as described with respect to FIG. 24. When the transmitting beacon is in or near the center of the user's FOV, a camera of the user's NANDeye may automatically zoom in to enhance reception of the beacon, at 6006.

In an embodiment, the system plays in the earphones a series of audible beeps that are time-correlated with the blinking of the intended beacon in the field of view. As the beacons are typically not synchronized with one another, only one of the beacons will blink in perfect correlation with the audial tone. The user visually scans his field of view, seeking a blinking led that is synchronized with the audial signals. Once found, the user can zoom the camera and/or direct his eye-sight to that beacon, as described in the flow chart of FIG. 67.

Figure 67:
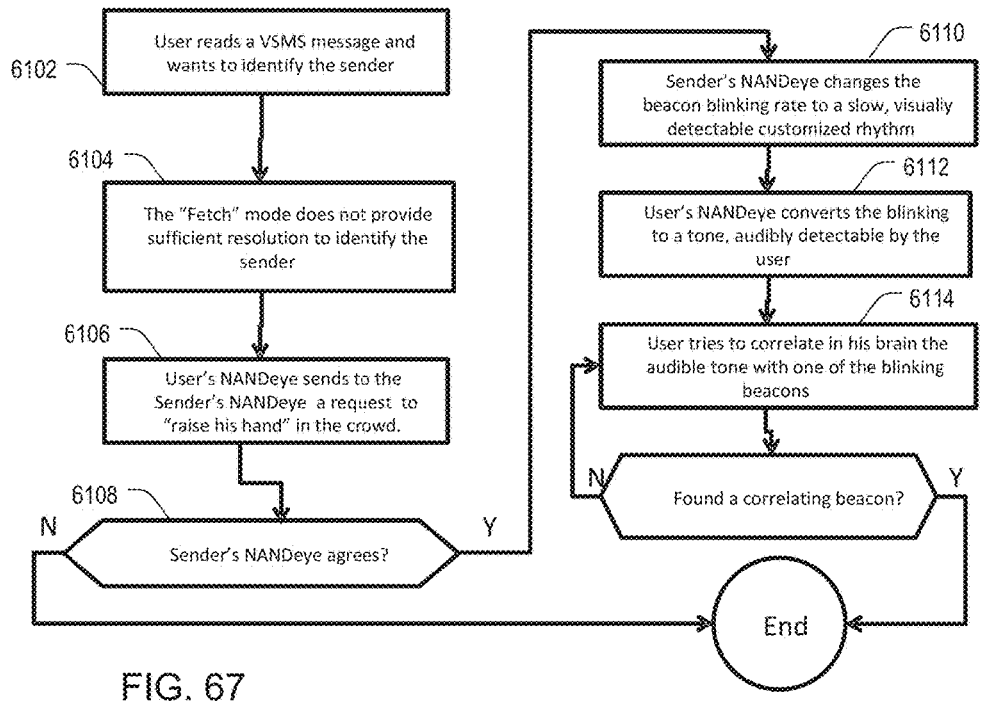
FIG. 67 is an illustration of a particular embodiment of a flowchart of a method of locating another user of a head-mountable camera apparatus using audio signals.

FIG. 67 illustrates by a flowchart an example that includes using the above mentioned method of locating another NANDeye user using audio signals. A NANDeye user may read a VSMS message and may want to identify the sender of the message, at 6102. The user may perform the "fetch" operation such as described with respect to FIG. 66, at 6104. However, the NANDeye may have insufficient resolution to locate the sender via the fetch operation. The user's NANDeye may send a request to the sender's NANDeye to provide a distinctive blinking pattern for visual recognition ("raise his hand"), at 6106. If the sender's NANDeye agrees, at 6108, the sender's NANDeye may change a beacon blinking rate, such as to a relatively slow, visually detectable customized rhythm, at 6110. The receiving user's NANDeye may convert the sender's blinking to a tone that is audibly detectable by a user, at 6112. A NANDeye user may compare visible blinking beacon signals to the audible tones (e.g. a pulse pattern) corresponding to blinking beacon signals of other NANDeyes to identify a NANDeye with a blinking beacon matching the tones, at 6114. In some implementations, the user may visually scan the user's FOV to locate a beacon matching the audible tones.

Figure 68:
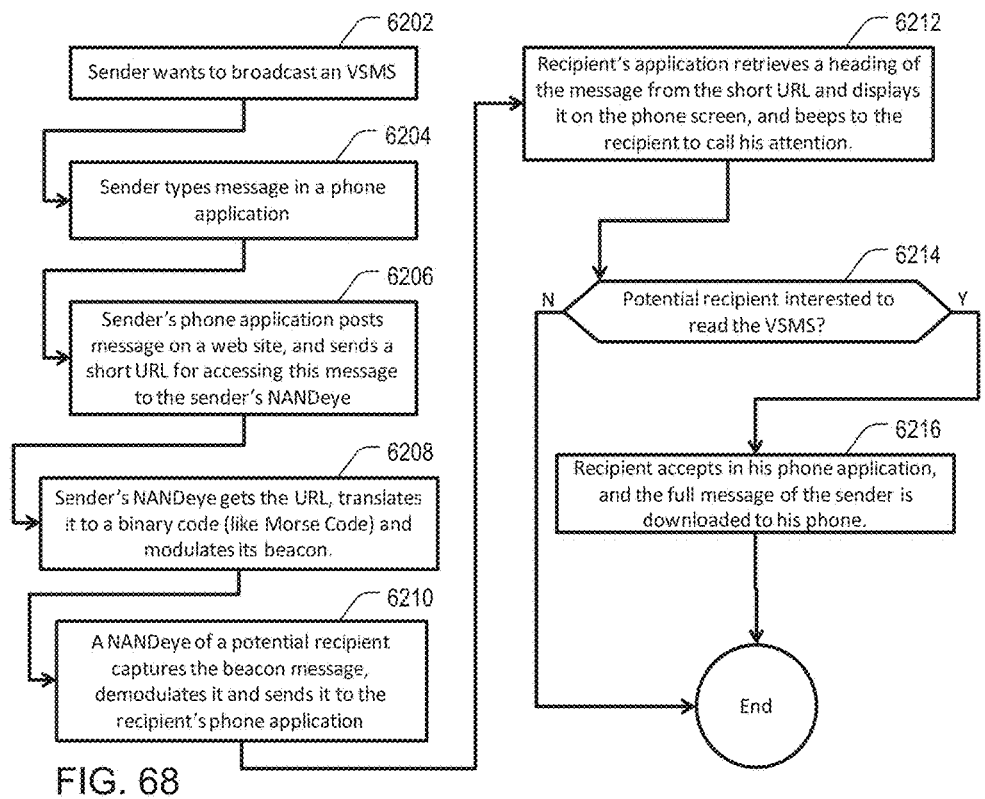
FIG. 68 is an illustration of a particular embodiment of a flowchart of a method of communication between head-mountable camera systems.

FIG. 68 illustrates an example of a method of communication between head-mountable camera systems including VSMS, such as described with respect to FIGS. 26-27. A sender may want to broadcast a VSMS message, at 6202. The sender may type a message using an application on the sender's phone, at 6204. An application on the sender's phone may post the message on a web site and may send a URL for accessing the message to the sender's NANDeye headgear, at 6206. The sender's NANDeye headgear may receive the URL, translate the URL to a binary code, and modulate a beacon of the NANDeye headgear using the binary code, at 6208.

A camera of a NANDeye of a potential recipient may detect the beacon message, demodulate the beacon message and send the resulting message (e.g., the URL) to an application on the recipient's phone, at 6210. The application on the recipient's phone may retrieve a heading of the message from the URL, display the heading on a screen of the phone, and signal the recipient (e.g., via a beeping noise), at 6212. A determination is made, at 6214, whether user input is received at the recipient's phone indicating the recipient wants to see the VSMS, at 6214. If so, the phone may download the full sender's message and display the message to the recipient, at 6216.

Figure 69:
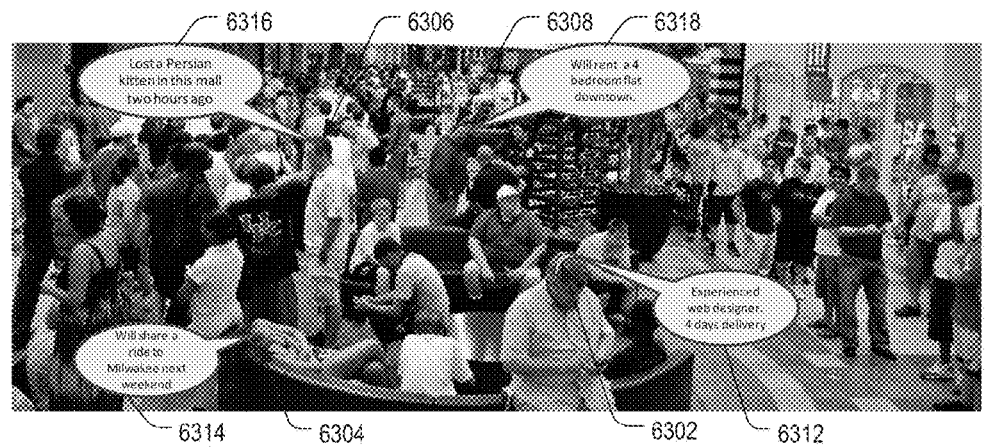
FIG. 69 is an illustration of a particular embodiment of a display showing messaging transmitted by multiple head-mounted beacons.

FIG. 69 illustrates an example of displaying messaging transmitted by multiple head-mounted beacons 6302-6308 of multiple NANDeye wearers as textual messages 6312-6314 in balloons that may be added to display with the video recording, such as by a phone 106 or a PC that processes video data recorded by a NANDeye headgear 102.

Figure 70:
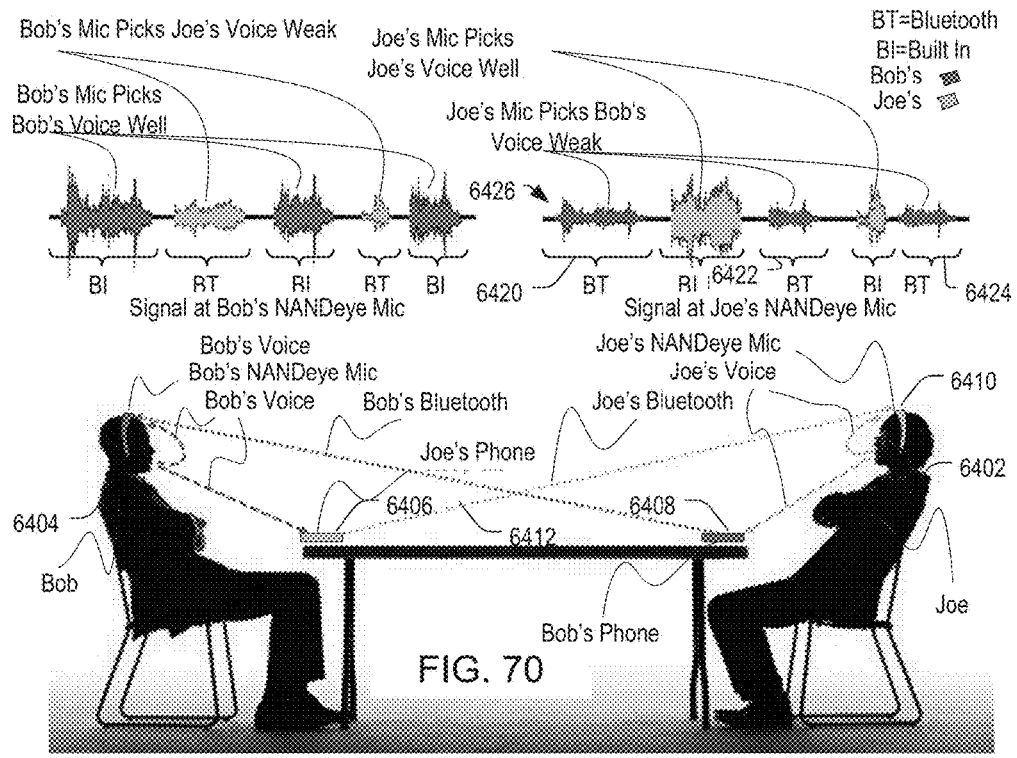
FIG. 70 is an illustration of a particular embodiment of multiple audio recording signals using multiple head-mountable camera devices and other recording devices.

FIG. 70 illustrates an example of multiple audio recording signals using multiple head-mountable camera devices and other recording devices. One NANDeye user Joe 6402 and another NANDeye user Bob 6404 may each record a conversation with their respective NANDeyes. Because of a large distance between them, Joe 6402 may position Joe's phone 6406 near Bob 6404, and Bob 6404 may position Bob's phone 6408 near Joe 6402. One or more microphones 6410 of Joe's NANDeye headgear 102 may clearly capture Joe's voice but may not capture Bob's voice as robustly due to the distance involved. However, one or more microphones of Joe's phone 6406 may capture Bob's voice more clearly (and may also capture Joe's voice less clearly) and may wirelessly transmit audio data 6412 to Joe's NANDeye headgear. Joe's NANDeye headgear may merge the audio of Bob's voice and Joe's voice from the NANDeye microphones 6410 and from the phone microphones. In one example, the NANDeye headgear may combine Bob's voice from both sources, may combine Joe's voice from both sources, or both. In another example, the NANDeye headgear may replace Bob's voice in portions 6420, 6422, 6424 of the audio data 6426 recorded at the NANDeye headgear with Bob's voice as recorded at Joe's phone. Bob's NANDeye headgear and phone may operate in a similar manner as described with respect to Joe's NANDeye headgear and phone.

Figure 71:
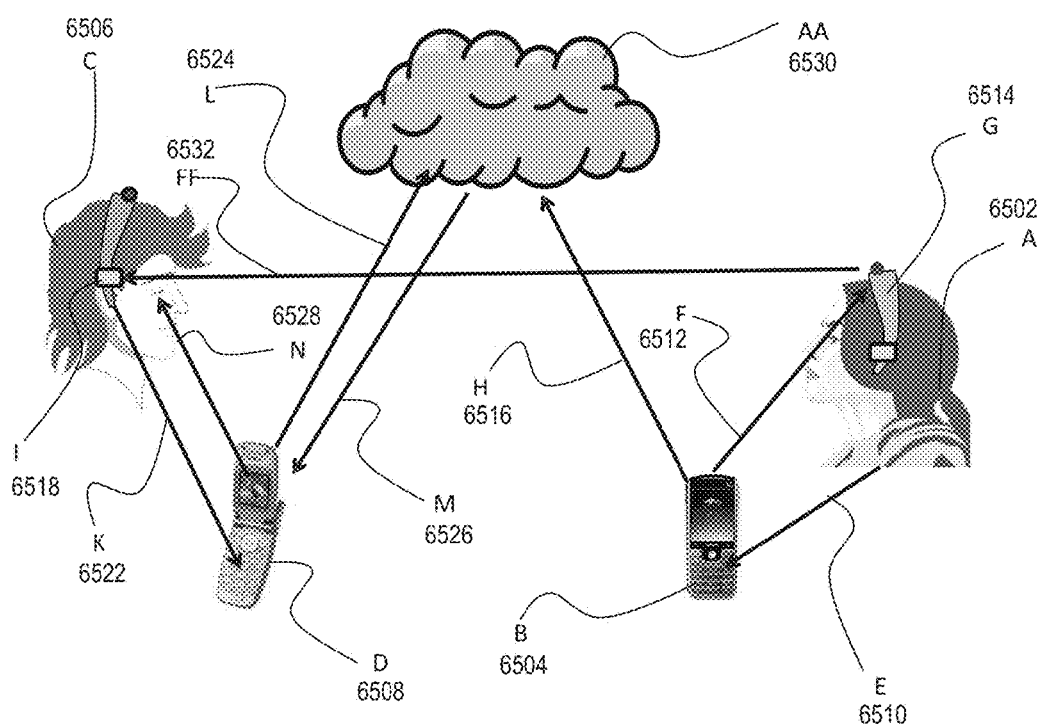
FIG. 71 is an illustration of a particular embodiment of communication between multiple head-mountable camera systems.

FIG. 71 illustrates an example communication between multiple NANDeye systems. A first NANDeye user (A) 6502 has a phone (B) 6504 and a second NANDeye user (C) 6506 has a phone (D) 6508. A 6502 enters into her phone B 6504 a message (E) 6510 to transmit via A's NANDeye headgear 102 beacon. A's phone B 6504 sends a wireless command (F) 6512 to instruct A's NANDeye headgear 102 (G) 6514 to transmit a message (FF) 6532 via a beacon. In addition, data (H) 6516 is uploaded to a server coupled to a network (AA) 6530 (e.g., the Internet). The message FF 6532 may include a URL to the data H 6516.

A camera (I) 6518 on C's NANDeye headgear 102 detects the transmitted message FF 6532 (e.g., by decoding a modulated beacon signal) and provides message information (K) 6522 to C's phone D 6508 for display, such as business card, message, or other information, and may also include the URL for the data H 6516. In response to a selection by C 6506 to retrieve the data H 6516, a request (L) 6524 is sent to the server and a reply (M) 6526 is received at the second user's phone.

Implementation of NANDeye using headgear 102 may provide several features, such as offering the highest point on the body for the beacon, enabling positioning the cameras at eye level, and rotating with the user's head both in tilt and pan. In addition, location of the headgear 102 near the ears provides a natural place for earphones, and contact may be established through one or more of the user's checks (e.g., with the mandible condyle bones).

However, although NANDeye is illustrated and described according to implementations using headgear 102, in other implementations NANDeye may not be implemented using headgear 102 and may instead be implemented using one or more other configurations.

NANDeye may provide a user with the freedom to log what the user hears, sees and does. NANDeye may help users in one or more of many other ways:

Recalling what the user saw if the user is not certain
Extracting more value from special visual experiences
Relief from summarizing meetings
Relief from summarizing lectures
Extend the user's virtual field of view
Prove what the user did and what the user did not do
Prove where the user has been and where the user has not been
Protect the user from false professional liabilities
Bookmark items the user sees for off-line handling
Identify off-line items the user does not recognize in real time
Automatically tag visual archive for future searches
Make logging a routine habit, avoid an explicit gesture Stream new acquaintances into the user's contact base
Count how much the user eats and/or chews
Recognize things the user has seen before
Track expenses without sorting and summing receipts
Track quantity and quality of gait motions
Identify people approaching the user
Record and process billable time
Extending a spouse's shopping arm
Monitoring back posture (e.g., in school)
Enhance free-lance news-reporting and interviews
Subscribe to a social eye-witness network
Develop, share and sell new NAND-apps
Deter personal violence
Contribute civil and social visual evidence Examples of some use cases in the user experience with NANDeye are provided in the following illustrative narrative.

> The user starts his NANDeye day by wearing the device on his head, removing the battery changer from the charger and placing the battery changer in the user's pocket. The user turns NANDeye on, does a quick CFOV calibration and forgets about NAND eye.
> 
> As the user goes out of the user's home, the user sees many other people wearing their NANDeye. Some of the other people are having a phone call, some of the other people are listening to music, and some of the other people are logging video using NANDeye. Those who log video have a blinking red LED on the top of their headgear.
> 
> When the user goes into a classroom to hear a lecture, the user turns NANDeye on, and so do several other students in the class. After the lecture, the user and the other students may activate a "share" function—they may all upload their video to the NANDeye server, and a professional, multi-feed, edited lecture may be downloaded to them for archiving.
> 
> On a few occasions during class, the user gets a beep from the NANDeye to alert the user that the user is sitting in a posture that is not good for the user's back. The user straightens up.
> 
> Before the user leaves the campus to go to his office, on his way to his car, the user notes a group of students, some of them wearing NANDeye, and one of the NANDeye blinks in the high "broadcast" power. The user is curious to see what is this guy "selling" and stops to look at the "selling" guy in the center of his FOV. A message shows up on the user's phone screen "will adopt a cute kitten". The user may have no kittens to offer for adoption, so the user may continue without interacting with the group of students.
> 
> Back in the office, the user may have to attend two meetings. The user wears NANDeye to get a summary of the meetings. During the meetings, the user bookmarks 2-3 segments where meeting participants discuss the user's duties. Tomorrow morning the user will get a transcript of the user's action items by mail, with the video clips from the bookmarked segments in case the transcript misses something.
> 
> Then the user may recall that when the user strolled in the mall with the user's spouse last evening, they stopped at a bookstore window and talked about a new book that they saw. The user could not recall the name of the author. The user logs into the user's home PC and searches for "Monday evening, bookstore". A link to a short video clip arrives. The user selects the link, views the video clip, and orders the book for the user's spouse.

As another example, NANDeye may be used in the context of medical procedures. To illustrate, NANDeye headgear may be used for tracking and/or guiding during medical procedures, such as surgical procedures. A surgeon's view may be captured by the head-mounted camera(s) and may be provided to students for educational purposes, provided to a remote medical practitioner for collaboration or instruction during a surgical procedure, archived as evidence (e.g., for potential malpractice assertions), etc. However, medical applications are not limited to surgical applications and may include other applications such as physical examinations, laboratory procedures, psychiatric evaluations, etc.

NANDeye may provide many more applications than described herein. As users begin to develop NANDapps (e.g., NANDeye applications) for smart phones, many other applications may be added.

In accordance with one or more of the above-described embodiments and methods, an apparatus may include at least two cameras and a mounting structure to which are mounted the at least two cameras. The mounting structure is configured, while the mounting structure is worn on a user's head, to remain substantially or entirely outside of a field of vision of the user so that the mounting structure and the cameras remain out of the user's eyesight and to position the at least two cameras to be substantially or entirely outside of the field of vision of the user and to be at approximately eye level of the user. The at least two cameras may be positioned to enable stereo video recording via the at least two cameras.

A method may be performed at a head mountable device that includes a memory and at least two cameras coupled to a mounting structure, where the mounting structure is configured to remain substantially or entirely outside of a field of vision of a user and to position the at least two cameras to be substantially or entirely outside of the field of vision of the user and to be at approximately eye level of the user. The method may include performing, while the head mountable device is worn on a user's head, initiating video recording via at least one of the cameras while the at least two cameras and the mounting structure are substantially or entirely outside of a field of vision of a user so that the user's field of vision is not obstructed during the video recording, where the video recoding may substantially correspond to a recording of a visual experience of the user, such as observed from a point of view of the user, and storing video data from the at least one camera in the memory.

As a non-limiting example, the apparatus may correspond to the NANDeye headgear 102 depicted in FIG. 31 and the method may be performed by the NANDeye headgear 102 depicted in FIG. 31.

In accordance with one or more of the above-described embodiments and methods, an apparatus may include a camera, a sensor, and a controller configured to adjust at least one of a focal distance of the camera and a field of view of the camera in response to receiving an output of the sensor. The sensor may include at least one of an inclinometer or a satellite-based positioning sensor. A second camera may be coupled to the controller. The controller may be configured to toggle between multiple modes of operation of the camera and the second camera. The multiple modes may include a stereo recording mode and an extended field of view mode. Toggling between the multiple modes may be based on the output of the sensor.

A method may be performed at a device that includes a camera and a sensor. The method may include receiving an output of the sensor, and adjusting at least one of a focal distance of the camera and a field of view of the camera in response to receiving the output of the sensor, where the sensor may include at least one of an inclinometer or a satellite-based positioning sensor.

The device may include a second camera. The method may include toggling between multiple modes of operation of the camera and the second camera, the multiple modes including a stereo recording mode and an extended field of view mode.

As a non-limiting example, the apparatus may correspond to, and the method may be performed by, the NANDeye headgear 102 depicted in FIG. 17, 33, or 50.

In accordance with one or more of the above-described embodiments and methods, an apparatus may include a mounting structure that is configured to be worn on a user's head and to hold a camera, a storage device attached to the mounting structure and configured to store first data received from the camera, the first data including one or both of image data and video data, where the stored first data has a first quality, and a controller coupled to the mounting structure and configured to provide second data to a transmitter, where the second data corresponds to the first data and where the second data has a second quality different from the first quality.

A method may be performed at a head mountable device that may include a mounting structure that is configured to be worn on a user's head and to hold a camera, a storage device coupled to the mounting structure, and a transmitter coupled to the mounting structure. The method may include storing, in the storage device, first data received from the camera, the first data including one or both of image data and video data, where the stored first data has a first quality, and providing second data to the transmitter, where the second data corresponds to the first data and where the second data has a second quality different from the first quality.

The first quality may correspond to a first frame rate and the second quality may correspond to a second frame rate that is less than the first frame rate. The first quality may correspond to a first resolution and the second quality may correspond to a second resolution that is less than the first resolution. The first quality may correspond to a first color depth and the second quality may correspond to a second color depth that is less than the first color depth.

As a non-limiting example, the apparatus may correspond to, and the method may be performed by, the NANDeye headgear 102 depicted in FIG. 5 or 46.

In accordance with one or more of the above-described embodiments and methods, an apparatus may include a chassis including a central portion, a first leg coupled to the central portion, and a second leg coupled to the central portion. The chassis may be configured to support a camera attached to the first leg or to the second leg substantially at an eye level of a user's head while worn on a user's head with the central portion in contact with the top of the user's head and with the first and second legs extending downward from the top of the user's head and on opposite sides of the user's head.

The apparatus may also include a first camera attached to the chassis, and a second camera attached to the chassis, where the first camera and the second camera are positioned substantially at the eye level of the user's head while the chassis is worn on the user's head. The apparatus may also include at least one earphone positioned to be proximate to an ear of the user's head while the chassis is worn on the user's head. The apparatus may also include a transmitter configured to wirelessly transmit data. The apparatus may also include a jaw motion sensor configured to detect a predetermined motion of the jaw of the user's head while the chassis is worn on the user's head.

A method may be performed at a chassis having a central portion, a first leg coupled to the central portion, and a second leg coupled to the central portion. The method may include performing, while the chassis is worn on a user's head and with the first and second legs extending downward from the top of the user's head and on opposite sides of the user's head, contacting, by the central portion, the top of the user's head, and supporting a camera attached to the first leg or to the second leg substantially at an eye level of the user's head. A first camera may be attached to the chassis and a second camera may be attached to the chassis, where the first camera and the second camera are positioned substantially at the eye level of the user's head while the chassis is worn on the user's head. At least one earphone may be positioned to be proximate to an ear of the user's head while the chassis is worn on the user's head. The method may include wirelessly transmitting data from the chassis. The method may include detecting a predetermined motion of the jaw of the user's head while the chassis is worn on the user's head.

As a non-limiting example, the apparatus may correspond to, and the method may be performed by, the NANDeye headgear 102 depicted in FIG. 31.

In accordance with one or more of the above-described embodiments and methods, an apparatus may include a chassis including a central portion, a first leg coupled to the central portion, and a second leg coupled to the central portion. The chassis may be configured to support a camera substantially at an eye level of a user's head while worn on a user's head with the central portion in contact with the top of the user's head and with the user's head between the first and second legs. The first leg may include a first curved portion to enable passage of a first eyeglass temple worn on the user's head and the second leg may include a second curved portion to enable passage of a second eyeglass temple worn on the user's head.

A method may be performed at a chassis having a central portion, a first leg coupled to the central portion, and a second leg coupled to the central portion, where the first leg may include a first curved portion to enable passage of a first eyeglass temple worn on a user's head and the second leg may include a second curved portion to enable passage of a second eyeglass temple worn on the user's head. The method may include performing, while the chassis is worn on the user's head and with the user's head between the first and second legs, contacting, by the central portion, the top of the user's head, and supporting a camera substantially at an eye level of the user's head.

As a non-limiting example, the apparatus may correspond to, and the method may be performed by, the NANDeye headgear 102 depicted in FIG. 38.

In accordance with one or more of the above-described embodiments and methods, an apparatus may include a chassis including a central portion, a first leg coupled to the central portion, and a second leg coupled to the central portion. The chassis may be configured to support a camera substantially at an eye level of a user's head while worn on a user's head with the central portion over the user's head and with the user's head between the first and second legs. The first leg may include a first curved portion to contact a first eyeglass temple worn on the user's head and the second leg may include a second curved portion to contact a second eyeglass temple worn on the user's head.

A method may be performed at a chassis having a central portion, a first leg coupled to the central portion, and a second leg coupled to the central portion, where the first leg may include a first curved portion to contact a first eyeglass temple worn on a user's head and the second leg may include a second curved portion to contact a second eyeglass temple worn on the user's head. The method may include performing, while the chassis is worn on the user's head and with the user's head between the first and second legs, contacting, by the central portion, the top of the user's head, and supporting a camera substantially at an eye level of the user's head.

As a non-limiting example, the apparatus may correspond to, and the method may be performed by, the NANDeye headgear 102 depicted in FIG. 38.

In accordance with one or more of the above-described embodiments and methods, an apparatus may include a chassis configured to support a camera while the chassis may be worn on a user's head, a sensor configured to detect a condition corresponding to whether the chassis is being worn, and a controller configured to modify an operation of the camera in response to an output of the sensor corresponding to the chassis not being worn. The sensor may include a pulse detector. The sensor may include a respiration detector. The sensor may include a motion detector.

A method may be performed at a device including a chassis, the chassis configured to be worn on a user's head, the device including a camera and a sensor. The method may include receiving an output of the sensor, and modifying an operation of the camera in response to the output of the sensor corresponding to the chassis not being worn.

As a non-limiting example, the apparatus may correspond to, and the method may be performed by, the NANDeye headgear 102 depicted in FIG. 31, 35, or 37. As another example, one or more of the sensors illustrated in FIG. 36 may include a pulse detector, a respiration detector, a motion detector, or any combination thereof.

In accordance with one or more of the above-described embodiments and methods, an apparatus may include a chassis configured to support a camera while the chassis is worn on a user's head, and a lens holder configured to adjust a position of an external lens relative to a field of view of the camera in response to a change of orientation of the chassis.

A method may be performed at a device including a chassis, the chassis configured to be worn on a user's head, the device including a camera. The method may include positioning an external lens at a first orientation relative to the camera, and positioning the external lens at a second orientation relative to the camera in response to a change in orientation of the chassis.

As a non-limiting example, the apparatus may correspond to, and the method may be performed by, the NANDeye headgear 102 depicted in FIG. 18.

In accordance with one or more of the above-described embodiments and methods, an apparatus may include a chassis configured to support a first camera and a second camera at approximately an eye level of a user's head while the chassis is worn on the user's head. The apparatus may include a mechanical adjustment mechanism coupled to the chassis and configured to change a first tilt of the first camera in a first direction and to concurrently change a second tilt of the second camera in a second direction opposite to the first direction.

A method may be performed at a device including a chassis, the device including a first camera, a second camera, and a mechanical adjustment mechanism coupled to the chassis, the chassis configured to support the first camera and the second camera at approximately an eye level of a user's head while the chassis is worn on the user's head. The method may include performing, while the chassis is worn on the user's head, receiving a user input at the mechanical adjust mechanism, and in response to the received user input, changing a first tilt of the first camera in a first direction and concurrently changing a second tilt of the second camera in a second direction opposite to the first direction.

As a non-limiting example, the apparatus may correspond to, and the method may be performed by, the NANDeye headgear 102 depicted in FIG. 17.

In accordance with one or more of the above-described embodiments and methods, an apparatus may include a first camera and a second camera coupled to a chassis that is configured to support the first camera and the second camera at approximately an eye level of a user's head while the chassis is worn on the user's head. The apparatus may include a controller coupled to the first camera and to the second camera to enable stereo video recording, where the controller is configured to initiate video recording at the first camera according to a first frame rate and to initiate video recording at the second camera at a second frame rate that is different than the first frame rate.

A method may be performed at a device including a chassis, the device including a first camera and a second camera, the chassis configured to support the first camera and the second camera at approximately an eye level of a user's head while the chassis is worn on the user's head. The method may include performing, while the chassis is worn on the user's head, initiating video recording at the first camera according to a first frame rate, and selectively initiating video recording at the second camera at a second frame rate that is different than the first frame rate.

As a non-limiting example, the apparatus may correspond to, and the method may be performed by, the NANDeye headgear 102 depicted in FIG. 31 operating in accordance with the description of FIG. 19.

In accordance with one or more of the above-described embodiments and methods, an apparatus may include a first camera and a second camera coupled to a chassis that is configured to support the first camera and the second camera at approximately an eye level of a user's head while the chassis is worn on the user's head. The apparatus may include a controller coupled to the first camera and to the second camera to enable stereo video recording, where the controller is configured to adjust a first focal length of the first camera to be different from a second focal length of the second camera.

A method may be performed at a device including a chassis, the device including a first camera and a second camera, the chassis configured to support the first camera and the second camera at approximately an eye level of a user's head while the chassis is worn on the user's head. The method may include performing, while the chassis is worn on the user's head, setting a first focal length of the first camera to be substantially equal to a second focal length of the second camera, and adjusting the first focal length of the first camera to be different from the second focal length of the second camera.

As a non-limiting example, the apparatus may correspond to, and the method may be performed by, the NANDeye headgear 102 depicted in FIG. 31 operating in accordance with the description of FIG. 20 or FIG. 51.

In accordance with one or more of the above-described embodiments and methods, an apparatus may include a first camera and a second camera coupled to a chassis that is configured to support the first camera and the second camera. The apparatus may include a controller coupled to the first camera and to the second camera to enable stereo video recording, where the controller is configured to adjust a first image resolution of the first camera to a value that is different from a second image resolution of the second camera.

A method may be performed at a device including a chassis, the device including a first camera and a second camera, the chassis configured to support the first camera and the second camera. The method may include setting a first image resolution of the first camera to be substantially equal to a second image resolution of the second camera, and adjusting the first image resolution of the first camera to a value that is different from the second image resolution of the second camera.

As a non-limiting example, the apparatus may correspond to, and the method may be performed by, the NANDeye headgear 102 depicted in FIG. 31 operating in accordance with the description of FIG. 20.

In accordance with one or more of the above-described embodiments and methods, an apparatus may include a first camera and a second camera coupled to a chassis that is configured to support the first camera and the second camera at approximately an eye level of a user's head while the chassis is worn on the user's head. The apparatus may include a controller coupled to the first camera and to the second camera to calibrate a first field of view of the first camera with a second field of view of the second camera by locating a feature in the first field of view, locating the feature in the second field of view and determining at least one of a pan offset and a tilt offset based on a position difference between the feature in the first field of view and the feature in the second field of view.

A method may be performed at a device including a chassis, the device including a first camera and a second camera, the chassis configured to support the first camera and the second camera at approximately an eye level of a user's head while the chassis is worn on the user's head. The method includes calibrating a first field of view of the first camera with a second field of view of the second camera by performing, while the chassis is worn on the user's head, locating a feature in the first field of view, locating the feature in the second field of view, and determining at least one of a pan offset and a tilt offset based on a position difference between the feature in the first field of view and the feature in the second field of view.

As a non-limiting example, the apparatus may correspond to, and the method may be performed by, the NANDeye headgear 102 depicted in FIG. 31 operating in accordance with the description of FIG. 14.

In accordance with one or more of the above-described embodiments and methods, an apparatus may include a first camera and a second camera coupled to a chassis that is configured to support the first camera and the second camera. The apparatus may include a controller coupled to the first camera and to the second camera to enable stereo video recording, where the controller is configured to adjust a first spectral sensitivity of the first camera to a value that is different from a second spectral sensitivity of the second camera.

A method may be performed at a device including a chassis, the device including a first camera and a second camera, the chassis configured to support the first camera and the second camera. The method may include setting a first spectral sensitivity of the first camera to be substantially equal to a second spectral sensitivity of the second camera, and adjusting the first spectral sensitivity of the first camera to a value that is different from the second spectral sensitivity of the second camera.

As a non-limiting example, the apparatus may correspond to, and the method may be performed by, the NANDeye headgear 102 depicted in FIG. 31 operating in accordance with the description of FIG. 21.

In accordance with one or more of the above-described embodiments and methods, an apparatus may include a chassis configured to be worn on a user's head, and a patterned laser pointer device attached to the chassis.

In accordance with one or more of the above-described embodiments and methods, a method may be performed at a device including a chassis configured to be worn on a user's head and a patterned laser pointer device attached to the chassis. The method may include, in response to receiving a first user input, activating the patterned laser pointer device, and in response to receiving a second user input, deactivating the patterned laser pointer device.

As a non-limiting example, the apparatus may correspond to, and the method may be performed by, the NANDeye headgear 102 depicted in FIG. 31 operating in accordance with the description of FIG. 53.

In accordance with one or more of the above-described embodiments and methods, an apparatus may include a chassis configured to be worn on a user's head, a first laser pointer device attached to the chassis, and a second laser pointer device attached to the chassis, where the first laser pointer device is configured to generate a first beam and where the second laser pointer device is configured to generate a second beam substantially parallel to the first beam.

A method may be performed at a device including a chassis configured to be worn on a user's head, the device including a first laser pointer device attached to the chassis and a second laser pointer device attached to the chassis. The method may include generating a first beam from the first laser pointer device, and generating a second beam from the second laser pointer device, where the second beam is substantially parallel to the first beam.

As a non-limiting example, the apparatus may correspond to, and the method may be performed by, the NANDeye headgear 102 depicted in FIG. 31 operating in accordance with the description of FIGS. 54-55.

In accordance with one or more of the above-described embodiments and methods, an apparatus may include a chassis configured to be worn on a user's head, a first laser pointer device attached to the chassis and a second laser pointer device attached to the chassis, where the first laser pointer device is configured to generate a first beam and where the second laser pointer device is configured to generate a second beam. The apparatus may include a camera attached to the chassis and a controller configured to determine a distance to an object by detecting a first point of contact of the first beam and a second point of contact of the second beam with the object in image data from the camera and determining an angular distance between the first point and the second point.

A method may be performed at a device including a chassis, the chassis configured to be worn on a user's head, the device including a first laser pointer device attached to the chassis, a second laser pointer device attached to the chassis, and a camera attached to the chassis, where the first laser pointer device is configured to generate a first beam and where the second laser pointer device is configured to generate a second beam. The method may include determining a distance to an object by detecting a first point of contact of the first beam and a second point of contact of the second beam with the object in image data from the camera, and determining an angular distance between the first point and the second point.

As a non-limiting example, the apparatus may correspond to, and the method may be performed by, the NANDeye headgear 102 depicted in FIG. 31 operating in accordance with the description of FIGS. 54-55.

In accordance with one or more of the above-described embodiments and methods, an apparatus may include a camera, a chassis that is configured to support the camera while the chassis is worn on a user's head, a speaker coupled to the chassis, and a controller coupled to receive video data generated by the camera and to cause the speaker to generate an audio signal based on a location of an object in a field of view of the camera to enable object-locating information to be provided to a user while the user is wearing the chassis.

A method may be performed at a device including a camera, a chassis configured to support the camera while the chassis is worn on a user's head, and a speaker coupled to the chassis. The method may include receiving video data generated by the camera, and generating an audio signal based on a location of an object in a field of view of the camera to enable object-locating information to be provided to a user while the user is wearing the chassis.

As a non-limiting example, the apparatus may correspond to, and the method may be performed by, the NANDeye headgear 102 depicted in FIG. 31 operating in accordance with the description of FIG. 24.

In accordance with one or more of the above-described embodiments and methods, an apparatus may include a camera, a chassis that is configured to support the camera while the chassis is worn on a head of a user, and a controller coupled to receive video data generated by the camera and to calibrate a field of view of the camera with respect to a field of view of the user while the chassis is worn on the head of the user by detecting a feature in the video data and determining an offset corresponding to a location of the feature in the video data relative to a reference point in the field of view of the camera.

A method may be performed at a device including a camera and a chassis configured to support the camera while the chassis is worn on a user's head. The method may include receiving video data generated by the camera. The method may include calibrating a field of view of the camera with respect to a field of view of a user while the chassis is worn on the head of the user by detecting a feature in the video data, and determining an offset corresponding to a location of the feature in the video data relative to a reference point in the field of view of the camera.

As a non-limiting example, the apparatus may correspond to, and the method may be performed by, the NANDeye headgear 102 depicted in FIG. 31 operating in accordance with the description of FIG. 14.

In accordance with one or more of the above-described embodiments and methods, an apparatus may include a camera and a processor coupled to receive video data generated by the camera and to adjust at least one of a frame rate, a focal length, or an image resolution of the camera in response to content of the video data.

A method may be performed at a device including a camera. The method may include receiving video data generated by the camera and adjusting at least one of a frame rate, a focal length, or an image resolution of the camera in response to content of the video data.

As a non-limiting example, the apparatus may correspond to, and the method may be performed by, the NANDeye headgear 102 depicted in FIG. 31 operating in accordance with a description of one or more of FIGS. 13 and 15-20.

In accordance with one or more of the above-described embodiments and methods, an apparatus may include a camera, a chassis that is configured to support the camera while the chassis is worn on a head of a user, and a sensor coupled to the chassis and configured to detect jaw movement through a cheek of the user while the chassis is worn on the head of the user, where an operation of the camera is responsive to an output of the sensor.

A method may be performed at a device including a camera, a chassis that is configured to support the camera while the chassis is worn on a head of a user, and a sensor coupled to the chassis. The method may include detecting, via the sensor, jaw movement through a cheek of the user while the chassis is worn on the head of the user, and controlling operation of the camera responsive to an output of the sensor.

As a non-limiting example, the apparatus may correspond to, and the method may be performed by, the NANDeye headgear 102 depicted in FIGS. 31, 35, 37, etc.

In accordance with one or more of the above-described embodiments and methods, an apparatus may include a camera, a chassis that is configured to support the camera while the chassis is worn on a head of a user, and a sensor coupled to the chassis and configured to detect deformation of the chassis corresponding to jaw movement of the user while the chassis is worn on the head of the user, where an operation of the camera is responsive to an output of the sensor.

A method may be performed at a device including a camera, a chassis that is configured to support the camera while the chassis is worn on a head of a user, and a sensor coupled to the chassis. The method may include detecting, via the sensor, deformation of the chassis corresponding to jaw movement of the user while the chassis is worn on the head of the user, and controlling operation of the camera responsive to an output of the sensor.

As a non-limiting example, the apparatus may correspond to, and the method may be performed by, the NANDeye headgear 102 depicted in FIGS. 31, 35, 37, etc.

In accordance with one or more of the above-described embodiments and methods, an apparatus may include a camera and a sensor configured to detect an audio signal of a clicking device while the clicking device is within a mouth of a user of the camera, where an operation of the camera is responsive to an output of the sensor.

A method may be performed at a device including a camera and a sensor. The method may include detecting, via the sensor, an audio signal of a clicking device while the clicking device is within a mouth of a user of the camera, and controlling operation of the camera responsive to an output of the sensor.

As a non-limiting example, the apparatus may correspond to, and the method may be performed by, the NANDeye headgear 102 depicted in FIG. 31 operating in accordance with a description of one or more of FIGS. 47-49.

In accordance with one or more of the above-described embodiments and methods, an apparatus may include a camera, a chassis connected to the camera, and a sensor coupled to the chassis. The sensor is configured to detect one or more environmental conditions of the camera and to provide a sensor output. At least one adaptive parameter of the camera is adjusted responsive to the sensor output, the at least one adaptive parameter including one or more of a frame rate, a focal length, and an image resolution. For example, the at least one adaptive parameter may include the frame rate. As another example, the at least one adaptive parameter may include the focal length. As anther example, the at least one adaptive parameter may include the image resolution.

A method may be performed at a device including a camera, a chassis connected to the camera, and a sensor coupled to the chassis. The method may include detecting, via the sensor, one or more environmental conditions of the camera, and adjusting at least one adaptive parameter of the camera responsive to an output of the sensor, the at least one adaptive parameter including one or more of a frame rate, a focal length, and an image resolution.

As a non-limiting example, the apparatus may correspond to, and the method may be performed by, the NANDeye headgear 102 depicted in FIG. 30 or FIG. 36. One or more of the sensors, such as the sensors depicted in FIG. 30 or FIG. 36, may detect an environmental condition and in response adjust an adaptive parameter. For example, as illustrated in FIG. 13 a field of view parameter may be adjusted in response to a sensor (e.g., an inclinometer) detecting repeated tilt of user's head, or a focal length parameter may be adjusted in response to a sensor (e.g., a camera) detecting near and far objects in a scene, as illustrative, non-limiting examples.

In accordance with one or more of the above-described embodiments and methods, an apparatus may include a camera, a chassis that is configured to support the camera while the chassis is worn on a head of a user, and means for adjusting at least one of a focus length of the camera or a width of field of view of the camera in response to an inclination of the chassis. As an example, the means for adjusting may include a lens connected to a pendulum.

As another example, the means for adjusting may include an inclinometer connected to the chassis and a controller coupled to the inclinometer and to the camera, where the controller is configured to receive an output of the inclinometer and to send a signal to the camera indicating an adjustment of the at least one of the focus length of the camera or the width of the field of view of the camera. The signal depends on the output of the inclinometer.

A method may be performed at a device including a camera and a chassis that is configured to support the camera while the chassis is worn on a head of a user. The method may include detecting an inclination of the chassis, and adjusting at least one of a focus length of the camera or a width of field of view of the camera in response to the inclination of the chassis. The device may include a lens connected to a pendulum.

The device may include an inclinometer connected to the chassis, and the method may include receiving an output of the inclinometer and sending a signal to the camera indicating an adjustment of the at least one of the focus length of the camera or the width of the field of view of the camera, where the signal depends on the output of the inclinometer.

As a non-limiting example, the apparatus may correspond to, and the method may be performed by, the NANDeye headgear 102 depicted in FIG. 5 operating in accordance with the description of one or more of FIGS. 13 and 15-20.

In accordance with one or more of the above-described embodiments and methods, an apparatus may include multiple cameras configurable to operate according to a stereo video recording mode, a chassis that is configured to support the multiple cameras while the chassis is worn on a head of a user, and a receiver configured to wirelessly receive camera operating instructions from a portable electronic device, where at least one of the multiple cameras is responsive to the camera operating instructions. The portable electronic device may include a mobile phone 106.

A method may be performed at a device including multiple cameras configurable to operate according to a stereo video recording mode, a chassis that is configured to support the multiple cameras while the chassis is worn on the head of a user, and a receiver. The method may include wirelessly receiving camera operating instructions from a portable electronic device, and controlling operation of at least one of the multiple cameras responsive to the camera operating instructions.

As a non-limiting example, the apparatus may correspond to, and the method may be performed by, the NANDeye headgear 102 depicted in FIG. 1 receiving operating instructions from the smartphone programmed to run NANDeye applications as depicted in FIG. 1.

In accordance with one or more of the above-described embodiments and methods, an apparatus may include a portable electronic device including a display and a transmitter. The portable electronic device is configured to provide a user interface via the display to receive a camera operating instruction of a user, the camera operating instruction corresponding to an operation of a multi-camera stereo video recording device. The portable electronic device is configured to transmit the camera operating instruction to a head-mounted multi-camera stereo video recording device while the portable electronic device is wirelessly coupled to the head-mounted multi-camera stereo video recording device. The portable electronic device may include a mobile phone 106.

A method may be performed at a portable electronic device including a display and a transmitter. The method may include receiving a camera operating instruction of a user, the camera operating instruction corresponding to an operation of a multi-camera stereo video recording device, and transmitting the camera operating instruction to a head-mounted multi-camera stereo video recording device while the portable electronic device is wirelessly coupled to the head-mounted multi-camera stereo video recording device.

As a non-limiting example, the apparatus may correspond to, and the method may be performed by, the smartphone programmed to run NANDeye applications depicted in FIG. 1 sending camera operating instructions to the NANDeye headgear 102 depicted in FIG. 1.

In accordance with one or more of the above-described embodiments and methods, an apparatus may include a camera, a chassis that is configured to support the camera while the chassis is worn on a head of a user, a user interface configured to receive, during a video recording operation of the camera, a first user input corresponding to a beginning of a video segment and a second user input corresponding to an ending of the video segment, and a controller configured to associate a first receipt time of the first user input and a second receipt time of the second user input with video data received from the camera to enable the video segment to be identified during a video post-processing operation. The controller may be further configured to store a first indication of the first user input and a second indication of the second user input to enable the video segment to be edited during the video post-processing operation.

The first user input and the second user input may have a single input type. The single input type may be one of an audio type that is received via a microphone coupled to the chassis, a visual type that is received via the camera, or a jaw movement type that is received via a sensor coupled to the chassis.

The first user input may indicate a beginning of a deletion operation to be applied to the video segment and where the second user input indicates an end of the deletion operation. The first user input may indicate a beginning of a video-to-still-image conversion operation to be applied to the video segment and the second user input may indicate an end of the video-to-still-image conversion operation.

The controller may be configured to associate a third receipt time of a third user input, the third receipt time after the first receipt time and before the second receipt time, with an offset of a beginning of an extended video segment that begins prior to the first receipt time. A time difference between the first receipt time and the third receipt time may correspond to a time difference between the beginning of the extended video segment and the beginning of the video segment.

A method may be performed at a device including a camera and a chassis that is configured to support the camera while the chassis is worn on the head of a user. The method may include receiving, during a video recording operation of the camera, a first user input corresponding to a beginning of a video segment and a second user input corresponding to an ending of the video segment, and associating a first receipt time of the first user input and a second receipt time of the second user input with video data received from the camera to enable the video segment to be identified during a video post-processing operation.

The method may include associating a third receipt time of a third user input, the third receipt time after the first receipt time and before the second receipt time, with an offset of a beginning of an extended video segment that begins prior to the first receipt time, where a time difference between the first receipt time and the third receipt time corresponds to a time difference between the beginning of the extended video segment and the beginning of the video segment. The method may include storing a first indication of the first user input and a second indication of the second user input to enable the video segment to be edited during the video post-processing operation.

As a non-limiting example, the apparatus may correspond to, and the method may be performed by, the NANDeye headgear 102 depicted in FIG. 31 operating in accordance with the description of FIG. 11.

In accordance with one or more of the above-described embodiments and methods, an apparatus may include a camera and a processor coupled to the camera, where the processor is configured to process video data received from the camera to determine whether the video data may include a hand gesture instruction by comparing a time-varying pattern of brightness of the video data to pattern of brightness that is characteristic of at least a portion of a user's hand being passed across a field of view of the camera, and where in response to detecting the hand gesture instruction the processor is configured to process the hand gesture instruction.

A method may be performed at a device including a camera. The method may include processing video data received from the camera to determine whether the video data may include a hand gesture instruction by comparing a time-varying pattern of brightness of the video data to a pattern of brightness that is characteristic of at least a portion of a user's hand being passed across a field of view of the camera, and processing the hand gesture instruction in response to detecting the hand gesture instruction.

As a non-limiting example, the apparatus may correspond to, and the method may be performed by, the NANDeye headgear 102 depicted in FIG. 31 operating in accordance with the description of one or more of FIGS. 22 and 57-60.

In accordance with one or more of the above-described embodiments and methods, an apparatus may include a camera and a processor coupled to the camera, where the processor is configured to process video data received from the camera to determine whether the video data may include an image of a barcode, and where in response to detecting the image of the barcode the processor is configured to translate the barcode to determine a content of the barcode and to control at least one of a camera parameter or a video data processing parameter based on the content of the barcode. In response to the content of the barcode indicating that video recording is unallowed, the processor may be configured to prevent storage of at least a portion of the video data and/or erasing at least the portion of the video data.

A method may be performed at a device including a camera. The method may include processing video data received from the camera to determine whether the video data may include an image of a barcode, and in response to detecting the image of the barcode, translating the barcode to determine a content of the barcode and to control at least one of a camera parameter or a video data processing parameter based on the content of the barcode. The method may include, in response to the content of the barcode indicating that video recording is unallowed, at least one of preventing storage of at least a portion of the video data and erasing at least the portion of the video data.

As a non-limiting example, the apparatus may correspond to, and the method may be performed by, the NANDeye headgear 102 depicted in FIG. 31 operating in accordance with the description of one or more of FIGS. 12 and 63-64.

In accordance with one or more of the above-described embodiments and methods, an apparatus may include a camera and a processor coupled to the camera, where the processor is configured to process video data received from the camera to determine whether the video data may include a modulated light signal of a predetermined modulation type, and where in response to detecting the modulated light signal the processor is configured to demodulate the modulated light signal to determine a content of the modulated light signal and to control at least one of a camera parameter or a video data processing parameter based on the content of the modulated light signal. In response to the content of the modulated light signal indicating that video recording is prohibited, the processor may be configured to prevent storage of at least a portion of the video data. The light source in the field of view of the camera may include a light emitting diode (LED).

A method may be performed at a device including a camera. The method may include processing video data received from the camera to determine whether the video data may include a modulated light signal of a predetermined modulation type, and in response to detecting the modulated light signal, demodulating the modulated light signal to determine a content of the modulated light signal and controlling at least one of a camera parameter or a video data processing parameter based on the content of the modulated light signal. The method may include preventing storage of at least a portion of the video data in response to the content of the modulated light signal indicating that video recording is prohibited. The light source in the field of view of the camera may include a light emitting diode (LED).

As a non-limiting example, the apparatus may correspond to, and the method may be performed by, the NANDeye headgear 102 depicted in FIG. 31 operating in accordance with the description of FIG. 45.

In accordance with one or more of the above-described embodiments and methods, an apparatus may include a hairband, a first camera attached to the hairband, and a second camera attached to the hairband, where the hairband is configured to support the first camera and the second camera substantially at an eye level of a user while the hairband is worn on a head of the user.

A method may be performed at a hairband that may include a memory, a first camera, and a second camera, where the hairband is configured to support the first camera and the second camera substantially at an eye level of a user while the hairband is worn on the head of the user. The method may include initiating video recording via at least one of the cameras, and storing video data from the at least one camera in the memory.

As a non-limiting example, the apparatus may correspond to, and the method may be performed by, the NANDeye headgear 102 depicted in FIG. 31.

In accordance with one or more of the above-described embodiments and methods, an apparatus may include a chassis, a camera attached to the chassis, a beacon emitter attached to the chassis, and a controller coupled to the camera and configured to process video data from the camera to identify whether a beacon signal of another beacon emitter is received by the camera. The controller may be configured to process the video data during a video capture operation of the camera to identify in real-time or near real-time whether the beacon is received. The controller may be configured to process the video data during a post-processing operation after the video data has been stored to a memory device to identify whether the beacon is received. The beacon emitter may be configured to emit visible light. The visible light may be amplitude-modulated. The visible light may be color-modulated. The beacon emitter may be configured to generate a beacon signal having a frequency outside a visible light spectrum.

The apparatus may further include a second beacon emitter coupled to the chassis, where a first beacon signal of the beacon emitter differs from a second beacon signal of the second beacon emitter to enable the first beacon signal to be identified as corresponding to the beacon emitter and the second beacon signal to be identified as corresponding to the second beacon emitter.

A method may be performed at a device including a chassis, a camera attached to the chassis, and a beacon emitter attached to the chassis. The method may include receiving video data from the camera, and processing the received video data to identify whether a beacon signal of another beacon emitter is received by the camera. The method may include processing the video data during a video capture operation of the camera to identify in real-time or near real-time whether the beacon is received.

The device may include a memory device, and the method may include processing the video data during a post-processing operation after the video data has been stored to the memory device to identify whether the beacon is received. The beacon emitter may be configured to emit visible light. The visible light may be amplitude-modulated. The visible light may be color-modulated. The beacon emitter may be configured to generate a beacon signal having a frequency outside a visible light spectrum.

As a non-limiting example, the apparatus may correspond to, and the method may be performed by, the NANDeye headgear 102 depicted in FIG. 31 operating in accordance with the description of FIG. 25.

In accordance with one or more of the above-described embodiments and methods, an apparatus may include a first beacon emitter, a first camera, and a processor coupled to the camera, where the processor is configured to process video data from the first camera to determine whether a modulated beacon signal of a second beacon emitter coupled to a second camera is detected in a field of view of the first camera.

The processor may be configured to process the video data during a video capture operation of the first camera to determine in real-time or near real-time whether the modulated beacon signal is detected. The processor may be configured to process the video data during a post-processing operation after the video data has been stored to a memory device to determine whether the modulated beacon signal is received. In response to detecting the modulated beacon signal, the processor may be configured to demodulate the modulated beacon signal.

In response to detecting the modulated beacon signal, the processor may be configured to determine a direction to a source of the modulated beacon signal. The processor may be further configured to determine an orientation estimate of the second camera.

In response to detecting the modulated beacon signal and a second modulated beacon signal in the video data, the processor may be configured to determine a distance estimate from the first camera to a beacon base that is coupled to the second beacon emitter and that is coupled to a third beacon emitter that is a source of the second modulated beacon signal.

The processor may be further configured to modify the video data to indicate an estimated field of view of the second camera based on the distance estimate.

A method may be performed at a device including a first beacon emitter and a first camera. The method may include receiving video data from the first camera, and processing the received video data to determine whether a modulated beacon signal of a second beacon emitter coupled to a second camera is detected in a field of view of the first camera.

The method may include processing the video data during a video capture operation of the first camera to determine in real-time or near real-time whether the modulated beacon signal is detected. The method may include processing the video data during a post-processing operation after the video data has been stored to a memory device to determine whether the modulated beacon signal is received. The method may include demodulating the modulated beacon signal in response to detecting the modulated beacon signal. The method may include, in response to detecting the modulated beacon signal, determining a direction to a source of the modulated beacon signal. The method may include determining an orientation estimate of the second camera. The method may include, in response to detecting the modulated beacon signal and a second modulated beacon signal in the video data, determining a distance estimate from the first camera to a beacon base that is coupled to the second beacon emitter and that is coupled to third beacon emitter that is a source of the second modulated beacon signal. The method may include modifying the video data to indicate an estimated field of view of the second camera based on the distance estimate.

As a non-limiting example, the apparatus may correspond to, and the method may be performed by, the NANDeye headgear 102 depicted in FIG. 31 operating in accordance with the description of one or more of FIGS. 25, 39, and 41.

In accordance with one or more of the above-described embodiments and methods, a server may include a processor coupled to a memory and a network interface coupled to the processor. The memory includes a video storage module that is executable by the processor to receive video data via the network interface and to store the received video data in the memory, a search module that is executable by the processor to receive location data and time data and to locate stored video data corresponding to the received location data and time data, and a search communication module that is executable by the processor to receive a request via the network interface, the request including the location data and time data, and to send the located video data to a requestor via the network interface.

A method may be performed at a server. The method may include receiving a request including location data and time data, locating stored video data corresponding to the received location data and time data, and sending the located video data to a requestor.

As a non-limiting example, the server may correspond to, and the method may be performed by, a server operating in accordance with a social network server according to the description of FIG. 28.

In accordance with one or more of the above-described embodiments and methods, an apparatus may include a video data processor configured to receive first video data recorded by a first camera and to process the first video data according to an operation of detection of a camera device, a communication device coupled to the video data processor and configured to send a request to a video data server for second video data recorded by a second camera, the request indicating camera location data and recording time data generated by the operation. The communication device is further configured to receive the second video data of the video data server corresponding to a video recording by the second camera when the second camera was at a location corresponding to the camera location data during a time corresponding to the recording time data. The communication device may include a display device configured to display the received second video data.

Detection of the second camera and receipt of the second video data based on the camera location data and the recording data time may enable a viewer of the first video data to obtain video content captured by the second camera without the viewer having access to an identification of the second camera or an identification of an owner of the second camera.

A method may be performed at a device including a video data processor, a communication device, and a display device. The method may include receiving first video data recorded by a first camera and processing the first video data according to an operation to detect camera devices, sending a request to a video data server for second video data recorded by a second camera, the request indicating camera location data and recording time data generated by the operation, and receiving the second video data of the video data server corresponding to a video recording by the second camera when the second camera was at a location corresponding to the camera location data during a time corresponding to the recording time data.

As a non-limiting example, the apparatus may correspond to, and the method may be performed by, a computer such as the computer illustrated in FIG. 30, programmed to interact with a NANDeye social network such as described with respect to FIG. 28.

In accordance with one or more of the above-described embodiments and methods, an apparatus may include a housing dimensioned to accommodate a battery in a battery housing location, a battery connector positioned to electrically couple to a first battery while the first battery is positioned in the battery housing location, and a make-before-break switch connected to the battery connector and configured to establish a second electrical connection with a second battery prior to breaking a first electrical connection with the first battery to enable the first battery to be replaced in the battery housing location with another battery, where the second battery has substantially a same capacity as the first battery.

A method may be performed at a device including a housing, a battery connector, a battery housing location, a first battery, a second battery, and a make-before-break switch connected to the battery connector, where the housing is dimensioned to accommodate the first battery in the battery housing location. The method may include establishing a first electrical connection with the first battery while the first battery is positioned in the battery housing location, and establishing a second electrical connection with the second battery prior to breaking the first electrical connection with the first battery to enable the first battery to be replaced in the battery housing location with another battery, where the second battery has substantially a same capacity as the first battery.

As a non-limiting example, the apparatus may correspond to, and the method may be performed by, NANDeye headgear 102 including a multi-battery housing and MBB switch such as described with respect to FIGS. 7-8.

In accordance with one or more of the above-described embodiments and methods, an apparatus may include a housing, a battery connector positioned to electrically couple to a battery while the battery is positioned in a battery housing location in the housing, an inserter configured to insert a first battery into the battery housing location, and a collector configured to receive a second battery that is ejected in response to insertion of the first battery into the battery housing location.

A method may be performed at a device including a housing, a battery connector, a battery housing location in the housing, an inserter, and a collector. The method may include inserting, via the inserter, a first battery into the battery housing location, where the battery connector electrically couples to the first battery upon insertion of the first battery into the battery housing location, and receiving, via the collector, a second battery that is ejected in response to insertion of the first battery into the battery housing location.

As a non-limiting example, the apparatus may correspond to, and the method may be performed by, NANDeye headgear 102 including a multi-battery housing connected to a changer such as described with respect to FIGS. 8 and 43.

In accordance with one or more of the above-described embodiments and methods, an apparatus may include a battery holder having a chamber dimensioned to hold multiple batteries and having an opening to enable batteries to be sequentially loaded into the chamber or to be sequentially removed from the chamber via the opening, the battery holder configured to be attached to a housing to provide at least one of a supply of batteries to be sequentially inserted into the housing for powering an electronic device or a container to collect discarded batteries that are ejected from the housing.

A method may be performed at a battery holder having a chamber dimensioned to hold multiple batteries and having an opening to enable batteries to be sequentially loaded into the chamber or to be sequentially removed from the chamber via the opening. The method may include performing, while the battery holder is attached to a housing, at least one of providing a battery from the chamber to the housing via the opening, and receiving an ejected battery from the housing via the opening.

As a non-limiting example, the apparatus may correspond to, and the method may be performed by, a battery changer such as described with respect to FIGS. 8 and 43.

In accordance with one or more of the above-described embodiments and methods, an apparatus may include a housing having a first battery location and a second battery location, a switch configurable to electrically couple to at least one of a first battery and a second battery while the first battery is in the first battery location and the second battery is in the second battery location, and a battery replacer configured to insert another battery into the first battery location or into the second battery location and to receive an ejected one of the first battery from the first battery location or the second battery from the second battery location.

A method may be performed at a device including a housing having a first battery location and a second battery location, a switch configurable to electrically couple to at least one of the first battery and the second battery while the first battery is in the first battery location and the second battery is in the second battery location, and a battery replacer. The method may include inserting another battery into the first battery location or into the second battery location, and receiving an ejected one of the first battery from the first battery location or the second battery from the second battery location.

As a non-limiting example, the apparatus may correspond to, and the method may be performed by, a NANDeye headgear 102 with a multi-battery housing that can be coupled to a battery changer such as described with respect to FIGS. 7-8 and 43.

In accordance with one or more of the above-described embodiments and methods, a server may include a processor coupled to a memory, and a network interface coupled to the processor. The memory may include a video storage module that is executable by the processor to receive video data via the network interface and to store the received video data in the memory, a metadata storage module that is executable by the processor to receive metadata via the network interface and to store the metadata in the memory, the metadata including location and camera orientation data corresponding to the received video data, and a search module that is executable by the processor to receive coordinate data and to locate stored video data corresponding to the received coordinate data based on the metadata, the search module further configured to process the located video data to determine whether a beacon signal indicative of a video recording device is detected in the located video data.

The search module may enable remote users of a video sharing social network to search for video content that is recorded by other users of the video sharing social network and stored in the memory based on location of recording of the video content.

A method may be performed at a server including a processor, a memory coupled to the processor, and a network interface coupled to the processor. The method may include receiving video data via the network interface and storing the received video data in the memory, receiving metadata via the network interface and storing the metadata in the memory, the metadata including location and camera orientation data corresponding to the received video data, receiving coordinate data and locating stored video data corresponding to the received coordinate data based on the metadata, and processing the located video data to determine whether a beacon signal indicative of a video recording device is detected in the located video data. Receiving the coordinate data and processing the located video data may enable remote users of a video sharing social network to search for video content that is recorded by other users of the video sharing social network and stored in the memory based on location of recording of the video content.

As a non-limiting example, the server may correspond to, and the method may be performed by, a server operating in accordance with a social network server according to the description of FIG. 28.

In accordance with one or more of the above-described embodiments and methods, an apparatus may include a beacon emitter configured to transmit a modulated beacon signal, the modulated beacon signal including an encoded message, a camera, and a processor coupled to the camera and to the beacon emitter. The processor is configured to process video data from the camera to detect a received message from another device and to decode the received message to be displayed via a user interface. The processor is further configured to encode user data received via the user interface to be transmitted via the modulated beacon signal. The apparatus may also include the user interface. The apparatus may include a wireless interface coupled to the processor and configured to enable wireless communication with a mobile electronic device that may include the user interface.

A method may be performed at a device including a beacon emitter and a camera, the beacon emitter configured to transmit a modulated beacon signal, the modulated beacon signal including an encoded message. The method may include processing video data from the camera to detect a received message from another device and to decode the received message to be displayed via a user interface, and encoding user data received via the user interface to be transmitted via the modulated beacon signal. The device may include the user interface. The device may include a wireless interface, and the method may include wirelessly communicating with a mobile electronic device that may include the user interface.

As a non-limiting example, the apparatus may correspond to, and the method may be performed by, a NANDeye headgear 102 such as described with respect to one or more of FIGS. 27 and 71.

In accordance with one or more of the above-described embodiments and methods, an apparatus may include a memory and a processor configured to process video data to locate a predetermined graphical feature in the video data and to store an updated version of the video data in the memory, where one or more frames of the video data identified as including the predetermined graphical feature are modified or removed upon storing the updated version of the video data.

A method may be performed at a device including a memory. The method may include receiving video data, and processing the received video data to locate a predetermined graphical feature in the video data and to store an updated version of the video data in the memory, where one or more frames of the video data identified as including the predetermined graphical feature are modified or removed upon storing the updated version of the video data.

As a non-limiting example, the apparatus may correspond to, and the method may be performed by, a NANDeye headgear 102 such as described with respect to one or more of FIGS. 12, 44, and 63-64. As other examples, the apparatus may include a device programmed to execute NANDeye video processing, such as the phone 106 and/or computer of FIG. 1.

In accordance with one or more of the above-described embodiments and methods, an apparatus may include a memory and a processor configured to process video data to locate a predetermined graphical feature in the video data and to store an updated version of the video data in the memory, where a segment of the video data that may include multiple frames within a determined proximity to a located frame is removed upon storing the updated version of the video data in response to the located frame being identified as including the predetermined graphical feature.

A method may be performed at a device including a memory. The method may include receiving video data, and processing the received video data to locate a predetermined graphical feature in the video data and to store an updated version of the video data in the memory, where a segment of the video data that may include multiple frames within a determined proximity to a located frame is removed upon storing the updated version of the video data in response to the located frame being identified as including the predetermined graphical feature.

As a non-limiting example, the apparatus may correspond to, and the method may be performed by, a NANDeye headgear 102 such as described with respect to one or more of FIGS. 12, 44, and 63-64. As other examples, the apparatus may include a device programmed to execute NANDeye video processing, such as the phone 106 and/or computer of FIG. 1.

In accordance with one or more of the above-described embodiments and methods, an apparatus may include a sensor operable to detect a photography-prohibited message while a source of the photography-prohibited message is within an operation range of the sensor, and a controller configured to generate a camera disable signal in response to an output of the sensor indicating detection of the photography-prohibited message.

A method may be performed at a device including a sensor. The method may include detecting a photography-prohibited message while a source of the photography-prohibited message is within an operation range of the sensor, and generating a camera disable signal in response to an output of the sensor indicating detection of the photography-prohibited message.

As a non-limiting example, the apparatus may correspond to, and the method may be performed by, a NANDeye headgear 102 such as described with respect to FIG. 45.

In accordance with one or more of the above-described embodiments and methods, an apparatus may include a memory and a processor configured to process video data to detect a particular property of a beacon signal in the video data and to store an updated version of the video data in the memory, where the processor is configured to modify the video data to obscure parts of an image represented by the video data that have predetermined properties within a determined distance from a source of a detected beacon signal having the particular property. The parts may be human body parts. The parts may be faces. The processor may be further configured to apply a watermark to the updated version of the video data to tag the video data.

A method may be performed at a device including a memory. The method may include receiving video data, processing the received video data to detect a particular property of a beacon signal in the video data and to store an updated version of the video data in the memory, and modifying the video data to obscure parts of an image represented by the video data that have predetermined properties within a determined distance from a source of a detected beacon signal having the particular property. The parts may be human body parts. The parts may be faces. The method may include applying a watermark to the updated version of the video data in response to tag the video data.

As a non-limiting example, the apparatus may correspond to, and the method may be performed by, a NANDeye headgear 102 such as described with respect to FIG. 45. As other examples, the apparatus may include a device programmed to execute NANDeye video processing, such as the phone 106 and/or computer of FIG. 1.

In accordance with one or more of the above-described embodiments and methods, an apparatus may include a camera and a directional beacon emitter configured to transmit a beacon signal having a field of transmission that substantially corresponds to a field of view of the camera, where a detectable signal strength of the beacon signal is substantially above a particular threshold within the field of view of the camera and where the detectable signal strength of the beacon signal is substantially below the particular threshold outside of the field of view of the camera.

A method may be performed at a device including a camera and a directional beacon emitter. The method may include activating the camera, and transmitting a beacon signal having a field of transmission that substantially corresponds to a field of view of the camera, where a detectable signal strength of the beacon signal is substantially above a particular threshold within the field of view of the camera and where the detectable signal strength of the beacon signal is substantially below the particular threshold outside of the field of view of the camera.

As a non-limiting example, the apparatus may correspond to, and the method may be performed by, a NANDeye headgear 102 such as described with respect to FIG. 65.

In accordance with one or more of the above-described embodiments and methods, an apparatus may include a beacon emitter configured to transmit a beacon signal substantially omnidirectionally, and a mounting structure attached to the beacon emitter and configured to, while the mounting structure is worn on a user's head, position the beacon emitter at an elevation higher than the top of the user's head.

A method may be performed at a head mountable device that may include a mounting structure that is configured to be worn on a user's head and to hold a beacon emitter. The method may include performing, while the head mountable device is worn on a user's head, supporting the beacon emitter at an elevation higher than a top of the user's head, and transmitting a beacon signal substantially omnidirectionally.

As a non-limiting example, the apparatus may correspond to, and the method may be performed by, a NANDeye headgear 102 such as described with respect to FIG. 65.

In accordance with one or more of the above-described embodiments and methods, an apparatus may include a camera, a first beacon emitter configured to transmit a first beacon signal, where the first beacon signal comprises light having a frequency in a visible spectrum and where the first beacon emitter is configured to directionally transmit the first beacon signal to produce a field of transmission that substantially corresponds to a field of view of the camera, and a second beacon emitter configured to transmit a second beacon signal, where the second beacon signal is substantially devoid of components outside of the visible spectrum and where the second beacon emitter is configured to transmit the second beacon signal substantially omnidirectionally.

A method may be performed at a device including a camera, a first beacon emitter, and a second beacon emitter. The method may include directionally transmitting a first beacon signal to produce a field of transmission that substantially corresponds to a field of view of the camera, where the first beacon signal comprises light having a frequency in a visible spectrum, and transmitting a second beacon signal substantially omnidirectionally, where the second beacon signal is substantially devoid of components outside of the visible spectrum.

As a non-limiting example, the apparatus may correspond to, and the method may be performed by, a NANDeye headgear 102 such as described with respect to FIG. 65.

In accordance with one or more of the above-described embodiments and methods, an apparatus may include a camera, a processor configured to process video data of the camera to determine whether one or more blinking beacon signals are detected in the video data, where in response to determining a blinking beacon signal is detected in the video data the processor is configured to generate a signal that is substantially synchronized with a blinking pattern of a particular detected blinking beacon signal, and a speaker coupled to receive the generated signal and to produce an audio signal that is substantially synchronized with the blinking pattern.

The processor may be further configured, in response to receiving a first user input indicating that the particular detected blinking beacon signal is a signal of interest, to track the particular detected blinking beacon signal, and in response to receiving a second user input indicating that the particular detected blinking beacon signal is not a signal of interest, to produce another audio signal that is substantially synchronized with another blinking beacon signal in the video data.

A method may be performed at a device including a camera and a speaker. The method may include processing video data of the camera to determine whether one or more blinking beacon signals are detected in the video data, and in response to determining a blinking beacon signal is detected in the video data, generating a signal that is substantially synchronized with a blinking pattern of a particular detected blinking beacon signal, and receiving the generated signal and producing an audio signal that is substantially synchronized with the blinking pattern.

The method may include, in response to receiving a first user input indicating that the particular detected blinking beacon signal is a signal of interest, tracking the particular detected blinking beacon signal. The method may include, in response to receiving a second user input indicating that the particular detected blinking beacon signal is not a signal of interest, producing another audio signal that is substantially synchronized with another blinking beacon signal in the video data.

As a non-limiting example, the apparatus may correspond to, and the method may be performed by, a NANDeye headgear 102 configured to operate in a manner such as described with respect to one or more of FIGS. 66-67.

In accordance with one or more of the above-described embodiments and methods, an apparatus may include a processor configured to send a message to be stored at a server and to be retrievable via access to the server using a network resource indicator, and a beacon coupled to the processor and configured to receive information corresponding to the network resource indicator and to transmit the information corresponding to the network resource indicator via modulation of a beacon signal. The network resource indicator may include a uniform resource locator (URL).

A method may be performed at a device including a beacon. The method may include sending a message to be stored at a server and to be retrievable via access to the server using a network resource indicator, and receiving information corresponding to the network resource indicator and transmitting the information corresponding to the network resource indicator via modulation of a beacon signal. The network resource indicator may include a uniform resource locator (URL).

As a non-limiting example, the apparatus may correspond to, and the method may be performed by, a portable electronic device, such as a phone 106, configured to operate in a manner such as described with respect to the operation of the phone 106 in the flowchart of FIG. 68 or the first user's phone (B) of FIG. 71.

In accordance with one or more of the above-described embodiments and methods, an apparatus may include a processor configured to send a message to be stored at a server and to be retrievable via access to the server using a network resource indicator, where the processor is further configured to encode the network resource indicator according to a fountain code to generate encoded network resource information. The apparatus may also include a beacon coupled to the processor and configured to transmit the encoded network resource information via modulation of a beacon signal. The network resource indicator may include a uniform resource locator (URL).

A method may be performed at a device including a beacon. The method may include sending a message to be stored at a server and to be retrievable via access to the server using a network resource indicator, encoding the network resource indicator according to a fountain code to generate encoded network resource information, and transmitting the encoded network resource information via modulation of a beacon signal. For example, a fountain code may include an erasure code where a sequence of encoding symbols can be generated from a given set of source symbols such that the original source symbols may be recovered from any subset of the encoding symbols of size equal to, or slightly larger than, the number of source symbols, without using a fixed code rate, such as a Raptor code.

Transmission of a message using a fountain code may include sending a stream parity bits corresponding to the message. For example, at each stage of transmission, a set of bits may be chosen from the message, operated upon (e.g., XOR the chosen bits together), and transmit the result. If a receiving NANDeye can detect the transmitted signal without errors, then once a sufficient number of parity bits have been transmitted to enable recovery of the message, the receiving NANDeye can decode the parity bits to recover the message. If the receiving NANDeye is further away, or experiences noise in detection of the signal, the receiving NANDeye may miss one or more of the parity bits, and so one or more additional parity bits will be required to be received before decoding of the message may be accomplished.

The network resource indicator may include a uniform resource locator (URL). As a non-limiting example, the apparatus may correspond to, and the method may be performed by, a NANDeye headgear 102 configured to operate in a manner such as described with respect to the operation of the NANDeye headgear 102 in the flowchart of FIG. 68 or the first user's phone (B) of FIG. 71.

Fountain codes may be used in conjunction with a NANDeye beacon in various embodiments. For example, as described above, one or more fountain codes may be used to transmit network resource information to locate a message. In other embodiments, the message itself (rather than a message locator) may be encoded and transmitted by a NANDeye beacon using one or more fountain codes.

To illustrate, a user with a NANDeye may use a NANDeye beacon to transmit a message (e.g., "I want to sell my bike"). Other NANDeye users that are in line of sight with the user of the transmitting NANDeye and seeing its beacon may be automatically recording this message with their NANDeye (e.g., during video logging). One or more of the users may receive an instantaneous alert on this message (e.g., on their cell phone screen). Alternatively, one or more of the users may view the message at a later time, such as when they watch the video and then see various "hidden" messages in it. The alert (e.g., in the form of a message "balloon" on the recorded video, such as illustrated in FIG. 69) can be generated by analyzing the recorded video, decoding the "hidden" messages, and displaying the decoded messages on the screen. This may be done either by an application on the phone 106, or by a network service.

Because each receiving user may see the transmitting user (e.g., be in line of sight) for a different amount of time and with a different quality (e.g., far vs. near, or in a center of a field of view vs. in a periphery of the field of view, as illustrative examples) and may also start receiving the message at a different time, use of fountain codes enable each user's NANDeye to start "collecting" transmitted symbols (i.e. picture frames with the beacon) at any time and once the user's NANDeye "collects" a sufficient number of symbols (collect any K symbols or slightly more for a K symbol message), the user's NANDeye can decode the message. Thus, message broadcast via fountain codes enables delivery of a message broadcast to multiple users, each user experiencing a different channel quality and with no synchronization.

A user of NANDeye may "broadcast" a short message to be received by anyone in his line of sight. The user may enter the message (possibly using the user's phone 106) and the NANDeye system may either encode the message text and transmits the message via a NANDeye beacon, or store the message to a dedicated URL, encode the URL as text, and transmit the URL via the NANDeye beacon.

Any NANDeye user that sees the transmitting beacon may detect that there is a message, isolate the message from the surrounding noise by filtering to the specific angle (e.g., azimuth and elevation) of the desired beacon, and decoding and/or recording the encoded message. If the message was a URL, the receiving NANDeye can access the URL and retrieve the message. The decoded message can be displayed as a balloon over the transmitter's image in off-line display.

In accordance with one or more of the above-described embodiments and methods, an apparatus may include a memory, a video player configured to display video content corresponding to video data stored at the memory, a beacon detector configured to process the video data to determine whether one or more beacon signals are detected in the video data, a beacon translator configured to determine a message corresponding to a detected beacon signal in response to receiving an output from the beacon detector indicating the detected beacon signal, and a display interface configured to display the message at a display device.

The display interface may be configured to display the message via insertion of graphical or textual data during playback of the video content. The display interface may be configured to display the message to appear as a bubble in the video content. The display interface may be configured to display the message to appear as a caption during playback of the video content.

The beacon translator may be configured to perform a demodulation operation to determine a network resource indicator and to cause a network access request for the message to be sent to a server corresponding to the network resource indicator.

A method may be performed at a device including a memory, a video player, a beacon detector, a beacon translator, and a display device. The method may include displaying video content corresponding to video data stored at the memory, processing the video data to determine whether one or more beacon signals are detected in the video data, determining a message corresponding to a detected beacon signal in response to receiving an output indicating the detected beacon signal, and displaying the message at the display device.

The device may include a display interface, and the method may include displaying the message via the display interface via insertion of graphical or textual data during playback of the video content. The device may include a display interface, and the method may include displaying the message via the display interface to appear as a bubble in the video content. The device may include a display interface, and the method may include displaying the message via the display interface to appear as a caption during playback of the video content. The method may include performing a demodulation operation to determine a network resource indicator and to cause a network access request for the message to be sent to a server corresponding to the network resource indicator.

As a non-limiting example, the apparatus may correspond to, and the method may be performed by, an electronic device, such as a phone 106, configured to operate in a manner such as described with respect to the operation of the phone 106 in the flowchart of FIG. 68 or the second user's phone (D) of FIG. 71, and/or to display messages as bubbles appearing in the video data such as illustrated in FIG. 69.

In accordance with one or more of the above-described embodiments and methods, an apparatus may include a memory, an event detection search engine configured to process video data of a head-mounted camera according to one of more filters to detect occurrences in the video data of characteristics corresponding to one or more detectable events, and an event marker responsive to the event detection search engine to store an indication of detected events of the video data in the memory to enable location of the detected events during playback of the video data.

The one or more detectable events may include a hand substantially blocking a field of view in the video data. The one or more detectable events may include a repeated motion of a field of view. The repeated motion may correspond to motion of the head-mounted camera due to head nodding. The one or more detectable events may include a door slam in an audio portion of the video data. The one or more detectable events may include a starting of a car engine in an audio portion of the video data. The one or more detectable events may include a face of a person exceeding a threshold size in the video data.

A method may be performed at a device including a memory, an event detection search engine, and an event marker. The method may include processing video data of a head-mounted camera according to one of more filters to detect occurrences in the video data of characteristics corresponding to one or more detectable events, and storing an indication of detected events of the video data in the memory to enable location of the detected events during playback of the video data.

The one or more detectable events may include a hand substantially blocking a field of view in the video data. The one or more detectable events may include a repeated motion of a field of view. The repeated motion may correspond to motion of the head-mounted camera due to head nodding. The one or more detectable events may include a door slam in an audio portion of the video data. The one or more detectable events may include a starting of a car engine in an audio portion of the video data. The one or more detectable events may include a face of a person exceeding a threshold size in the video data.

As a non-limiting example, the apparatus may correspond to, and the method may be performed by, a device programmed to execute NANDeye video processing, such as the phone 106 and/or computer of FIG. 1.

In accordance with one or more of the above-described embodiments and methods, an apparatus may include a camera, a chassis that is configured to support the camera while the chassis is worn on a head of a user, a user tag interface configured to receive, during a video recording operation of the camera, user input corresponding to at least one of an audio signal corresponding to a spoken keyword detected by a microphone or user input text data received, via wireless transmission, from a mobile electronic device having a text entry interface, and a controller configured to store the user input in conjunction with video data of the camera during the video recording operation.

A method may be performed at a device including a camera, a chassis configured to support the camera while the chassis is worn on the head of a user, and a user tag interface. The method may include receiving, during a video recording operation of the camera, user input corresponding to at least one of an audio signal corresponding to a spoken keyword detected by a microphone or user input text data received, via wireless transmission, from a mobile electronic device having a text entry interface, and storing the user input in conjunction with video data of the camera during the video recording operation.

As a non-limiting example, the apparatus may correspond to, and the method may be performed by, NANDeye headgear 102.

In accordance with one or more of the above-described embodiments and methods, an apparatus may include a processor coupled to a memory storing video data, the memory further storing a video segmenter executable by the processor to divide the video data and to generate multiple segments of the video data, and a first filter executable by the processor to select one or more of the segments based on an estimation of a user interest of segment content.

The apparatus may include a second filter executable by the processor to identify, for each particular segment of the selected segments, a representative portion of the particular segment. The apparatus may include a third filter executable by the processor to determine a ranking of each the selected segments according to one or more prioritization criteria. The apparatus may include a combiner executable by the processor to generate and store a video file including the representative portions of the selected segments in an order of appearance in the video file matching an order of the ranking of each of the selected segments.

A method may be performed at a device including a memory storing video data. The method may include dividing the video data and generating multiple segments of the video data, and selecting one or more of the segments based on an estimation of a user interest of segment content.

The method may include identifying, for each particular segment of the selected segments a representative portion of the particular segment. The method may include determining a ranking of each the selected segments according to one or more prioritization criteria. The method may include generating and storing a video file including the representative portions of the selected segments in an order of appearance in the video file matching an order of the ranking of each of the selected segments.

As a non-limiting example, the apparatus may correspond to, and the method may be performed by, a computer configured to operate in a manner such as described with respect to FIG. 29.

In accordance with one or more of the above-described embodiments and methods, an apparatus may include a memory coupled to a processor, where the memory may include a first filter executable by the processor to identify, in video data, a feature remaining substantially in a center of a field of view of the video data for a duration exceeding a threshold, a second filter executable by the processor to identify, in the video data or in metadata corresponding to the video data, a bookmarking gesture, and a bookmarking detector executable by the processor to generate a bookmarking indicator in response to the second filter identifying the bookmarking gesture as being recorded while the feature is substantially in the center of the field of view and after threshold duration is exceeded.

A method may be performed that includes identifying, in video data, a feature remaining substantially in a center of a field of view of the video data for a duration exceeding a threshold, identifying, in the video data or in metadata corresponding to the video data, a bookmarking gesture, and generating a bookmarking indicator in response to identifying the bookmarking gesture as being recorded while the feature is substantially in the center of the field of view and after the threshold duration is exceeded.

In accordance with one or more of the above-described embodiments and methods, an apparatus may include a camera, a chassis that is configured to support the camera while the chassis is worn on the head of a user, a wireless interface configured to receive wireless audio data corresponding to recorded audio from a mobile electronic device, and a controller configured to, in response to receiving the wireless audio data during a video recording operation, synchronize and store the recorded audio from the mobile electronic device with video data received from the camera.

The controller may be configured to replace audio data received from the camera with the recorded audio from the mobile electronic device. The controller may be configured to merge audio data received from the camera with the recorded audio from the mobile electronic device.

A method may be performed at a device including a camera, a chassis configured to support the camera while the chassis is worn on a head of a user, and a wireless interface. The method may include receiving, via the wireless interface, wireless audio data corresponding to recorded audio from a mobile electronic device, and in response to receiving the wireless audio data during a video recording operation, synchronizing and storing the recorded audio from the mobile electronic device with video data received from the camera.

The method may include replacing audio data received from the camera with the recorded audio from the mobile electronic device. The method may include merging audio data received from the camera with the recorded audio from the mobile electronic device.

As a non-limiting example, the apparatus may correspond to, and the method may be performed by, a NANDeye headgear 102 configured to operate in a manner such as described with respect to FIG. 70.

In accordance with one or more of the above-described embodiments and methods, an apparatus may include a first beacon emitter configured to generate a first beacon signal having a first color, a second beacon emitter configured to generate a second beacon signal having a second color distinct from the first color, and a controller coupled to the first beacon emitter and to the second beacon emitter and configured to control first modulation of the first beacon signal to form a first data transmission channel and to control second modulation of the second beacon signal to form a second data transmission channel.

The apparatus may also include a third beacon emitter configured to generate a third beacon signal having a third color distinct from the first color and distinct from the second color, and where the controller is further configured to control modulation of the third beacon signal to form a third data transmission channel.

A method may be performed at a device including a first beacon emitter and a second beacon emitter. The method may include generating, at the first beacon emitter, a first beacon signal having a first color, generating, at the second beacon emitter, a second beacon signal having a second color distinct from the first color, and controlling a first modulation of the first beacon signal to form a first data transmission channel and controlling a second modulation of the second beacon signal to form a second data transmission channel.

The device may include a third beacon emitter, and the method may include generating, at the third beacon emitter, a third beacon signal having a third color distinct from the first color and distinct from the second color, and controlling a third modulation of the third beacon signal to form a third data transmission channel.

As a non-limiting example, the apparatus may correspond to, and the method may be performed by, a NANDeye headgear 102 including multiple beacon emitters.

In accordance with one or more of the above-described embodiments and methods, an apparatus may include a chassis that is configured to be worn on the head of a user, and a beacon emitter attached to the chassis and configured to transmit a beacon signal that is modulated to encode at least one of personal information or professional information corresponding to the user.

A method may be performed at a device including a beacon emitter and a chassis that is configured to be worn on a head of a user. The method may include transmitting a beacon signal, and modulating the beacon signal to encode at least one of personal information or professional information corresponding to the user.

As a non-limiting example, the apparatus may correspond to, and the method may be performed by, a NANDeye headgear 102.

Although various components depicted herein may be illustrated as block components and described in general terms, such components may include one or more microprocessors, state machines, or other circuits configured to enable the various components of FIG. 1 to perform the respective described operations. For example, the processor of the NANDeye of FIG. 30 may represent physical components, such as hardware controllers, state machines, logic circuits, or other structures, to enable the headgear 102 to control operation of one or more cameras, beacons, wireless transceivers, laser pointers, etc., according to one or more received inputs such as from one or more cameras, GPS sensors, accelerometers, inclinometers, microphones, cheek sensors, stress detectors, etc.

A NANDeye headgear 102 may be implemented using a microprocessor or microcontroller programmed to control operation of one or more cameras, beacons, wireless transceivers, laser pointers, etc., according to one or more received inputs such as from one or more cameras, GPS sensors, accelerometers, inclinometers, microphones, cheek sensors, stress detectors, etc. In a particular embodiment, the headgear 102 includes a processor executing instructions that are stored at a non-volatile memory. Alternatively, or in addition, executable instructions that are executed by the processor may be stored at a separate memory location that is not part of the non-volatile memory, such as at a read-only memory (ROM).

In a particular embodiment, the NANDeye may use a non-volatile memory, such as a three-dimensional (3D) memory, a flash memory (e.g., NAND, NOR, Multi-Level Cell (MLC), a Divided bit-line NOR (DINOR) memory, an AND memory, a high capacitive coupling ratio (HiCR), asymmetrical contactless transistor (ACT), or other flash memories), an erasable programmable read-only memory (EPROM), an electrically-erasable programmable read-only memory (EEPROM), a read-only memory (ROM), a one-time programmable memory (OTP), or any other type of memory.

The illustrations of the embodiments described herein are intended to provide a general understanding of the various embodiments. Other embodiments may be utilized and derived from the disclosure, such that structural and logical substitutions and changes may be made without departing from the scope of the disclosure. This disclosure is intended to cover any and all subsequent adaptations or variations of various embodiments.

The above-disclosed subject matter is to be considered illustrative, and not restrictive, and the appended claims are intended to cover all such modifications, enhancements, and other embodiments, which fall within the scope of the present disclosure. Thus, to the maximum extent allowed by law, the scope of the present invention is to be determined by the broadest permissible interpretation of the following claims and their equivalents, and shall not be restricted or limited by the foregoing detailed description.

What is claimed is:

1. An apparatus comprising:
   at least two cameras;
   a mounting structure having opposing ends attached to the at least two cameras that is configured to, while the mounting structure is on a user's head with the opposing ends in front of the user's ears, remain substantially or entirely outside of a field of vision of the user and to position the at least two cameras and the opposing ends to be substantially or entirely outside of the field of vision of the user and to be at an eye level of the user, the mounting structure comprising a band having:
      a center between earphones that are adjacent to the opposing ends;
      a first region extending from the center to a first of the opposing ends; and
      a second region symmetrical to the first region and extending from the center to a second of the opposing ends, wherein the band is configured to be worn with the center over a top of the user's head and the opposing ends contacting opposing sides of the user's head in front of the user's ears, and wherein the band comprises a form factor of a rigid hairband that includes the symmetric first and second regions and that further includes each of the opposing ends; and a detector coupled to the mounting structure and configured to detect motion of the user's jaw while the mounting structure is worn on the user's head.

2. The apparatus of claim 1, further comprising a processing circuit coupled to the mounting structure and configured to process information from the at least two cameras and the detector, wherein:

the opposing ends are configured to contact cheeks of the user's head in front of the user's ears, the band comprises injected plastic, and the at least two cameras are positioned to enable stereo video recording via the at least two cameras and the processing circuit.

3. The apparatus of claim 1, further comprising:

a sensor; and a controller configured to adjust at least one of a focal distance of a camera of the at least two cameras and a field of view of the camera in response to receiving an output of the sensor, wherein the sensor includes at least one of an inclinometer or a satellite-based positioning sensor.

4. The apparatus of claim 3, wherein the controller is further configured to toggle between multiple modes of operation of the at least two cameras, the multiple modes including a stereo recording mode and an extended field of view mode.

5. The apparatus of claim 1, further comprising:

a storage device attached to the mounting structure and configured to store first data received from the at least two cameras, the first data including one or both of image data and video data, wherein the stored first data has a first quality; and a controller coupled to the mounting structure and configured to provide second data to a transmitter, wherein the second data corresponds to the first data, and wherein the second data has a second quality different from the first quality.

6. The apparatus of claim 5, wherein the first quality corresponds to a first resolution, and wherein the second quality corresponds to a second resolution that is less than the first resolution.

7. The apparatus of claim 5, wherein the first quality corresponds to a first color depth, and wherein the second quality corresponds to a second color depth that is less than the first color depth.

8. The apparatus of claim 5, wherein the storage device includes a non-volatile memory having a three-dimensional (3D) memory configuration, and wherein the controller is associated with operation of memory cells of the non-volatile memory.

9. The apparatus of claim 1, further comprising:

a sensor configured to detect a condition corresponding to whether the mounting structure is being worn; and a controller configured to modify an operation of at least one of the at least two cameras in response to an output of the sensor corresponding to the mounting structure not being worn.

10. The apparatus of claim 1, further comprising:

a lens holder configured to adjust a position of an external lens relative to a field of view of at least one of the at least two cameras in response to a change of orientation of the mounting structure.

11. The apparatus of claim 1, further comprising a controller electrically coupled to a transmitter and mechanically coupled to the mounting structure, wherein the band is configured to position the controller and the transmitter at the top of the user's head.

12. The apparatus of claim 1, wherein the form factor comprises an arched unitary member that is configured to contact and clamp onto cheeks of the user's head.

13. The apparatus of claim 1, wherein the form factor comprises a C or U shape of approximately uniform curvature that includes the symmetric first and second regions and that further includes each of the opposing ends.

14. The apparatus of claim 13, wherein the opposing ends are configured to contact the user's cheeks in front of the user's ears and proximal to the user's mandible condyle bones.

15. The apparatus of claim 1, further comprising a signal emitter attached to the band, wherein the signal emitter is positioned at a crown of the user's head while the band is worn on the user's head.

16. The apparatus of claim 1, wherein:

the first region includes a first arcuate leg, and the second region includes a second arcuate leg.

17. The apparatus of claim 16, wherein:

a first of the at least two cameras is attached to the first arcuate leg, and a second of the at least two cameras is attached to the second arcuate leg.

18. The apparatus of claim 17, wherein at least one of a first earphone or a first microphone is located at the first opposing end, and wherein at least one of a second earphone or a second microphone is located at the second opposing end.

19. The apparatus of claim 16, wherein at least one of an earphone or a microphone is attached at each of the opposing ends.

20. The apparatus of claim 16, wherein an arcuate portion of the band between the first arcuate leg and the second arcuate leg comprises at least one of a head top transmitter or a head top sensor.

21. An apparatus comprising:

at least two image sensors;

a mounting structure having opposing ends attached to the at least two image sensors that is configured to, while the mounting structure is on a user's head with the opposing ends in front of the user's ears, remain substantially or entirely outside of a field of vision of the user and to position the at least two image sensors and the opposing ends to be substantially or entirely outside of the field of vision of the user and to be at an eye level of the user, wherein the mounting structure comprises a band having:

a region that is configured to be worn over a top of the user's head, the region between earphones that are adjacent to the opposing ends;

a first portion extending from the region to a first of the opposing ends; and a second portion symmetrical to the first portion and extending from the region to a second end of the opposing ends, wherein the band comprises a form factor of a rigid hairband that includes the symmetric first and second portions and that further includes each of the opposing ends and is configured to contact opposing sides of the user's head in front of the user's ears; and a detector coupled to the mounting structure and configured to detect motion of the user's jaw while the mounting structure is worn on the user's head.

22. The apparatus of claim 21, wherein the mounting structure has an arched form factor, and wherein the band comprises injected plastic.

23. The apparatus of claim 21, further comprising a processing circuit coupled to the mounting structure and configured to process information from the at least two image sensors and from the detector, wherein the mounting structure further comprises a rigid arcuate member configured to contact and extend over the top of the user's head while worn on the user's head, and further comprising a transmitter coupled to the processing circuit and to the rigid arcuate member.

24. An apparatus comprising:
a band configured to, while on a user's head with opposing ends of the band in front of the user's ears, remain substantially or entirely outside of a field of vision of the user and to position at least two cameras and the opposing ends to be substantially or entirely outside of the field of vision of the user and to be at an eye level of the user, the band having:
   a region that is configured to be worn over a top of the user's head, the region between earphones that are adjacent to the opposing ends;
   a first portion extending from the region to a first of two opposing ends; and
   a second portion symmetrical to the first portion and extending from the region to a second of the two opposing ends,
   wherein the two opposing ends are coupled to the at least two cameras and configured to contact opposing sides of the user's head in front of the user's ears, and
   wherein the band comprises a form factor of a rigid hairband that includes the symmetric first and second portions and that further includes each of the opposing ends;
a transmitter coupled to the band; and
a detector coupled to the band and configured to detect motion of the user's jaw while the band is worn on the user's head.

25. The apparatus of claim 24, wherein the band comprises injected plastic, wherein the transmitter is configured to transmit at least one of personal information or professional information corresponding to the user, and further comprising cap-less earphones positioned at the opposing ends of the band.

26. An apparatus comprising:
first means for capturing first images;
second means for capturing second images; and
means for mounting the first means and the second means on a user's head with opposing ends of the means for mounting in front of the user's ears, the means for mounting having first and second opposing ends coupled to the first means and to the second means, respectively, and configured to, while the means for mounting is on the user's head, remain substantially or entirely outside of a field of vision of the user and to position the first means, the second means, and the opposing ends to be substantially or entirely outside of the field of vision of the user and to be at an eye level of the user, wherein the means for mounting comprises means for positioning the means for mounting over a top of the user's head, the means for positioning comprising:
   means for contacting a first side of the user's head, the means for contacting the first side of the user's head extending from a central region of the means for positioning to a first of the first and second opposing ends, the central region between earphones that are adjacent to the opposing ends; and
   means for contacting a second side of the user's head, the means for contacting the second side of the user's head symmetrical to the means for contacting the first side of the user's head and extending from the central region to a second end of the first and second opposing ends,
   wherein the means for positioning comprises a form factor of a rigid hairband that includes the means for contacting the first side of the user's head and the means for contacting the second side of the user's head in front of the user's ears; and
means for detecting motion of the user's jaw while the means for mounting is worn on the user's head.

* * * * *